United States Patent
Yokoo

(10) Patent No.: US 12,243,368 B2
(45) Date of Patent: Mar. 4, 2025

(54) CHECK HANDLING DEVICE

(71) Applicant: Glory Ltd., Himeji (JP)

(72) Inventor: Tomohiro Yokoo, Himeji (JP)

(73) Assignee: GLORY LTD., Himeji (JP)

( * ) Notice: Subject to any disclaimer, the term of this patent is extended or adjusted under 35 U.S.C. 154(b) by 365 days.

(21) Appl. No.: 17/389,340

(22) Filed: Jul. 30, 2021

(65) Prior Publication Data

US 2022/0036686 A1    Feb. 3, 2022

(30) Foreign Application Priority Data

Jul. 31, 2020   (JP) .................. 2020-130897

(51) Int. Cl.
| | |
|---|---|
| G07D 11/18 | (2019.01) |
| G06V 30/40 | (2022.01) |
| G07D 11/14 | (2019.01) |
| G07D 11/22 | (2019.01) |

(52) U.S. Cl.
CPC ............ *G07D 11/18* (2019.01); *G06V 30/40* (2022.01); *G07D 11/14* (2019.01); *G07D 11/22* (2019.01)

(58) Field of Classification Search
CPC ........ G07D 11/18; G07D 11/14; G07D 11/22; G07D 11/16; G07D 11/40; G07D 11/60; G07D 7/004; G07D 7/0043; G07D 7/0047; G07D 7/005; G07D 7/0051; G07D 7/0053; G07D 7/0054; G07D 7/0055; G07D 7/0056; G07D 7/0057; G07D 7/12; G07D 7/20; G06V 30/40; G06V 30/224; G06V 30/416; G06Q 20/042; G06K 2017/0038

USPC ........................................... 382/137
See application file for complete search history.

(56) References Cited

U.S. PATENT DOCUMENTS

| | | | | |
|---|---|---|---|---|
| 6,311,819 | B1 * | 11/2001 | Stromme | G07D 7/003 |
| | | | | 194/207 |
| 9,010,626 | B2 * | 4/2015 | Kanagawa | G07F 19/203 |
| | | | | 235/379 |
| 9,098,961 | B1 * | 8/2015 | Block | G07F 19/201 |
| 9,978,197 | B2 * | 5/2018 | Kobayashi | G07D 11/25 |
| 2002/0033359 | A1 * | 3/2002 | Graef | G07F 19/202 |
| | | | | 271/3.14 |
| 2010/0213661 | A1 * | 8/2010 | Fukazawa | B65H 29/60 |
| | | | | 271/265.01 |
| 2013/0020172 | A1 * | 1/2013 | Cha | G07D 11/40 |
| | | | | 194/206 |

(Continued)

FOREIGN PATENT DOCUMENTS

| | | |
|---|---|---|
| EP | 2549448 A1 | 1/2013 |
| EP | 3 664 053 A1 | 6/2020 |

(Continued)

*Primary Examiner* — Jeffrey A Shapiro
(74) *Attorney, Agent, or Firm* — XSENSUS LLP

(57) ABSTRACT

A check handling device includes a receiver having an inlet that receives a check; a transport having a first transport path connected to the receiver and that transports the check received by the receiver; a recognition circuit located in the first transport path, the recognition circuit configured to detect whether each check transported by the transport is a rejected check or a non-rejected check; and a temporary storage connected to the first transport path and that stores check after detection by the recognition circuit.

20 Claims, 31 Drawing Sheets

(56) References Cited

U.S. PATENT DOCUMENTS

| | | | | |
|---|---|---|---|---|
| 2015/0034457 A1* | 2/2015 | Dunn | ................... | G07D 11/16 |
| | | | | 198/836.2 |
| 2015/0363755 A1* | 12/2015 | Walden | ................ | G07F 19/209 |
| | | | | 705/43 |
| 2016/0163144 A1* | 6/2016 | Lee | ..................... | G07D 11/50 |
| | | | | 271/3.15 |
| 2016/0307389 A1* | 10/2016 | Kwak | .................. | G07F 19/203 |
| 2017/0169647 A1* | 6/2017 | Ono | .................... | G07F 19/202 |
| 2018/0247479 A1* | 8/2018 | Yamashita | ............ | G07D 11/20 |
| 2018/0286166 A1* | 10/2018 | Jeong | .................. | G07D 11/50 |
| 2021/0158645 A1* | 5/2021 | Wakabayashi | ........ | B65H 43/04 |
| 2021/0335364 A1† | 10/2021 | Shirai | | |
| 2022/0116270 A1† | 4/2022 | Matsumura | | |

FOREIGN PATENT DOCUMENTS

| | | |
|---|---|---|
| JP | 2015-114999 A | 6/2015 |
| KR | 10-2016-0081303 A | 7/2016 |

\* cited by examiner  
† cited by third party

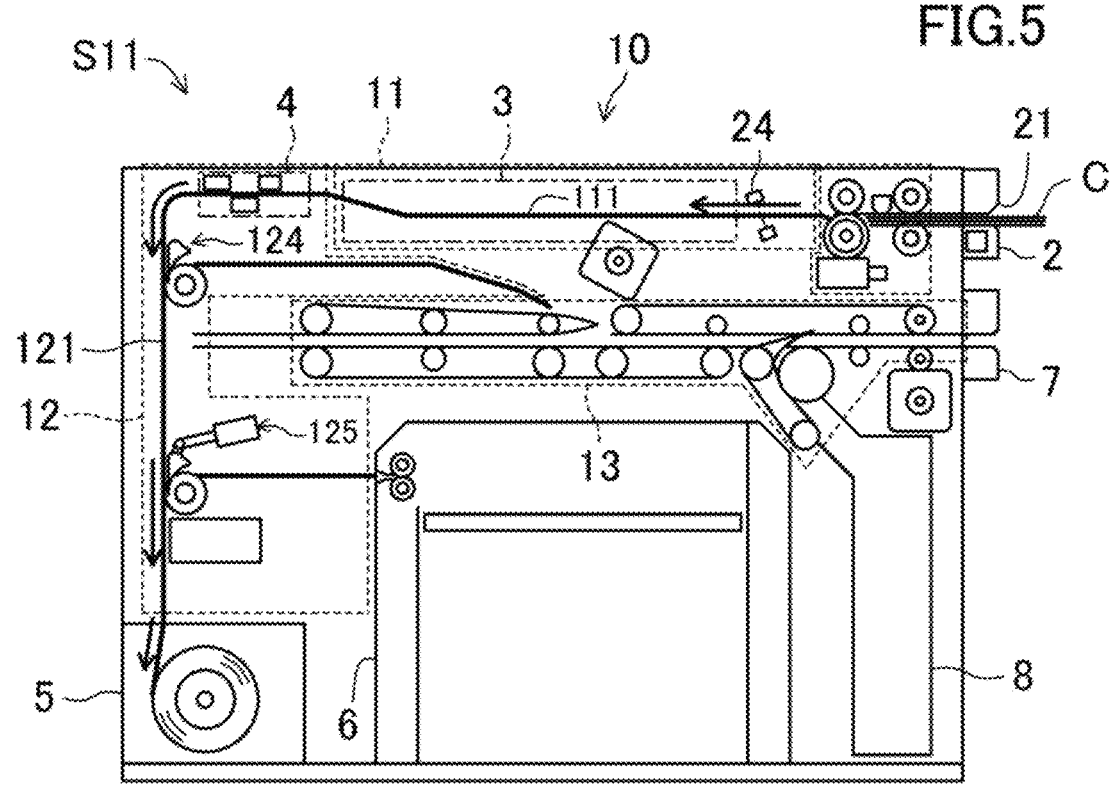
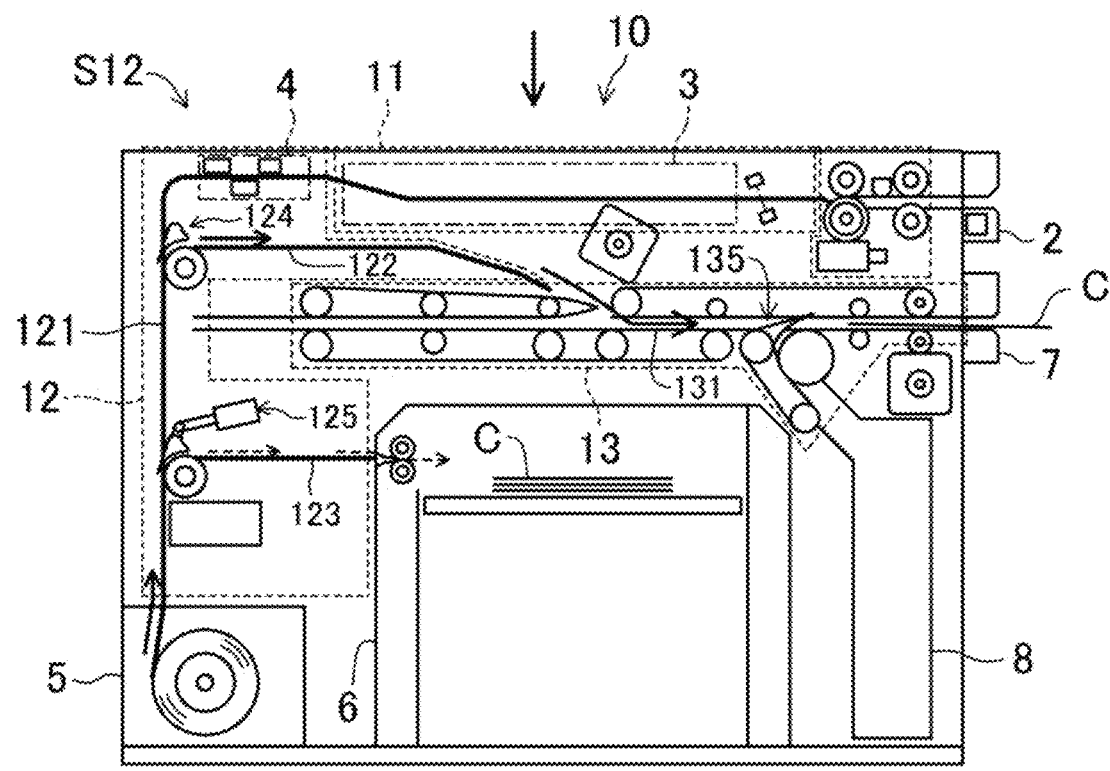
FIG.5

CHECK HANDLING DEVICE

CROSS-REFERENCE TO RELATED APPLICATION

This application claims priority to Japanese Patent Application No. 2020-130897 filed on Jul. 31, 2020, the entire disclosure of which is incorporated by reference herein.

BACKGROUND

A conventional check handling device includes a bundle receiving module, a transport module, a checker module, a recognition module, a reject module, an escrow module, a cassette unit, and a retract box.

SUMMARY

A check handling device in accordance with the present applicant includes a receiver having an inlet that receives a check; a transport having a first transport path connected to the receiver and that transports the check received by the receiver; a recognition circuit located in the first transport path, the recognition circuit configured to detect whether each check transported by the transport is a rejected check or a non-rejected check; and a temporary storage connected to the first transport path and that stores check after detection by the recognition circuit.

BRIEF DESCRIPTION OF THE DRAWINGS

FIG. 5 illustrates an operation of the check handling device when handling checks.

DETAILED DESCRIPTION OF THE DRAWINGS

Figure 1:
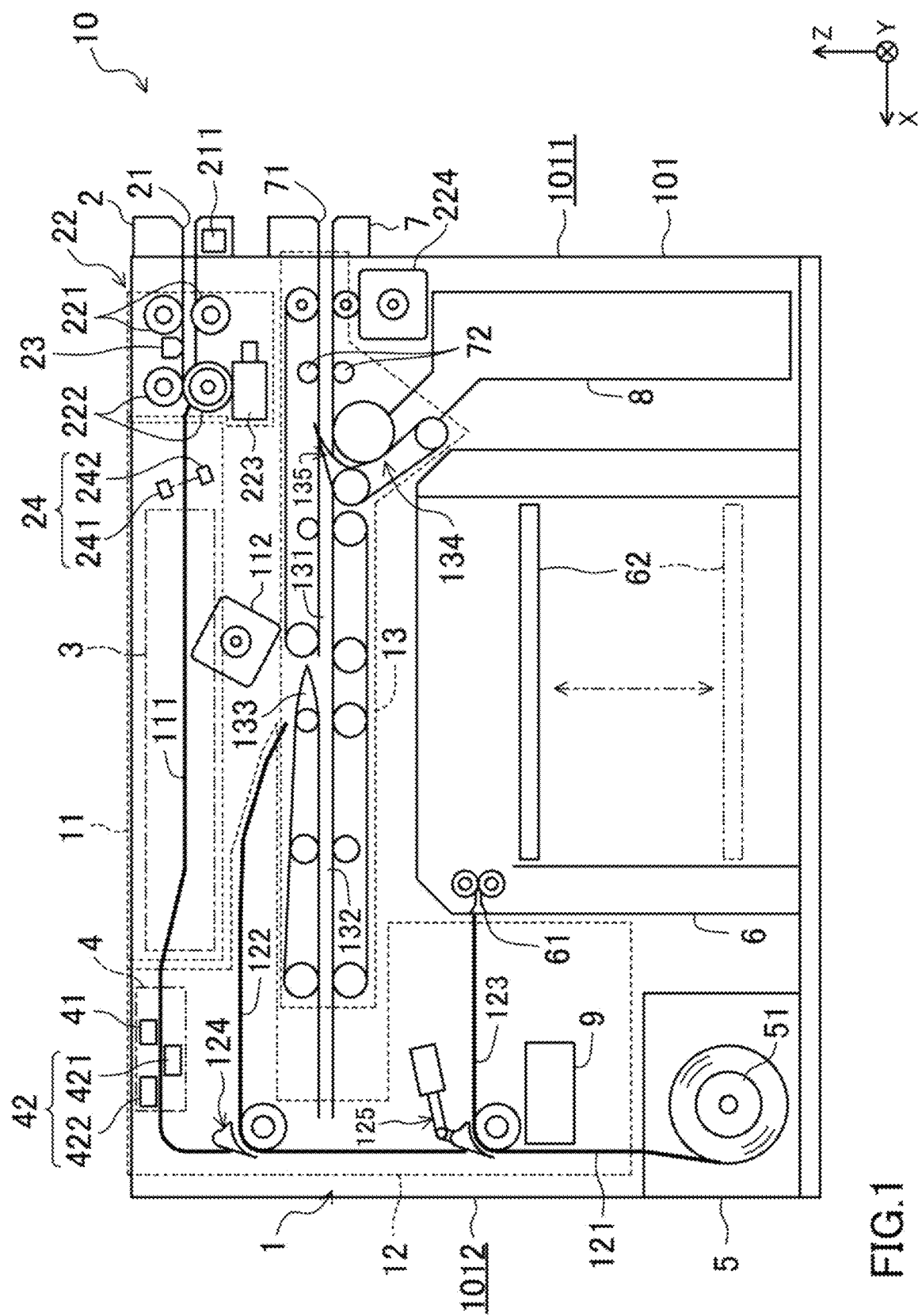
FIG. 1 illustrates an overall configuration of a check handling device.

A conventional check handling device operates as follows. The bundle receiving module receives a bundle of checks to be handled. The transport module transports the checks received by the bundle receiving module one by one. The checker module checks the authenticity of each check transported by the transport module. The recognition module recognizes whether each genuine check recognized by the checker module is a rejected check or a non-rejected check. The reject module discharges any rejected check recognized by the recognition module. The escrow module temporarily stores each non-rejected check recognized by the recognition module. The cassette unit stores the checks confirmed by the user out of the checks stored in the escrow module. The retract box stores any counterfeit check recognized by the checker module. Of the checks stored in the escrow module, those not confirmed by the user are transported to the reject module.

Since the conventional check handling device separates the rejected check every time the recognition module recognizes the rejected check, the handling time is long. Moreover, the arrangement of the modules and the structure of transport paths connecting the modules are complicated.

The technique disclosed herein provides a check handling device with a short handling time.

A check handling device disclosed herein includes: a receiving unit having an inlet that receives one or more checks; a transport unit that has a first transport path connected to the receiving unit and that transports the check received by the receiving unit; a recognition unit that is located in the first transport path and that recognizes whether each check transported by the transport unit is a rejected check or a non-rejected check; and a temporary storage unit that is connected to the first transport path and that stores both the rejected check and the non-rejected check recognized by the recognition unit.

The check handling device with this configuration has a short handling time because the temporary storage unit stores both the rejected check and the non-rejected check.

The temporary storage unit may store a plurality of the rejected checks.

When the receiving unit receives a plurality of the checks through the inlet, the receiving unit may feed out the checks one by one to the first transport path. The recognition unit may recognize the checks one by one. The temporary storage unit may store all of the plurality of checks received through the inlet.

The receiving unit may be located at a first end of the first transport path, the temporary storage unit may be located at a second end of the first transport path, and the recognition unit may be located between the first and second ends of the first transport path.

The check handling device may further include: an input unit that receives an instruction from a user after all the checks received by the receiving unit are stored in the temporary storage unit; and a rejecting unit connected to the first transport path. The temporary storage unit may feed out the stored checks after the instruction is input to the input unit. The transport unit may transport the rejected check feed out from the temporary storage unit to the rejecting unit.

The rejecting unit may be located at a position different from the receiving unit.

The check handling device may further include a storage unit connected to the first transport path. The storage unit may store the non-rejected check fed out from the temporary storage unit after the instruction is input to the input unit and transported by the transport unit.

The storage unit may be a cassette that is detachably attached to the check handling device.

The first end of the first transport path may be connected to the receiving unit, and the second end of the first transport path may be connected to the temporary storage unit. The transport unit may transport the check in a first direction and a second direction, the first direction being a direction from the receiving unit toward the temporary storage unit along the first transport path, and the second direction being an opposite direction to the first direction. The transport unit may have a second transport path that diverges from the first transport path, and an end of the second transport path may be connected to the rejecting unit. A first switching mechanism that switches a transport direction of the check being transported by the transport unit may be located at a diverging position where the second transport path diverges from the first transport path. The first switching mechanism may set the transport direction of the check to a direction toward the temporary storage unit when the check is transported in the first direction along the first transport path. The first switching mechanism may set the transport direction of the check to a direction toward the rejecting unit when the check is transported in the second direction along the first transport path.

The first switching mechanism may have a diverter located at the diverging position, and the diverter may be switched between a first position and a second position. The first position is such a position that the receiving unit side of the first transport path and the temporary storage unit side of the first transport path communicate with each other and the temporary storage unit side of the first transport path and the second transport path do not communicate with each other. The second position is such a position that the receiving unit side of the first transport path and the temporary storage unit side of the first transport path do not communicate with each other and the temporary storage unit side of the first transport path and the second transport path communicate with each other.

The first switching mechanism may include a biasing member that biases the diverter to the second position. The check that is transported from the receiving unit toward the temporary storage unit along the first transport path comes into contact with the diverter to switch the diverter from the second position to the first position against a biasing force of the biasing member. The check that is transported from the temporary storage unit toward the receiving unit along the first transport path may be transported toward the rejecting unit by the diverter located at the second position.

The transport unit may have a third transport path that diverges from the first transport path at a position closer to the temporary storage unit than the diverging position of the second transport path is, and an end of the third transport path may be connected to the storage unit that stores the non-rejected check. A second switching mechanism that switches a transport direction of the check being transported along the first transport path by the transport unit may be located at the diverging position where the third transport path diverges from the first transport path. The second switching mechanism may set the transport direction of the check to a direction toward the temporary storage unit when the check is transported in the first direction along the first transport path. The second switching mechanism may selectively switch the transport direction of the check between a direction toward the receiving unit and a direction toward the storage unit when the check is transported in the second direction along the first transport path.

The first transport path, the second transport path, and the third transport path may be connected so as not to form a loop shape.

The temporary storage unit may store both the rejected check and the non-rejected check in a first mode, and may not store the rejected check but store the non-rejected check in a second mode.

The check handling device may further include: an identification unit that identifies the user; and a control unit that switches between the first mode and the second mode according to the user identified by the identification unit, the first mode being a mode in which both the rejected check and the non-rejected check are stored, and the second mode being a mode in which the rejected check is not stored but the non-rejected check is stored.

The check handling device may further include a detection unit that detects the number of checks received by the inlet. The temporary storage unit may store both the rejected check and the non-rejected check when the number of checks detected by the detection unit is equal to or greater than a predetermined value. The temporary storage unit may not store the rejected check but store the non-rejected check when the number of checks detected by the detection unit is smaller than the predetermined value.

The recognition unit may include a first acquisition unit that acquires magnetic information of the check and a second acquisition unit that acquires an image of the check. The recognition unit may recognize at least whether the check is the rejected check or the non-rejected check based on the magnetic information of the check and the image of the check.

Hereinafter, an embodiment of the check handling device will be described with reference to the drawings. The check handling device illustrated herein is by way of example only.

Figure 34:
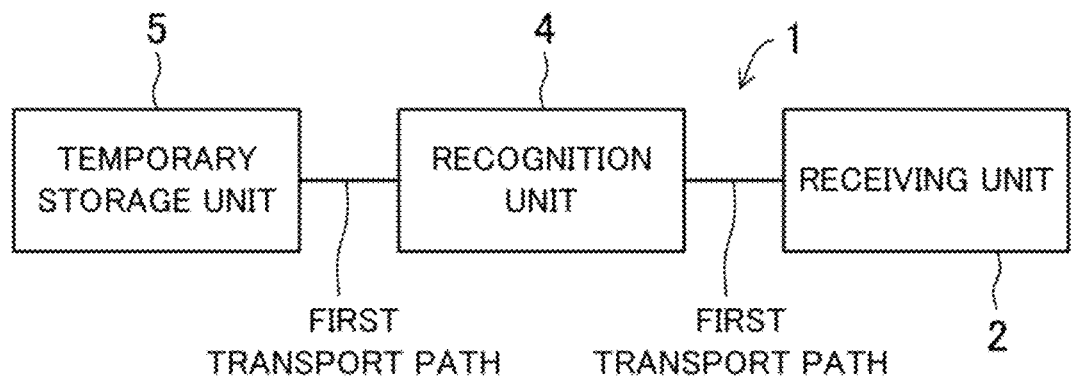
FIG. 34 illustrates a configuration of the check handling device.

FIG. 34 illustrates a configuration example of a transport unit 1 of an exemplary check handling device. The transport unit 1 includes a receiving unit 2, a transport unit 1, a recognition unit 4, and a temporary storage unit 5. The receiving unit 2 has an inlet for receiving one or more checks. The transport unit 1 has a first transport path connected to the receiving unit 2 and transports the check(s) received by the receiving unit 2. The recognition unit 4 is provided in the first transport path and recognizes whether each check transported by the transport unit 1 is a rejected check or a non-rejected check. The temporary storage unit 5 is connected to the first transport path and stores both rejected and non-rejected checks recognized by the recognition unit 4.

The handling time of this check handling device is short because the temporary storage unit stores both rejected and non-rejected checks.

FIG. 1 illustrates a configuration example of check handling device 10. The check handling device 10 handles checks. The check handling device 10 can perform a process of cashing a check received from a user and depositing the cash to the user's account. The check handling device 10 is installed with a cash handling device.

Figure 2:
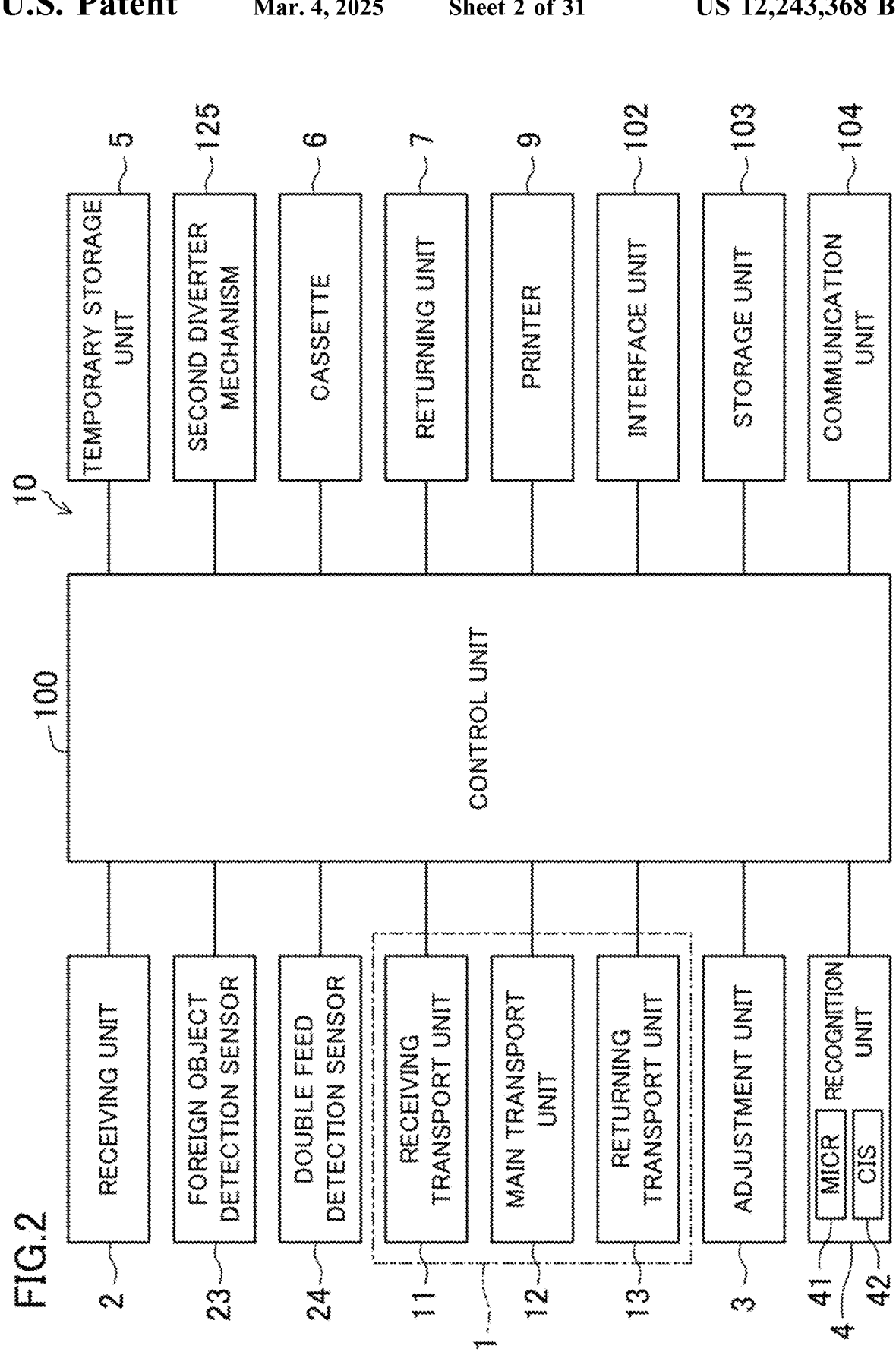
FIG. 2 is a block diagram of the check handling device.

Overall Configuration of Check Handling Device FIG. 1 illustrates an overall configuration of the check handling device 10. FIG. 2 is a block diagram of the check handling device 10. The check handling device 10 includes a receiving unit 2, an adjustment unit 3, a recognition unit 4, a temporary storage unit 5, a cassette 6, a returning unit 7, a retracting unit 8, a printer 9, and a transport unit 1. The receiving unit 2, the adjustment unit 3, the recognition unit 4, the temporary storage unit 5, the cassette 6, the returning unit 7, the retracting unit 8, the printer 9, and the transport unit 1 are housed in a housing 101 of the check handling device 10.

Receiving Unit

The receiving unit 2 is a receiver disposed on the first surface 1011 side in the upper part of the housing 101. The first surface 1011 is the front of the check handling device 10 and is the surface on the right side of the paper of FIG. 1.

The receiving unit 2 receives a check to be handled. The receiving unit 2 takes a check into the check handling device 10. The receiving unit 2 has an inlet 21 for inserting a check. The inlet 21 is provided in the upper part of the first surface 1011. A user faces the first surface 1011 of the check handling device 10 and inserts a check into the inlet 21. The user can insert a check horizontally into the inlet 21. The user must insert the check into the inlet 21 in a predetermined orientation. For example, the user inserts the check into the inlet 21 with the front facing up, the back facing down, and the right edge facing forward. The user can insert a plurality of vertically stacked checks into the inlet 21 at a time. A shutter is provided for the inlet 21. The shutter opens and closes the inlet 21. A first actuator 211 for opening and closing the shutter is disposed near the inlet 21.

In each figure, the direction from right to left of the paper of FIG. 1 based on the first surface 1011 of the housing 101, that is, the front of the check handling device 10 that has the inlet 21, is sometimes referred to as the X direction. The X direction corresponds to the depth direction of the housing 101. The direction perpendicular to the plane of the paper of FIG. 1 is sometimes referred to as the Y direction. The Y direction corresponds to the width direction of the housing 101. In other words, the Y direction is the direction perpendicular to the X direction and parallel to the horizontal direction. The direction from bottom to top of the paper of FIG. 1 is sometimes referred to as the Z direction. The Z direction corresponds to the height direction of the housing 101.

Figure 18:
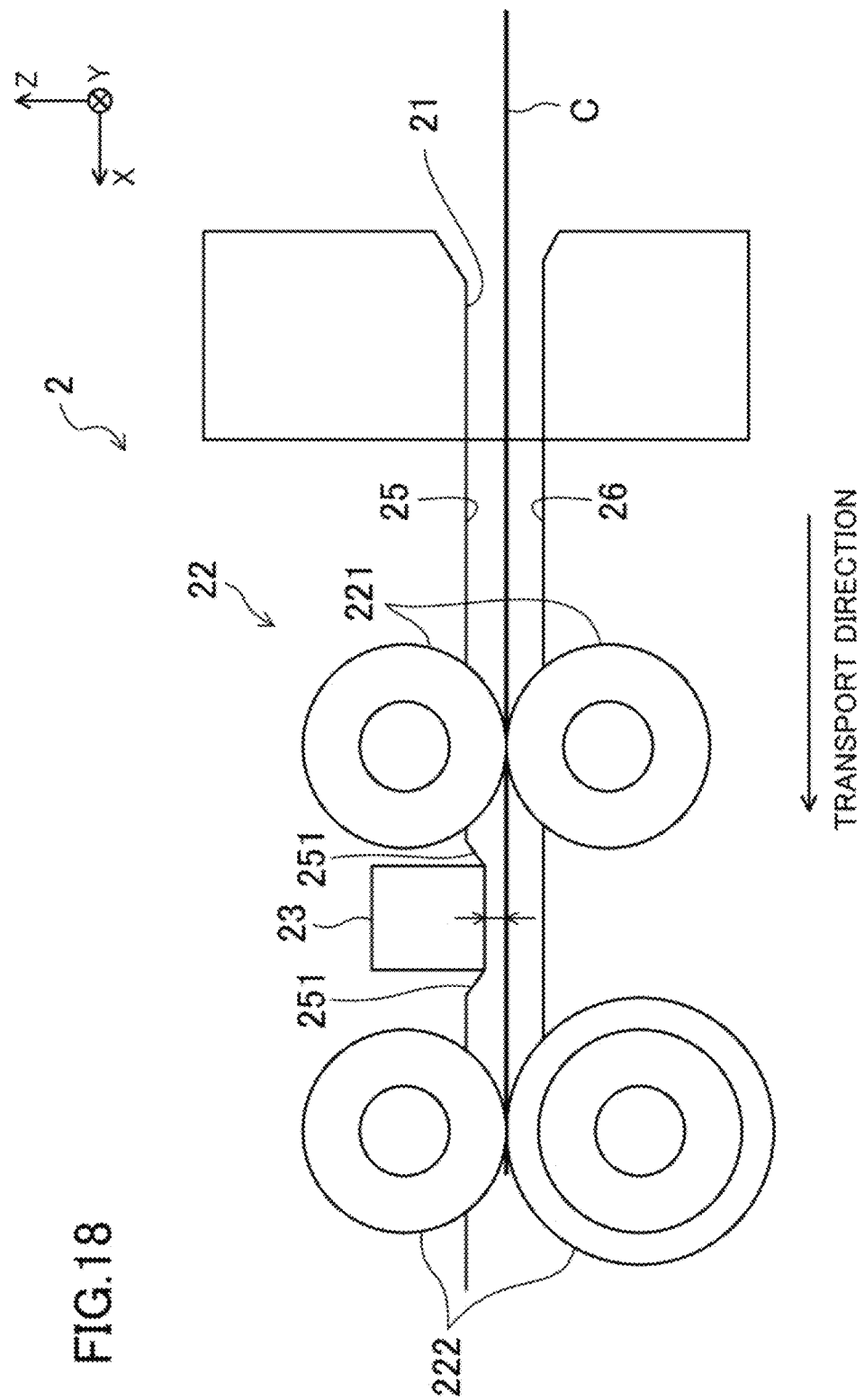
FIG. 18 is an enlarged view of a receiving unit.

The receiving unit 2 has a feeding mechanism 22. The feeding mechanism 22 feeds out the checks received by the inlet 21 intermittently one by one. As shown in FIG. 18, the feeding mechanism 22 has two roller pairs, a first roller pair 221 and a second roller pair 222. The first roller pair 221 is disposed on the side closer to the inlet 21, and the second roller pair 222 is disposed on the side farther away from the inlet 21. The first roller pair 221 and the second roller pair 222 are arranged at an interval in the depth direction. Each of the first roller pair 221 and the second roller pair 222 sandwiches one check or a stack of checks inserted through the inlet 21 therebetween in the vertical direction. The first roller pair 221 and the second roller pair 222 hold a check C inserted through the inlet 21.

The feeding mechanism 22 has a first electric motor 224. The first electric motor 224 supplies a transporting force to the feeding mechanism 22. As illustrated in FIG. 1, the first electric motor 224 is disposed at a position below the feeding mechanism 22. The returning unit 7 is interposed between the feeding mechanism 22 and the first electric motor 224. The feeding mechanism 22 and the first electric motor 224 are connected to each other by a transmission belt. The transporting force from the first electric motor 224 is supplied to the feeding mechanism 22 via the transmission belt.

The feeding mechanism 22 feeds out the check with the short side of the check facing forward. The check is fed out from the first surface 1011 side to the second surface 1012 side of the housing 101, that is, from right to left of the paper of FIG. 1, in the depth direction. The receiving unit 2 is an example of a take-in unit that intermittently takes checks one by one into the check handling device 10.

The feeding mechanism 22 has a second actuator 223. The second actuator 223 lifts a push plate. The push plate holds the check received by the inlet 21.

The second surface 1012 of the housing 101 is the opposite surface of the housing 101 from the first surface 1011. In FIG. 1, the second surface 1012 of the housing 101 is the surface on the left side of the paper of FIG. 1. The second surface 1012 is the back of the check handling device 10.

The receiving unit 2 has a foreign object detection sensor 23. The foreign object detection sensor 23 detects a foreign object on the check such as a staple. The foreign object detection sensor 23 detects a metal foreign object. The foreign object detection sensor 23 outputs a detection signal to a control unit 100, which will be described later with respect to FIGS. 2 and 35, when there is a foreign object on the check. The configuration of the foreign object detection sensor 23 will be described in detail later.

Adjustment Unit

The adjustment unit 3 is disposed on the side of the receiving unit 2 in the housing 101. More specifically, the adjustment unit 3 is disposed in an intermediate portion in the depth direction of the upper part of the housing 101. The adjustment unit 3 adjusts the position and/or attitude of the check fed out from the receiving unit 2. The configuration of the adjustment unit 3 will be described in detail later.

A double feed detection sensor 24 is disposed between the receiving unit 2 and the adjustment unit 3. The double feed detection sensor 24 detects double feed of the checks fed out from the receiving unit 2. The configuration of the double feed detection sensor 24 will be described in detail later.

Recognition Unit

The recognition unit 4 is disposed on the side of the adjustment unit 3 in the housing 101. More specifically, the recognition unit 4 is disposed on the second surface 1012 side in the upper part of the housing 101. The recognition unit 4 recognizes the check. In an exemplary implementation, recognition unit 4 includes circuitry. The recognition unit 4 further includes a magnetic ink character reader (MICR) 41 and a contact image sensor (CIS) 42.

Figure 27:
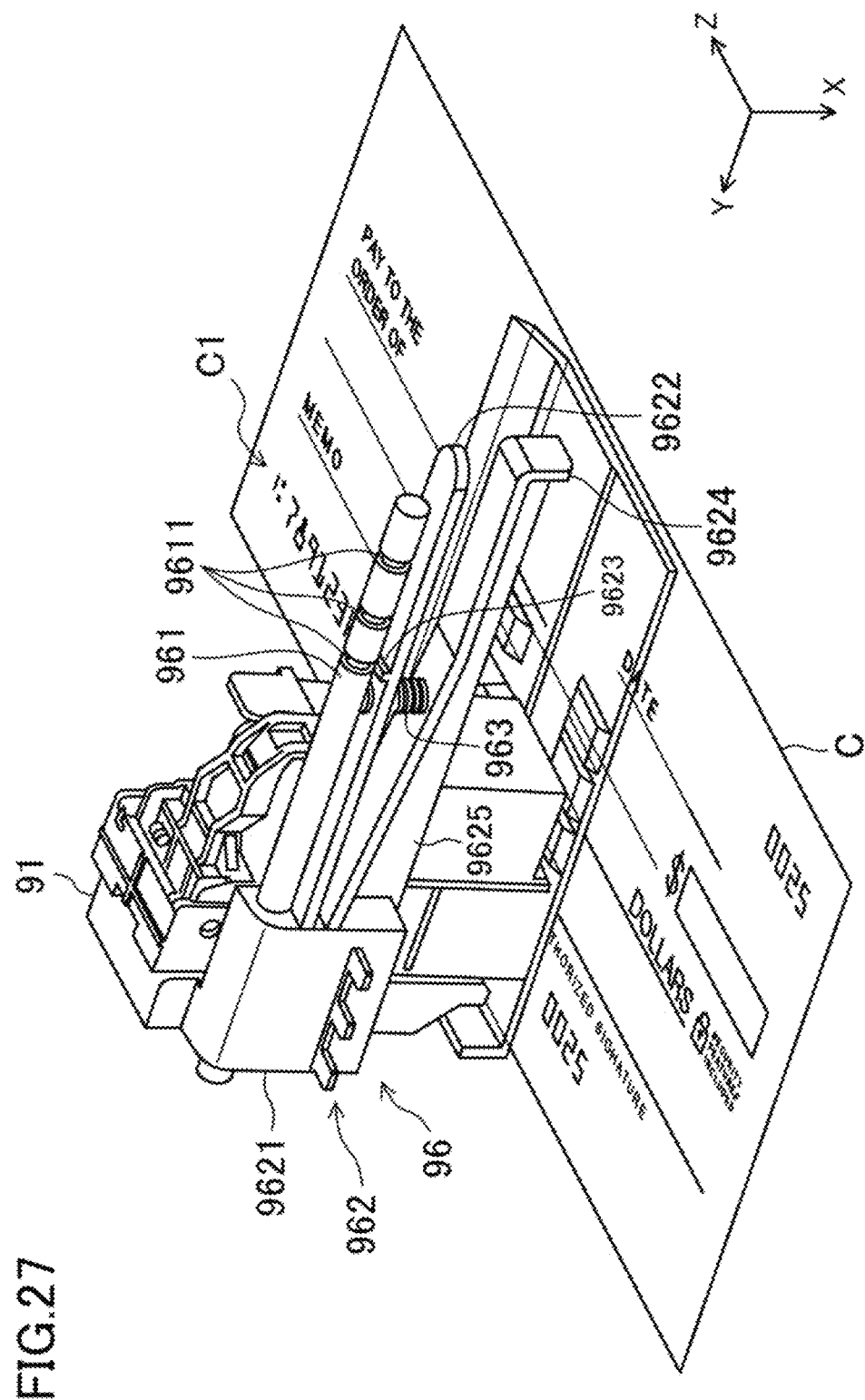
FIG. 27 is a perspective view of a position adjustment mechanism for the printhead.

The MICR 41 reads magnetic information of the check. The MICR 41 is disposed on the upper side of a transport path. The check has the magnetic information in its magnetic information portion. The magnetic information portion is provided at a predetermined location on the check. Specifically, as shown in FIG. 27, a magnetic information portion C1 is provided near the lower side of the check C. The bottom and top sides of the check C are the bottom and top sides determined based on the front of the check C.

The CIS 42 acquires an image of the check. The CIS 42 is disposed on the side of the MICR 41. More specifically, the CIS 42 is disposed closer to the second surface 1012 than the MICR 41 is.

The CIS 412 has a first CIS 421 and a second CIS 422. The first CIS 421 captures an image of the back of the check. The second CIS 422 captures an image of the front of the check. The first CIS 421 is disposed on the lower side of the transport path, and the second CIS 422 is disposed on the upper side of the transport path. The first CIS 421 and the second CIS 422 are displaced from each other in the depth direction of the housing 101.

The recognition unit 4 recognizes whether the check is a rejected check or a non-rejected check based on the signals from the MICR 41 and the CIS 42. The rejected check is a check that cannot be accepted by the check handling device 10, and the non-rejected check is a check that can be accepted by the check handling device 10. For example, when the check is excessively skewed or when the check is abnormally long, the recognition unit 4 recognizes that the check is a rejected check. The recognition unit 4 also reads information on the check. Whether the quality of the image acquired by the recognition unit 4 satisfies the determination criteria is determined by an upper-level device of the check handling device 10.

The MICR 41 may output an information signal regarding the read magnetic information to the control unit 100, and the first CIS 421 and the second CIS 422 may output a signal regarding to the image of the back of the check and a signal regarding the image of the front of the check to the control unit 100, respectively. The control unit 100 may make a determination regarding the check based on the signals from the recognition unit 4. The recognition unit 4 and the control unit 100 may cooperate to make a determination regarding the check.

Temporary Storage Unit

The temporary storage unit 5 is disposed on the second surface 1012 side in the lower part of the housing 101. The temporary storage unit 5 temporarily stores checks. The temporary storage unit 5 is what is called a tape type storage unit capable of storing and feeding out sheets. The tape type storage unit has a drum 51. The drum 51 is supported in the temporary storage unit 5 so as to be rotatable in the forward and reverse directions. When the drum 51 rotates in the forward direction, checks taken into the temporary storage unit 5 are wound together with a tape around the drum 51. The temporary storage unit 5 stores the checks in this manner. When the drum 51 rotates in the reverse direction, the checks wound around the drum 51 are fed out from the temporary storage unit 5. The tape type storage unit stores the checks on a first-in last-out basis. Due to the structure of the tape type storage unit, the order in which the checks are taken into the tape type storage unit and the order in which the checks are fed out from the tape type storage unit cannot be changed or are difficult to change.

Storage units with various structures are known as tape type storage units. Storage units with various known structures can be used as the temporary storage unit 5. The temporary storage unit 5 is not limited to the tape type storage unit.

Cassette

The cassette 6 is disposed in an intermediate portion in the depth direction of the lower unit of the housing 101. The cassette 6 is located on the side of the temporary storage unit 5. The cassette 6 is detachably attached to the housing 101.

The cassette 6 stores checks. As will be described later, the cassette 6 stores checks confirmed by the user out of genuine checks. The cassette 6 is an example of a storage unit that stores a medium.

The cassette 6 has a hollow box-shaped housing. The cassette 6 has an inlet 61 in its side surface. Checks enter the cassette 6 through the inlet 61 and are stored in the cassette 6. A table 62 is provided inside the cassette 6. The checks are stacked on the table 62. The table 62 can be lifted and lowered as shown by long dashed double-short dashed line in FIG. 1. The table 62 is lowered as the number of checks stored in the cassette 6 increases. The cassette 6 cannot feed the stored checks out of the cassette 6. However, the cassette 6 may be configured to feed the stored checks out of the cassette 6. A person in charge of managing the check handling device 10 can take the cassette 6 storing the checks out of the check handling device 10.

Returning Unit

The returning unit 7 is disposed on the first surface 1011 side in an intermediate part in the height direction of the housing 101. The returning unit 7 is located below the receiving unit 2. The returning unit 7 holds a check to be returned. The check to be returned includes a rejected check and a check not confirmed by the user. The returning unit 7 has a return outlet 71 for returning checks. The return outlet 71 is provided in an intermediate part in the height direction of the first surface 1011. The return outlet 71 is located below the inlet 21. The user faces the front of the check handling device 10 and manually takes the returned check from the return outlet 71.

Figure 4:
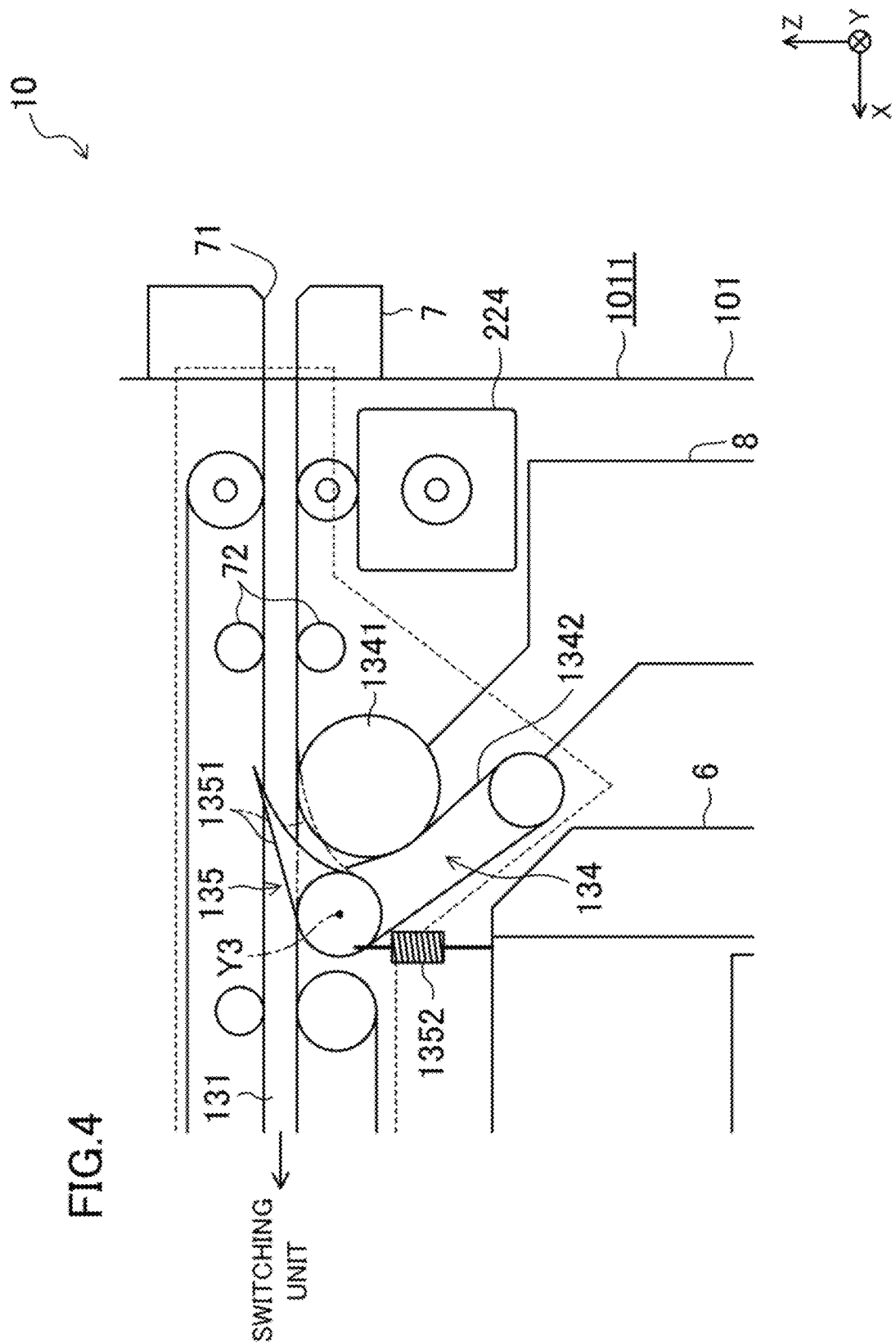
FIG. 4 is an enlarged view of a third diverter mechanism.

As shown in an enlarged view of FIG. 4, the returning unit 7 has a third roller pair 72. The third roller pair 72 sandwiches a check therebetween. The third roller pair 72 is pinch rollers. The third roller pair 72 is also transport rollers that apply a force in the transport direction to the check sandwiched therebetween. The third roller pair 72 can transport one or more checks both toward the returning unit 7 and away from the returning unit 7.

When there is a plurality of checks to be returned, the return outlet 71 can hold the vertically stacked checks. This will be described in detail later.

Retracting Unit

The retracting unit 8 is disposed on the first surface 1011 side in the lower part of the housing 101. The retracting unit 8 is located on the side of the cassette 6 and below the returning unit 7. The retracting unit 8 stores checks. The checks stored in the retracting unit 8 are checks the user has forgotten to take out of the checks returned to the returning unit 7.

The retracting unit 8 has a hollow box-shaped housing. Checks are stored in the retracting unit 8. The retracting unit 8 cannot feed out the stored checks. The retracting unit 8 is configured to open and close. The person in charge of managing the check handling device 10 can open the retracting unit 8 and manually take the checks out of the retracting unit 8.

Printer

The printer 9 is disposed on the second surface 1012 side in the intermediate part in the height direction of the housing 101. The printer 9 is located above the temporary storage unit 5. The printer 9 prints an endorsement on the checks to be stored in the cassette 6. The printer 9 prints on the checks being transported along a main transport path 121 that will be described later. The configuration of the printer 9 will be described in detail later.

Transport Unit

The transport unit 1 transports checks inside the housing 101. The transport unit 1 includes a receiving transport unit 11, a main transport unit 12, and a returning transport unit 13.

As shown surrounded by dashed line in FIG. 1, the receiving transport unit 11 transports checks generally from the exit of the receiving unit 2 to the recognition unit 4. The receiving transport unit 11 has a receiving transport path 111. The receiving transport path 111 extends horizontally or substantially horizontally in the upper part of the housing 101. The adjustment unit 3 is provided at an intermediate position on the receiving transport path 111. A second electric motor 112 for the transport operation of the receiving transport unit 11 is disposed in the lower part of the adjustment unit 3.

The receiving transport unit 11 transports checks fed out from the receiving unit 2 to the recognition unit 4 one by one at intervals along the receiving transport path 111.

The main transport unit 12 transports the checks from the recognition unit 4 to the temporary storage unit 5, from the temporary storage unit 5 to the cassette 6, and from the temporary storage unit 5 to a returning transport path 131 that will be described later. The main transport unit 12 has the main transport path 121, a first branch path 122, and a second branch path 123. The main transport unit 12 transports checks one by one at intervals along the main transport path 121, the first branch path 122, or the second branch path 123.

Each transport path is composed of a combination of a multiplicity of rollers, a plurality of belts, a motor for driving the rollers and the belts, and a plurality of guides.

The main transport path 121 is connected to the receiving transport path 111. The main transport path 121 extends horizontally or substantially horizontally on the second surface 1012 side in the upper part of the housing 101 and is then bent downward at a corner inside the housing 101. The main transport unit 121 extends vertically or substantially vertically on the second surface 1012 side in the housing 101 from the upper part toward the lower part of the housing 101 and reaches the temporary storage unit 5. Accordingly, when the receiving transport path 111 and the main transport path 121 are regarded as one continuous transport path, the receiving unit 2 is connected to a first end of this transport path, the temporary storage unit 5 is connected to a second end of this transport path, and the recognition unit 4 is provided between the first and second ends of the transport path. The transport unit 1 can transport checks that have been taken in from the receiving unit 2 to the temporary storage unit 5 via the recognition unit 4. The temporary storage unit 5 can store the checks that have been taken in from the receiving unit 2 and recognized by the recognition unit 4.

The first branch path 122 diverges from near the upper part in the height direction of the main transport path 121 extending vertically. The first branch path 122 extends horizontally or substantially horizontally from the main transport path 121 toward the first surface 1011, is then tilted obliquely downward, and extends to a position near the returning transport path 131. That is, the first branch path 122 extends obliquely downward from the side away from the returning unit 7 toward the returning unit 7. The first branch path 122 has a tilted path.

The second branch path 123 diverges from near the middle portion in the height direction of the main transport path 121. The second branch path 123 is located below the first branch path 122. The diverging position of the second branch path 123 is located between the diverging position of the first branch path 122 and the temporary storage unit 5. The printer 9 is disposed between the diverging position of the second branch path 123 and the temporary storage unit 5. The second branch path 123 extends horizontally or substantially horizontally and is connected to the inlet 61 of the cassette 6.

Figure 3:
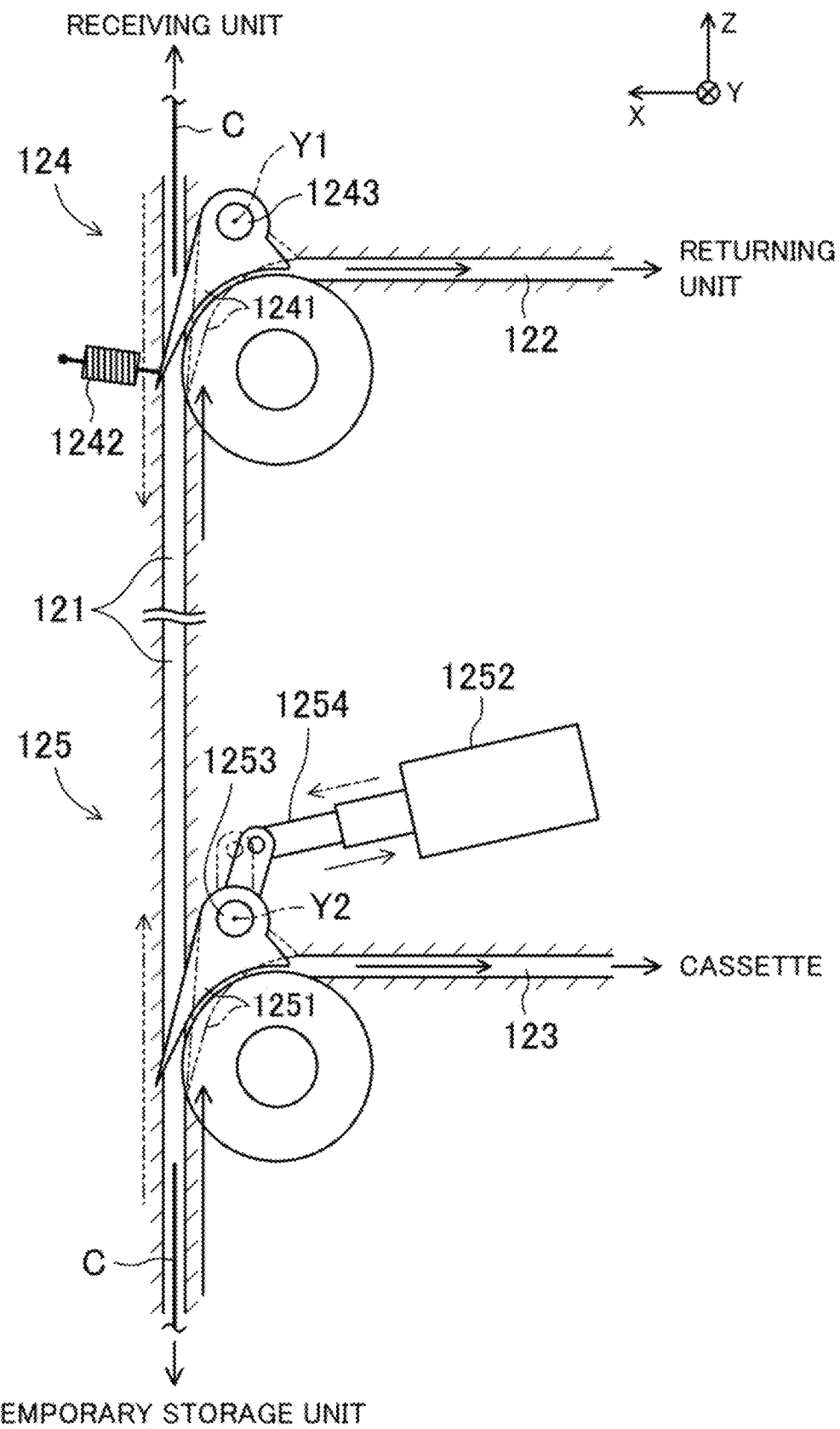
FIG. 3 is an enlarged view of a first diverter mechanism and a second diverter mechanism.

A first diverter mechanism 124 is disposed at the diverging position of the first branch path 122. A second diverter mechanism 125 is disposed at the diverging position of the second branch path 123. FIG. 3 is an enlarged view of the first diverter mechanism 124 and the second diverter mechanism 125. The first diverter mechanism 124 and the second diverter mechanism 125 are different in structure.

The first diverter mechanism 124 has a first diverter 1241 and a first biasing member 1242. A first shaft 1243 rotatably supports the first diverter 1241. The first diverter 1241 rotates about a first axis of rotation Y1 that is perpendicular to the check transport direction. The first diverter 1241 is rotated between a first position and a second position to change its orientation. The first position is shown by long dashed double-short dashed line and the second position is shown by solid line in FIG. 3.

When the first diverter 1241 is located at the first position, the receiving unit 2 side of the main transport path 121 and the temporary storage unit 5 side of the main transport path 121 communicate with each other, that is, the upper and lower sides of the main transport path 121 in FIG. 3 communicate with each other, and the temporary storage unit 5 side of the main transport path 121 and the first branch path 122 do not communicate with each other. When the first diverter 1241 is located at the second position, the receiving unit 2 side of the main transport path 121 and the temporary storage unit 5 side of the main transport path 121 do not communicate with each other, and the temporary storage unit 5 side of the main transport path 121 and the first branch path 122 communicate with each other.

The first biasing member 1242 biases the first diverter 1241 to the second position. In the configuration example of FIG. 3, the first biasing member 1242 is a tension coil spring. The first biasing member 1242 may be, e.g., a torsion spring or a helical compression spring instead of the tension coil spring.

The first diverter mechanism 124 can automatically set the travel direction of the check to one direction according to the direction in which the check should be transported. The first diverter mechanism 124 is an example of a first switching mechanism.

The second diverter mechanism 125 has a second diverter 1251 and a second actuator 1252. A second shaft 1253 rotatably supports the second diverter 1251. The second diverter 1251 rotates about a second axis of rotation Y2 that is perpendicular to the check transport direction. The second diverter 1251 is rotated between a first position and a second position to change its orientation. The first position is shown by long dashed double-short dashed line and the second position is shown by solid line in FIG. 3.

When the second diverter 1251 is located at the first position, the receiving unit 2 side of the main transport path 121 and the temporary storage unit 5 side of the main transport path 121 communicate with each other, and the temporary storage unit 5 side of the main transport path 121 and the second branch path 123 do not communicate with each other. When the second diverter 1251 is located at the second position, the receiving unit 2 side of the main transport path 121 and the temporary storage unit 5 side of the main transport path 121 do not communicate with each other, and the temporary storage unit 5 side of the main transport path 121 and the second branch path 123 communicate with each other.

The second actuator 1252 rotates the second diverter 1251. In the illustrated example, the second actuator 1252 is a linear actuator having a rod 1254 that advances and withdraws. The second actuator 1252 may be, e.g., a solenoid actuator. The tip end of the rod 1254 is connected to the second diverter 1251. As the road 1254 advances and withdraws, the second diverter 1251 is rotated between the first position and the second position to change its orientation.

The second diverter mechanism 125 can selectively determine the travel direction of the check by using the second actuator 1252. The second diverter mechanism 125 is an example of a second switching mechanism.

The operation of the first and second diverter mechanisms 124, 125 will be described later.

The returning transport unit 13 transports checks from the tip end of the first branch path 122 of the main transport unit 12 to the returning unit 7. The returning transport unit 13 has the returning transport path 131. The returning transport path 131 extends horizontally or substantially horizontally in the intermediate part in the height direction of the housing 101. The tip end of the returning transport path 131 is connected to the returning unit 7.

The returning transport unit 13 further has a retracting transport path 132. The tip end of the retracting transport path 132 is connected to the base end of the returning transport path 131. The returning transport path 131 and the retracting transport path 132 are continuous with each other. The retracting transport path 132 extends horizontally or substantially horizontally in the intermediate portion in the height direction of the housing 101. The base end of the retracting transport path 132 is located near the main transport path 121. The returning transport path 131 and the retracting transport path 132 together extend along substantially the entire length from the first surface 1011 side to the second surface 1012 side in the intermediate portion in the height direction of the housing 101.

The connection portion between the returning transport path 131 and the retracting transport path 132 is horizontal or substantially horizontal. The tip end of the first branch path 122 is located near the connection portion between the returning transport path 131 and the retracting transport path 132. A switching unit 133 is disposed between the first branch path 122 and the returning transport path 131 and the retracting transport path 132. The switching unit 133 switches the check transport direction. The configuration of the switching unit 133 will be described in detail later.

The returning transport unit 13 has a third branch path 134. The third branch path 134 diverges from an intermediate position in the depth direction of the returning transport path 131. The tip end of the third branch path 134 is connected to the retracting unit 8.

As shown in an enlarged view of FIG. 4, the third branch path 134 is composed of a large-diameter roller 1341 and a transport belt 1342. The transport belt 1342 is in contact with the outer peripheral surface of the roller 1341. The roller 1341 is disposed at the diverging position where the third branch path 134 diverges from the returning transport path 131. The transport belt 1342 is wound around two pulleys arranged at an interval.

A third diverter mechanism 135 is disposed at the diverging position where the third branch path 134 diverges from the returning transport path 131. The third diverter mechanism 135 has a third diverter 1351 and a third biasing member 1352.

The third diverter 1351 rotates about a third axis of rotation Y3 that is perpendicular to the check transport direction. The third diverter 1351 is rotated between a first position and a second position to change its orientation. The first position is shown by long dashed double-short dashed line and the second position is shown by solid line in FIG. 4.

When the third diverter 1351 is located at the first position, the returning unit 7 side of the returning transport path 131 and the third branch path 134 do not communicate with each other, and the returning unit 7 side of the returning transport path 131 and the switching unit 133 side of the returning transport path 131 communicate with each other. When the third diverter 1351 is located at the second position, the returning unit 7 side of the returning transport path 131 and the third branch path 134 communicate with each other, and the returning unit 7 side of the returning transport path 131 and the switching unit 133 side of the returning transport path 131 do not communicate with each other.

The third biasing member 1352 biases the third diverter 1351 to the second position. In the configuration example of FIG. 4, the third biasing member 1352 is a tension coil spring. The third biasing member 1352 may be, e.g., a torsion spring or a helical compression spring instead of the tension coil spring.

The returning transport path 131, the retracting transport path 132, and the third branch path 134 are configured to transport one check and a stack of checks. These transport paths are configured by arranging transport belts each wound around a plurality of pulleys such that the transport belts face each other in the vertical direction.

As can be seen from FIG. 1, the check handling device 10 includes the receiving transport path 111, the main transport path 121, the first branch path 122, the second branch path 123, the returning transport path 131, the retracting transport path 132, and the third branch path 134. These transport paths and branch paths are connected so as not to form a loop shape.

Configuration for Control of Check Handling Device

As shown in FIG. 2, the check handling device 10 has a control unit 100. The control unit 100 includes a processor and a memory. In an exemplary implementation, control unit 100 comprises circuitry, control circuitry and/or processing circuitry, which will be discussed in detailed later with respect to FIG. 35. The memory stores a program for operating the processor and other information.

The receiving unit 2, the foreign object detection sensor 23, the double feed detection sensor 24, the receiving transport unit 11, the main transport unit 12, the returning transport unit 13, the adjustment unit 3, the recognition unit 4, the temporary storage unit 5, the second diverter mechanism 125, the cassette 6, the returning unit 7, the printer 9, an interface unit 102, a storage unit 103, and a communication unit 104 are connected to the control unit 100 so that they can send and receive signals to and from the control unit 100.

The interface unit 102 is a unit that provides information to an operator who operates the check handling device 10 and that is operated by the operator. The interface unit 102 is, e.g., a touch panel flat panel display. In an exemplary implementation, the interface unit 102 may include circuitry and/or processing circuitry and may be referred to as an interface. The user performs an operation through the interface unit 102 to cause the check handling device 10 to handle checks.

The storage unit 103 stores information of checks stored in the cassette 6. As will be described later, when the check handling device 10 handles checks, the storage unit 103 also temporarily stores information of checks temporarily stored in the temporary storage unit 5 and information on the storage order of the checks.

The communication unit 104 performs wired communication and/or wireless communication between the check handling device 10 and an external device. As will be described later, the communication unit 104 may notify the person in charge of managing the check handling device 10 when the user forgot to take a returned check. In an exemplary implementation, communication unit 104 is a transceiver that transmits/receives information to/from control unit 100 of check handling device 10 via a network.

Handling Operation of Check Handling Device Next, the operation of the check handling device 10 when handling checks will be described with reference to FIG. 5. The upper figure of FIG. 5 illustrates a first step S11, and the lower figure of FIG. 5 illustrates a second step S12.

The first step S11 is a step of receiving a check by the check handling device 10. As described above, the user inserts a check C to be handled into the inlet 21. The user can also insert a stack of checks C into the receiving port 21.

The receiving unit 2 intermittently feeds the inserted checks C one by one to the receiving transport path 111. The receiving transport unit 11 transports the checks C one by one at intervals in the forward direction (see arrows in S11). The forward direction is the direction in which the check C is transported away from the receiving unit 2. The double feed detection sensor 24 detects double feed of the checks C.

The adjustment unit 3 adjusts the position and/or attitude of each check C. The receiving transport unit 11 sends the check C whose position and/or attitude has been adjusted to the recognition unit 4.

The recognition unit 4 acquires information on the check C. Based on the acquired information, the recognition unit 4 and/or the control unit 100 recognizes whether the check C is a rejected check or a non-rejected check. For example, if the user inserts a check into the inlet 21 in a wrong orientation, the MICR 41 cannot read the magnetic information of the check. The recognition unit 4 and/or the control unit 100 therefore recognizes that the check is a rejected check.

The main transport unit 12 transports all the checks C that have passed through the recognition unit 4 to the temporary storage unit 5. The first diverter 1241 of the first diverter mechanism 124 is positioned at the second position by the first biasing member 1242. However, the first diverter 1241 is pushed by the check C transported from the receiving unit 2 side to the temporary storage unit 5 side and is switched from the second position to the first position against the biasing force of the first biasing member 1242 (see long dashed double-short dashed line in FIG. 3). The check C thus passes through the first diverter mechanism 124 from the receiving unit 2 side to the temporary storage unit 5 side, as shown by long dashed double-short dashed arrow in FIG. 3.

The second diverter mechanism 125 positions the first diverter 1251 at the first position (see long dashed double-short dashed line in FIG. 3). The check C transported along the main transport path 121 passes through the second diverter mechanism 125 from the receiving unit 2 side to the temporary storage unit 5 side as shown by long dashed double-short dashed arrow in FIG. 3.

The temporary storage unit 5 stores all the checks C. Accordingly, both rejected and non-rejected checks are stored in the temporary storage unit 5. The temporary storage unit 5 may store a plurality of rejected checks. The first step S11 ends when all the checks C inserted into the receiving unit 2 are stored in the temporary storage unit 5. The storage unit 103 stores information on the checks C stored in the temporary storage unit 5 and information on the storage order of the checks C.

After the first step S11, the control unit 100 of the check handling device 10 performs control to provide the information on the checks C received by the check handling device 10 to the user through the interface unit 102. The user selects which check to confirm and which check not to confirm based on the provided information. The user performs this selection operation via the interface unit 102.

After the user performs the selection operation, the check processing device 10 performs the second step S12. The second step S12 is a step of storing the checks C in the cassette 6 and returning the check not confirmed by the user or the rejected check to the user. The temporary storage unit 5 feeds out the stored checks C. As described above, the temporary storage unit 5 is a tape type storage unit, and the order in which the checks C are taken into the temporary storage unit 5 and the order in which the checks C are fed out from the temporary storage unit 5 do not change. The temporary storage unit 5 feeds out the checks C in the storage order of the checks C in the storage unit 103 (see solid arrow in S12). Of the checks C fed out from the temporary storage unit 5, the main transport unit 12 transports the check C that is a non-rejected check and has been confirmed by the user to the second branch path 123. Specifically, the main transport unit 12 switches the second diverter 1251 of the second diverter mechanism 125 to the second position at the timing the check C that is a non-rejected check and has been confirmed by the user passes through the second diverter mechanism 125. The check C is thus diverted from the main transport path 121 to the second branch path 123 by the second diverter 1251. The check C then reaches cassette 6 (see dashed arrow in S12). The cassette 6 stores the check C that is a non-rejected check C and has been confirmed by the user.

Of the checks C fed out from the temporary storage unit 5, the main transport unit 12 transports the check C that is a non-rejected check and has not been confirmed by the user and the rejected check to the first branch path 122. The main transport unit 12 switches the second diverter 1251 of the second diverter mechanism 125 to the first position at the timing the check C that is a non-reject check and has not been confirmed by the user or the reject check passes through the second diverter mechanism 125. The check C that is transported along the main transport path 121 thus passes through the second diverter mechanism 125 from the temporary storage unit 5 side to the receiving unit 2 side. The check C then reaches the first diverter mechanism 124.

As described above, the first diverter mechanism 124 is positioned at the second position by the first biasing member 1242. The first diverter mechanism 124 sets the check transport direction to the direction toward the first branch path 122. The check C is diverted from the main transport path 121 to the first branch path 122 by the first diverter 1241. The main transport unit 12 then transports the check C from the first branch path 122 toward the return transport path 131 (see solid arrow in S12).

The check C passes through the switching unit 133 to the return transport path 131 (see solid arrow in S12). When there is only one check to be returned, this check is transported along the returning transport unit 131 to the returning unit 7. The operation of the check handling device 10 when there is a plurality of checks to be returned will be described later.

The third diverter 1351 of the third diverter mechanism 135 is positioned at the second position by the third biasing member 1352. However, the third diverter 1351 is pushed by the check C transported from the switching unit 133 side to the returning unit 7 side and is switched from the second position to the first position against the biasing force of the third biasing member 1352 (see long dashed double-short dashed line in FIG. 4) The check C thus passes through the third diverter mechanism 135 from the switching unit 133 side to the returning unit 7 side.

The returning unit 7 holds the check C that has been transported thereto, as shown in the lower figure (S12) of FIG. 5. The user can manually take the check C from the returning unit 7. The returned check C is a check not confirmed by the user or a rejected check. The returning unit 7 is a transport destination of the rejected check. The returning unit 7 of the check handling device 10 is also a rejecting unit that holds the rejected check to be returned. In the check handling device 10, the rejecting unit is provided at a position different from the receiving unit 2.

As described above, when handling checks, the check handling device 10 stores all the checks taken into the check handling device 10 in the temporary storage unit 5. The temporary storage unit 5 stores both rejected and non-rejected checks. Since the rejected checks are not separated from the non-rejected checks, the handling time of the check handling device 10 is reduced.

The configuration for separating the rejected checks from the non-rejected checks can be omitted in the check handling device 10. The transport path of the check handling device 10 is not in the loop shape. This simplifies the structure of the check handling device 10. Simplifying the transport path also contributes to reduction in handling time of the check handling device 10.

When the user performs a confirming/non-confirming operation after all the checks are stored in the temporary storage unit 5, the check handling device 10 transports the rejected check fed out from the temporary storage unit 5 to the returning unit 7. The check handling device 10 can eject the rejected check. The check handling device 10 also transports the check not confirmed by the user to the returning unit 7. The check handling device 10 can return the check not confirmed by the user.

The check handling device 10 feeds a non-rejected check out from the temporary storage unit 5, and transports the check confirmed by the user to the cassette 6. The check handling device 10 can sort the checks fed out from the temporary storage unit 5 as the second diverter mechanism 125 having the second actuator 1252 selectively switches the transport destination of the check.

The first diverter mechanism 124 having the first biasing member 1242 can switch the transport destination of the check according to the transport direction of the check, namely for each of the step in which the check handling device 10 receives checks and the step in which the check handling device 10 sorts the received checks.

Modification of Handling Operation of Check Handling Device 10

Figure 6:
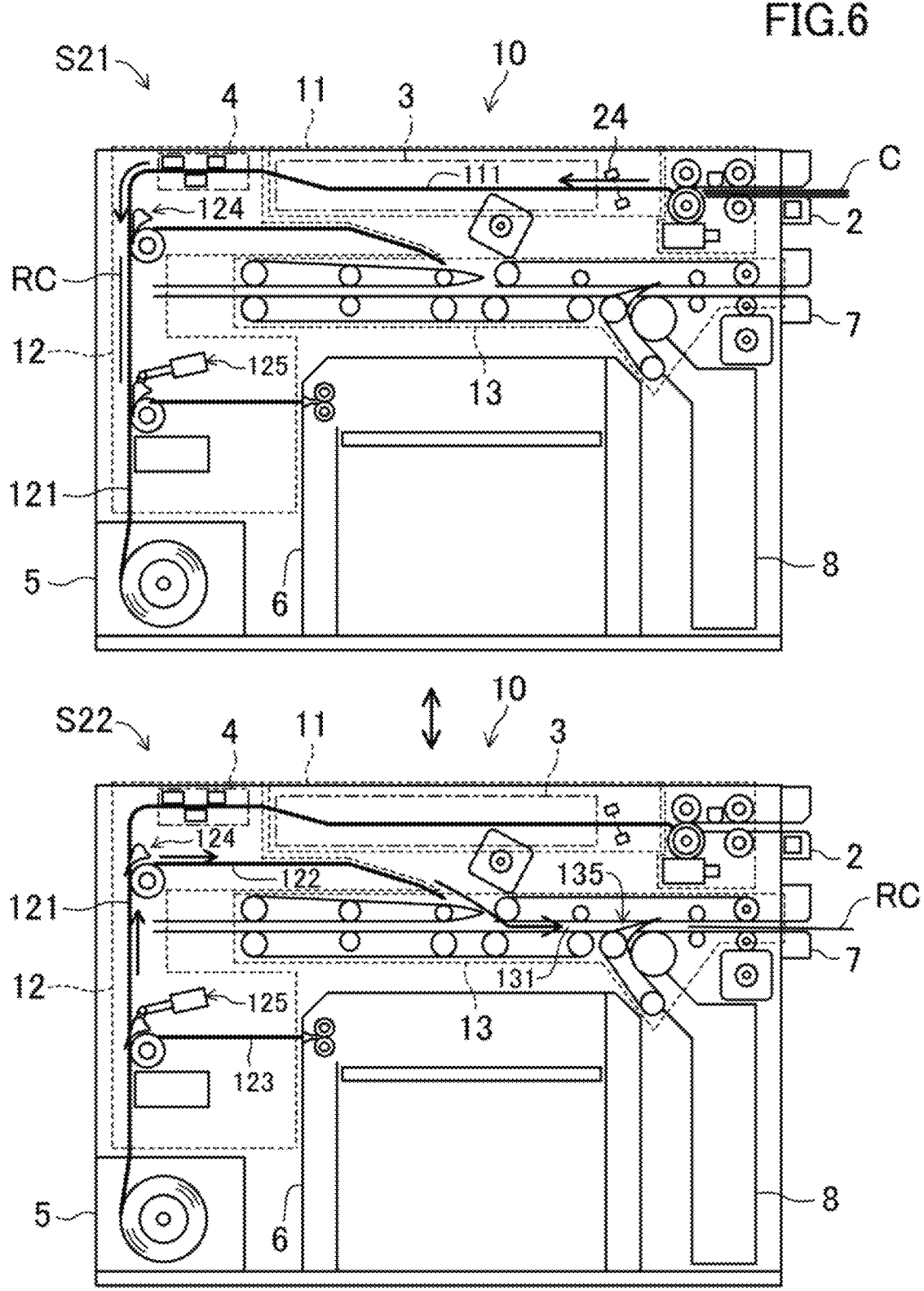
FIG. 6 illustrates an operation of the check handling device different from that of FIG. 4 when handling checks.

As a modification, the check handling device 10 may transport the rejected check to the returning unit 7 every time the recognition unit 4 recognizes the rejected check. FIG. 6 illustrates the operation of the check handling device 10 according to the modification. The upper figure of FIG. 6 illustrates a first step S21. The first step S21 is substantially the same as the first step S11 of FIG. 5.

Specifically, the receiving transport unit 11 transports the check C fed out from the receiving transport unit 2 to the recognition unit 4 via the adjustment unit 3. When the recognition unit 4 recognizes that the check C is a rejected check RC, the main transport unit 12 stops transporting the rejected check RC as soon as the rejected check RC passes through the first diverter mechanism 124. When the main transport unit 12 stops transporting the rejected check RC, the receiving unit 2 also stops feeding out checks C, and the receiving transport unit 11 also stops transporting checks C.

In the subsequent second step S22, the main transport unit 12 transports the rejected check RC in the reverse direction (see solid arrow in S22). The reverse direction is the direction in which checks C are returned. Since the first diverter 1241 of the first diverter mechanism 124 is located at the second position, the rejected check RC that is transported from the temporary storage unit 5 side to the receiving unit 2 side is diverted to the first branch path 122.

The main transport unit 12 then transports the rejected check RC to the returning transport path 131, and the returning transport unit 13 transports the rejected check RC to the returning unit 7 along the returning transport path 131. The returning unit 7 holds the rejected check RC. The user can manually take the reject check RC from the returning unit 7. When the rejected check RC is taken, the check handling device 10 resumes handling checks. That is, the check handling device 10 returns to the first step S21 and performs the operation.

When all the checks C inserted into the receiving unit 2 are taken into the housing 101, the check handling device 10 performs the second step S12 of FIG. 5. As described above, the user performs a selection operation, and the temporary storage unit 5 feeds out the stored checks C. All the checks C stored in the temporary storage unit 5 are non-rejected checks. The checks C confirmed by the user are stored in the cassette 6, and the checks C not confirmed by the user are returned to the returning unit 7.

The check C returned while the check handling device 10 is receiving checks C is a rejected check RC, and the check C returned after the check handling device 10 received the checks C is a check not confirmed by the user. The user can thus distinguish whether the returned check C is a rejected check or a check not confirmed by the user.

In the modification of FIG. 6, the check transport direction may frequently switch between the forward direction and the reverse direction. Such frequent switching of the check transport direction can increase the handling time. The configuration example of FIG. 5 is advantageous in that the handling time is short because the check transport direction is not frequently switched.

The check handling device 10 may have a first operation mode shown in FIG. 5 and a second operation mode shown in FIG. 6, and the check handling device 10 may handle checks C in the operation mode selected from the first operation mode and the second operation mode. The user may select the first operation mode or the second operation mode as desired.

The check handling device 10 may select the first operation mode or the second operation mode according to the number of checks inserted into the receiving unit 2. For example, a detection unit that detects the number of checks inserted into the receiving unit 2 may be attached to the receiving unit 2, and the control unit 100 may select the first operation mode shown in FIG. 5 when the number of checks is a predetermined value or more based on a detection signal from the detection unit. When the number of checks is less than the predetermined value, the control unit 100 may select the second operation mode shown in FIG. 6. The operation of the check handling device 10 is optimized according to the number of checks to be processed. In an exemplary implementation, the detection unit may include circuitry or processing circuitry and be referred to as a detection circuit, such that a detection circuit detects a number of checks inserted into the receiving unit 2.

The control unit 100 may switch between the first operation mode and the second operation mode according to the user who uses the check handling device 10. The operation of the check handling device 10 is optimized for each user.

For example, the interface unit 102 may be an identification unit that identifies the user. The interface unit 102 may cause the user to perform an authentication operation and may specify the user based on the authentication result. The interface unit 102 may identify the user based on information on a deposit account designated by the user when the check handling device 10 handles checks. In an exemplary implementation, interface unit 102 may include circuitry and/or processing circuitry. Such circuitry and/or processing circuitry may be referred to as an identification circuit that is configured to perform an authentication operation of the user, perform processing to generate an authentication result, and/or identify the user based on the information on the deposit account designated by the user.

In the case where the operation mode can be switched between the first operation mode and the second operation mode, convenience of the check handling device 10 is improved.

Image Reacquisition Operation when Acquired Image is not Acceptable

When the quality of the image of the check C acquired by the recognition unit 4 does not satisfy the determination criteria, the recognition unit 4 and/or the control unit 100 recognizes that the check C is a rejected check. The rejected check is returned to the user in the manner described above. The user must take the rejected check from the returning unit 7 and reinsert it into the receiving unit 2. As the number of rejected checks increases, it takes more time and effort.

In order to reduce the number of rejected checks, it is only necessary to increase opportunities for the recognition unit 4 to acquire an image with high quality. Accordingly, when the quality of the image of the check does not satisfy the determination criteria, the check handling device 10 transports the check that has passed through the recognition unit 4 in the reverse direction. The recognition unit 4 can thus acquire an image of the check again. Reduction in image quality occurs due to various factors. However, as the recognition unit 4 reacquires the image of a check, the quality of the reacquired image can be expected to satisfy the determination criteria.

Figure 7:
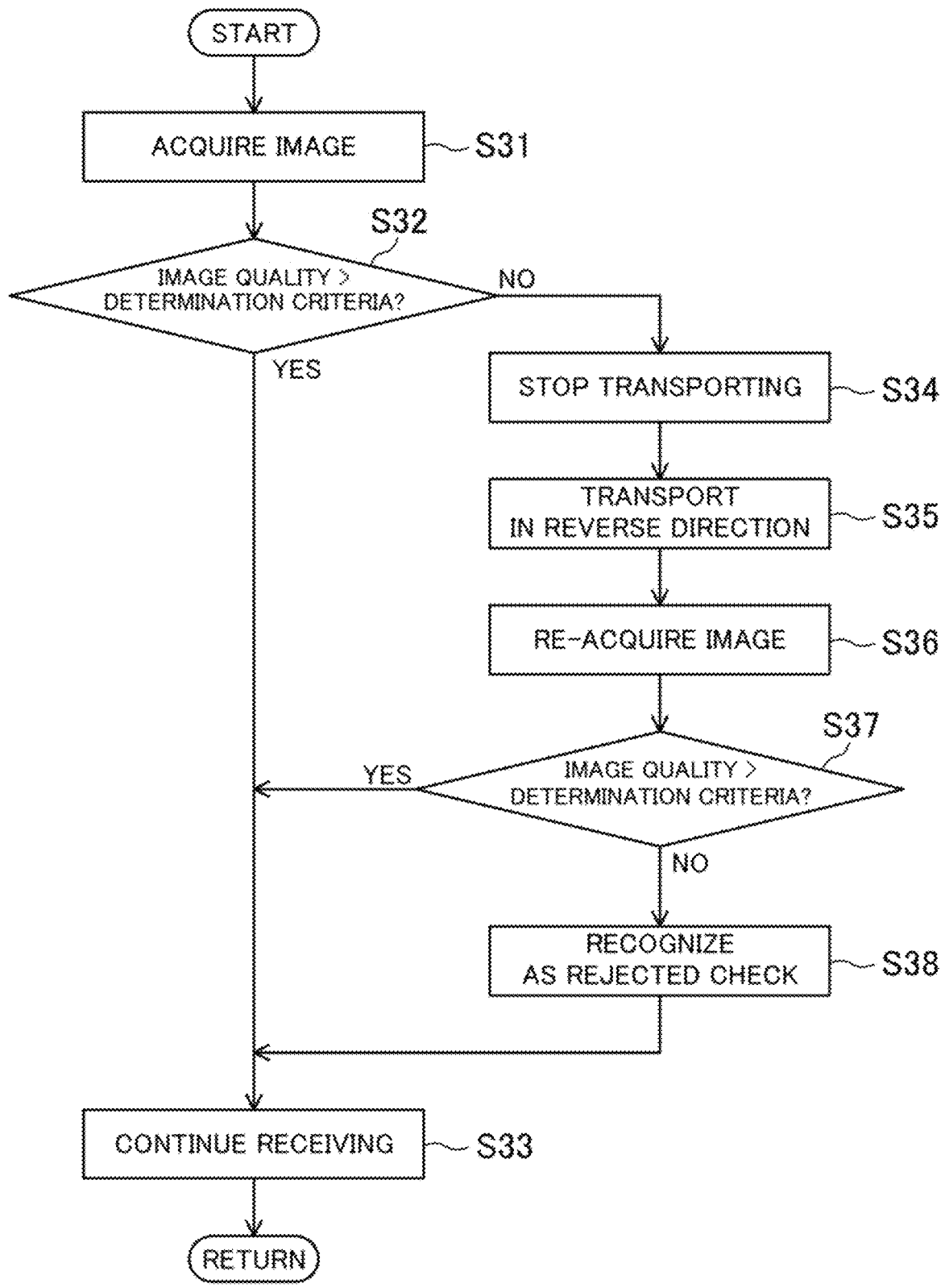
FIG. 7 is a flowchart illustrating an operation procedure for acquiring an image of a check.

The operation of the check handling device 10 regarding the reacquisition of an image will be described with reference to the flowchart of FIG. 7. First, in step S31, the recognition unit 4 acquires an image of the check to be handled. In the subsequent step S32, the recognition unit 4 and/or the control unit 100 determines whether the quality of the image of the check acquired by the recognition unit 4 satisfies the determination criteria.

When the quality of the image satisfies the determination criteria, the process proceeds to step S33 and the check handling device 10 continues to receive checks. The process then returns to step S31 and the recognition unit 4 acquires an image of the following check.

When the quality of the image does not satisfy the determination criteria, the process proceeds to step S34. The transport unit 1 stops transporting the check. Thereafter, in step S35, the main transport unit 12 transports the check in the reverse direction to return the check to a position closer to the receiving unit 2 than the recognition unit 4 is. The main transport unit 12 resumes transporting the check when the check returns to the position upstream of the recognition unit 4. The check is transported in the forward direction, and the recognition unit 4 acquires an image of the check again in step S36.

The quality of the newly acquired image may satisfy the determination criteria. In step S37, the recognition unit 4 and/or the control unit 100 determines whether the quality of the image of the check reacquired by the recognition unit 4 satisfies the determination criteria. When the quality of the image satisfies the determination criteria, the process proceeds to step S33. The recognition unit 4 and/or the control unit 100 recognizes that the check is a non-rejected check and continues to receive checks.

On the other hand, when the quality of the image does not satisfy the determination criteria, the process proceeds to step S38, and the recognition unit 4 and/or the control unit 100 recognizes that this check is a rejected check. The check handling device 10 then continues to receive checks.

Since the recognition unit 4 reacquires the image of the check, the number of rejected checks may be reduced.

In the above configuration, after the check is transported to the position upstream of the recognition unit 4, the recognition unit 4 reacquires an image of the check as it passes through the recognition unit 4 in the forward direction. However, the recognition unit 4 may requires an image of the check as it passes through the recognition unit 4 in the reverse direction. In this case, when the quality of the reacquired image does not satisfy the determination criteria, the recognition unit may further acquire an image of the check again as it passes through the recognition unit 4 in the forward direction. This may further reduce the number of rejected checks.

Check Bundling Operation

The check handling device 10 returns a rejected check and a check not confirmed by the user. There are cases where the check handling device 10 return a plurality of checks. As described above, the check handling device 10 stores all the received checks in the temporary storage unit 5, and when feeding out the checks from the temporary storage unit 5, the check handling device 10 returns a reject check and a check not confirmed by the user. It is therefore easier for the user to take the checks if they are returned together. Accordingly, in the case where there is a plurality of checks to be returned, the check handling device 10 stacks these checks and transports the stack of checks to the returning unit 7. The check handling device 10 has a mechanism for stacking checks.

As will be described later, the check handling device 10 adjusts the position and/or attitude of each received check in the short side direction. The edges in the short side direction of the stacked checks are therefore aligned.

Figure 8:
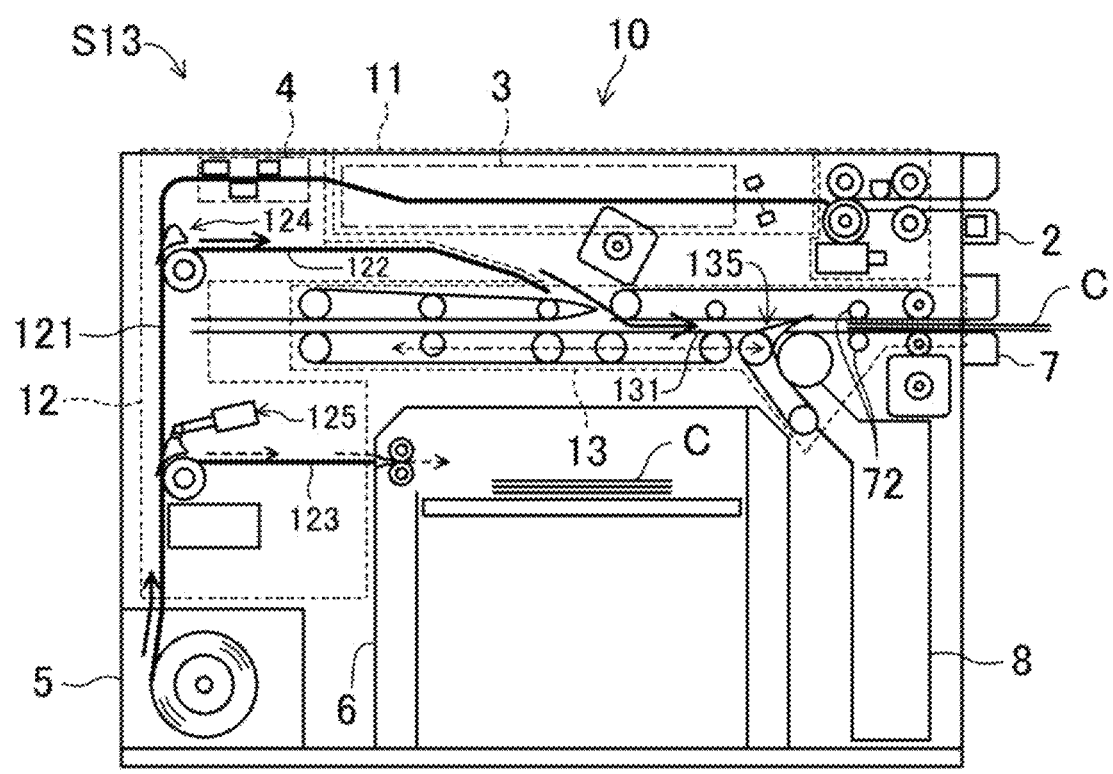
FIG. 8 illustrates an operation of the check handling device when stacking checks to be returned.

FIG. 8 illustrates the operation when the check handling device 10 stacks a plurality of checks. A third step S13 in FIG. 8 is performed after the first step S11 in FIG. 5. In the case where only one of the checks stored in the temporary storage unit 5 is to be returned, the check handling device 10 performs the second step S12 of FIG. 5 after the first step S11 of FIG. 5. In the case where two or more of the checks stored in the temporary storage unit 5 are to be returned, the check handling device 10 performs the third step S13 of FIG. 8 after the first step S11 of FIG. 5.

As in the second step S12, in the third step S13, the main transport unit 12 sends a check to be returned from the main transport path 121 to the first branch path 122 (see solid arrow in S13). The main transport unit 12 sends a check to be stored in the cassette 6 from the main transport path 121 to the second branch path 123 (see broken arrow in S13).

The main transport unit 12 transports the check to the returning transport path 131 along the first branch path 122. The check thus reaches the returning transport path 131 from the first branch path 122 (see solid arrow in S13).

When returning a plurality of checks, the returning transport unit 13 reciprocates each check along the returning transport path 131 and the retracting transport path 132 as shown by long dashed double-short dashed arrow. The main transport unit 12 transports the next check from the first branch path 122 to the returning transport path 131 so that the position of this check is aligned with the position of the check reciprocating along the returning transport path 131 and the retracting transport path 132. The checks are thus stacked at the position of the switching unit 133. The returning transport unit 13 reciprocates the stacked checks along the returning transport path 131 and the retracting transport path 132, and the main transport unit 12 transports the next check from the first branch path 122 to the returning transport path 131. In this manner, the next check can further be stacked on top of the stacked checks. By repeating this check stacking operation by the main transport unit 12 and the returning transport unit 13, the checks to be returned are stacked on top of each other.

When the required number of checks are stacked, the returning transport unit 13 transports the stack of checks to the returning unit 7. The third roller pair 72 of the returning unit 7 holds the stack of checks C as shown in FIG. 8.

Configuration of Switching Unit

The switching unit 133 operates so that the checks are stably stacked on top of each other. The configuration of the switching unit 133 will be described with reference to the drawings.

The returning transport path 131 and the retracting transport path 132 extend horizontally. The tip end of the first branch path 122 is located near the horizontal connection portion between the returning transport path 131 and the retracting transport path 132. The switching unit 133 is disposed between the first branch path 122 and the returning transport path 131 and the retracting transport path 132.

Figure 9:
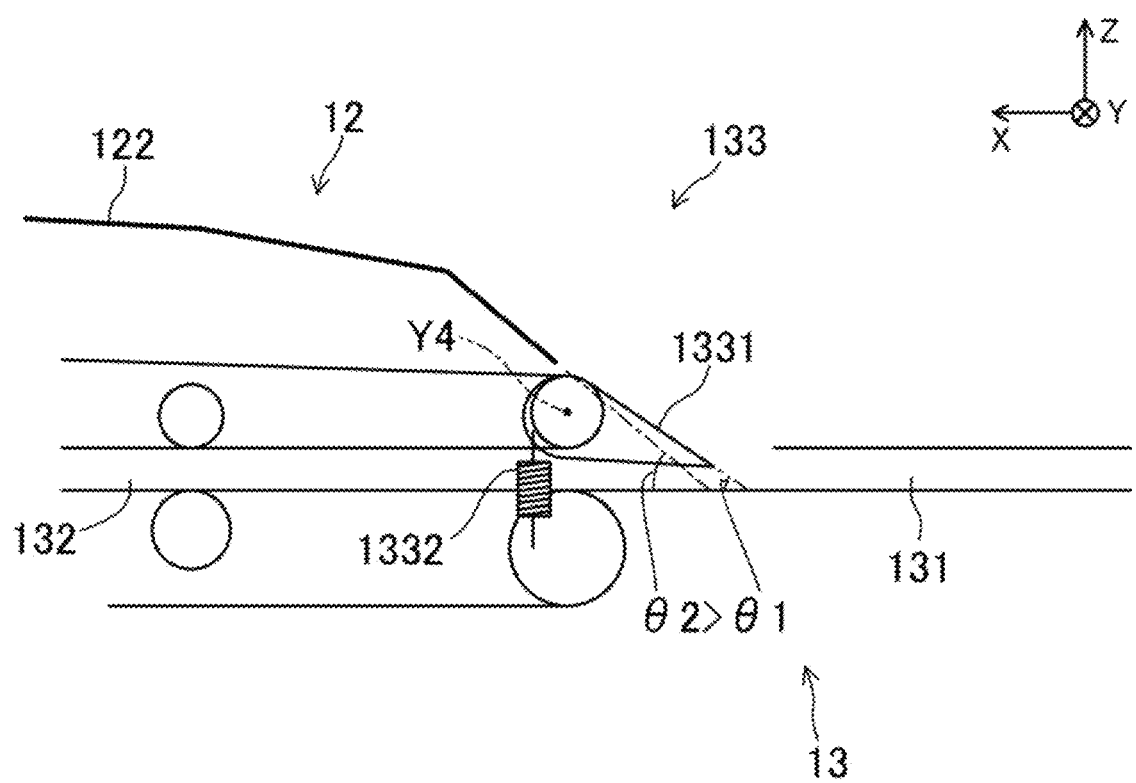
FIG. 9 is an enlarged view of a switching unit.

As shown in an enlarged view of FIG. 9, the switching unit 133 includes a switching claw 1331 and a fourth biasing member 1332. The switching claw 1331 has a wedge shape with a tapered tip end. The base end of the switching claw 1331 is pivotally supported. The switching claw 1331 rotates about a fourth axis of rotation Y4 that is perpendicular to the check transport direction. The switching claw 1331 changes its orientation between a first attitude shown in the lower figure of FIG. 10 and a second attitude shown in the upper figure of FIG. 10.

When the switching claw 1331 is in the second attitude, the tip end of the switching claw 1331 is separated upward with respect to the returning transport path 131. In this case, the returning transport path 131 and the retracting transport path 132 communicate with each other, and the first branch path 122 and the returning transport path 131 do not communicate with each other.

When the switching claw 1331 is in the first attitude, the tip end of the switching claw 1331 is located close to the returning transport path 131. In this case, the returning transport path 131 and the retracting transport path 132 do not communicate with each other, and the first branch path 122 and the returning transport path 131 communicate with each other.

The fourth biasing member 1332 is connected to the switching claw 1331. The fourth biasing member 1332 biases the switching claw 1331 to the second attitude. FIG. 9 illustrates the switching claw 1331 in the first attitude. In the configuration example of FIG. 9, the fourth biasing member 1332 is a tension coil spring. The fourth biasing member 1332 may be, e.g., a torsion spring or a helical compression spring instead of the tension coil spring.

Next, the operations of the main transport unit 12 and the returning transport unit 13 when stacking a plurality of checks at the switching unit 133 will be described in detail with reference to the transition diagrams of FIGS. 10 to 13.

Figure 10:
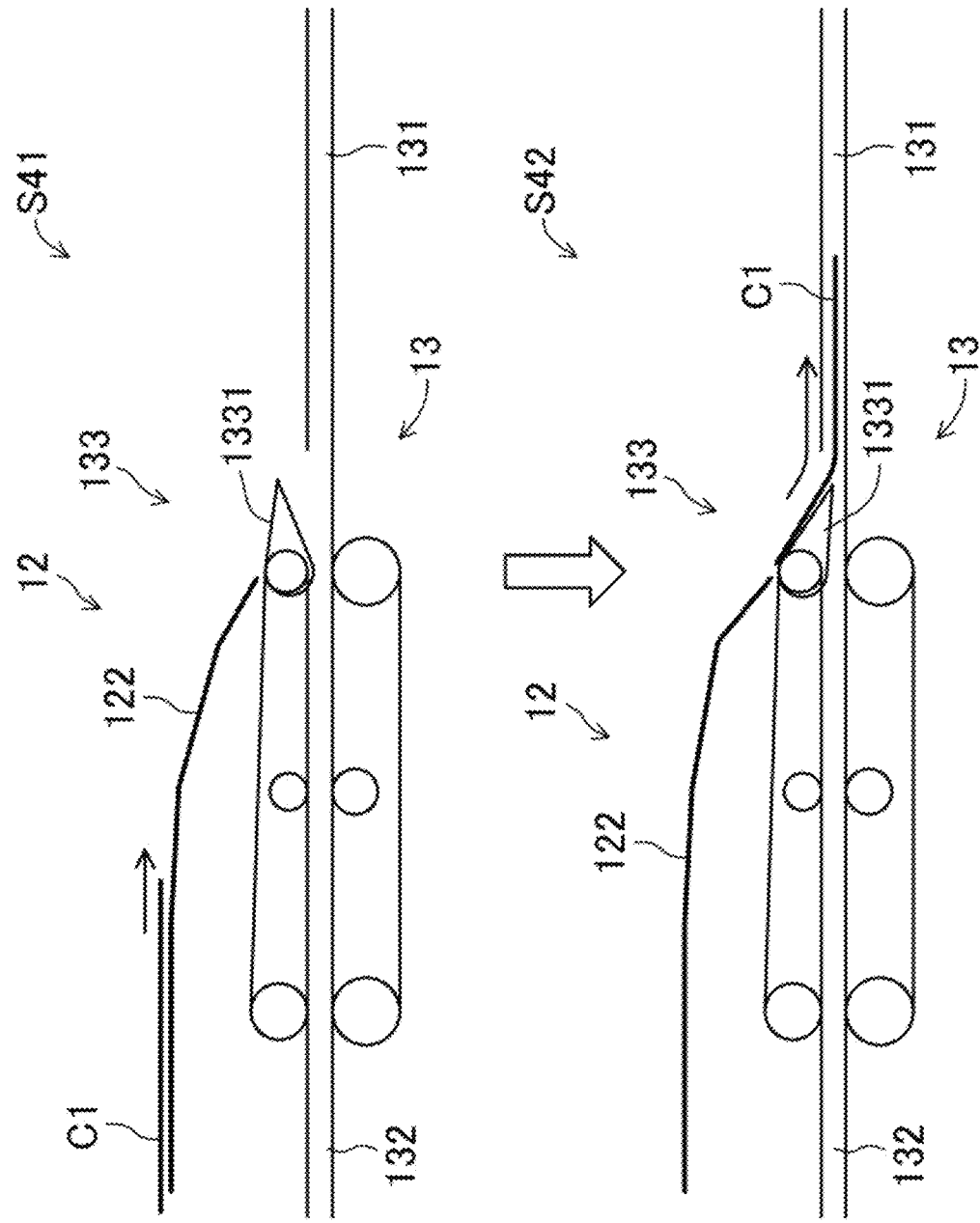
FIG. 10 illustrates a part of an operation procedure that is followed by a transport unit when stacking a plurality of checks.

The upper figure of FIG. 10 illustrates a first step S41. As described above, the main transport unit 12 transports a check C1 to be returned along the first branch path 122 toward the returning transport path 131. The check C1 comes into contact with the switching claw 1331 biased by the fourth biasing member 1332 (see FIG. 9). The switching claw 1331 is pushed by the check C1 being transported and is rotated from the second attitude to the first attitude. The switching claw 1331 connects the first branch path 122 and the returning transport path 131, and the check C1 is sent from the first branch path 122 to the returning transport path 131 (see second step S42 in the lower figure of FIG. 10). The main transport unit 12 and the returning transport unit 13 continue to transport the check C1 until the entire length of the check C1 is placed on the returning transport path 131. The first check C1 is thus transported to the returning transport path 131.

Figure 11:
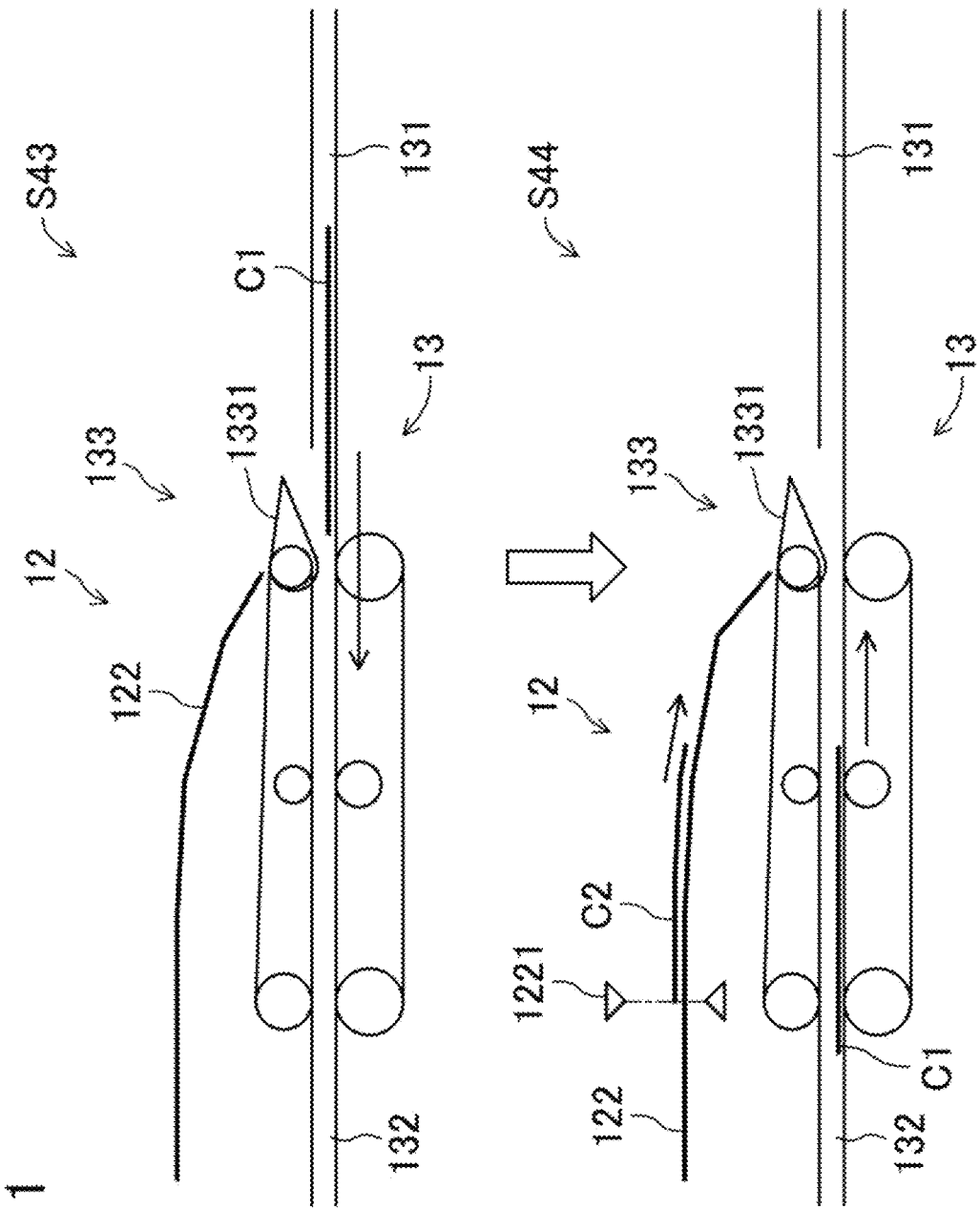
FIG. 11 illustrates a part of the operation procedure that is followed by the transport unit when stacking a plurality of checks.

Next, as illustrated in a third step S43 of the upper figure of FIG. 11, the returning transport unit 13 transports the first check C1 transported to the returning transport path 131 from the returning unit 7 in the direction away from the returning unit 7 along the returning transport path 131. The switching claw 1331 is biased to the second attitude by the fourth biasing member 1332 (see FIG. 9). The returning transport path 131 and the retracting transport path 132 communicate with each other. The first check C1 reaches the retracting transport path 132 from the returning transport path 131. When the first check C1 reaches the returning transport path 132, the returning transport unit 13 stops transporting the first check C1. The first check C1 therefore waits on the retracting transport path 132 (see the lower figure of FIG. 11).

As soon as the first check C1 waits on the retracting transport path 132, the main transport unit 12 transports a second check C2 to the returning transport path 131 along the first branch path 122 as illustrated in a fourth step S44 in the lower figure of FIG. 11. When a passage sensor 1221 provided on the first branch path 122 detects an edge of the second check C2, namely the trailing edge of the second check C2 in the transport direction in the illustrated example, the returning transport unit 13 resumes transporting the first check C1 (see arrow in S44).

Figure 12:
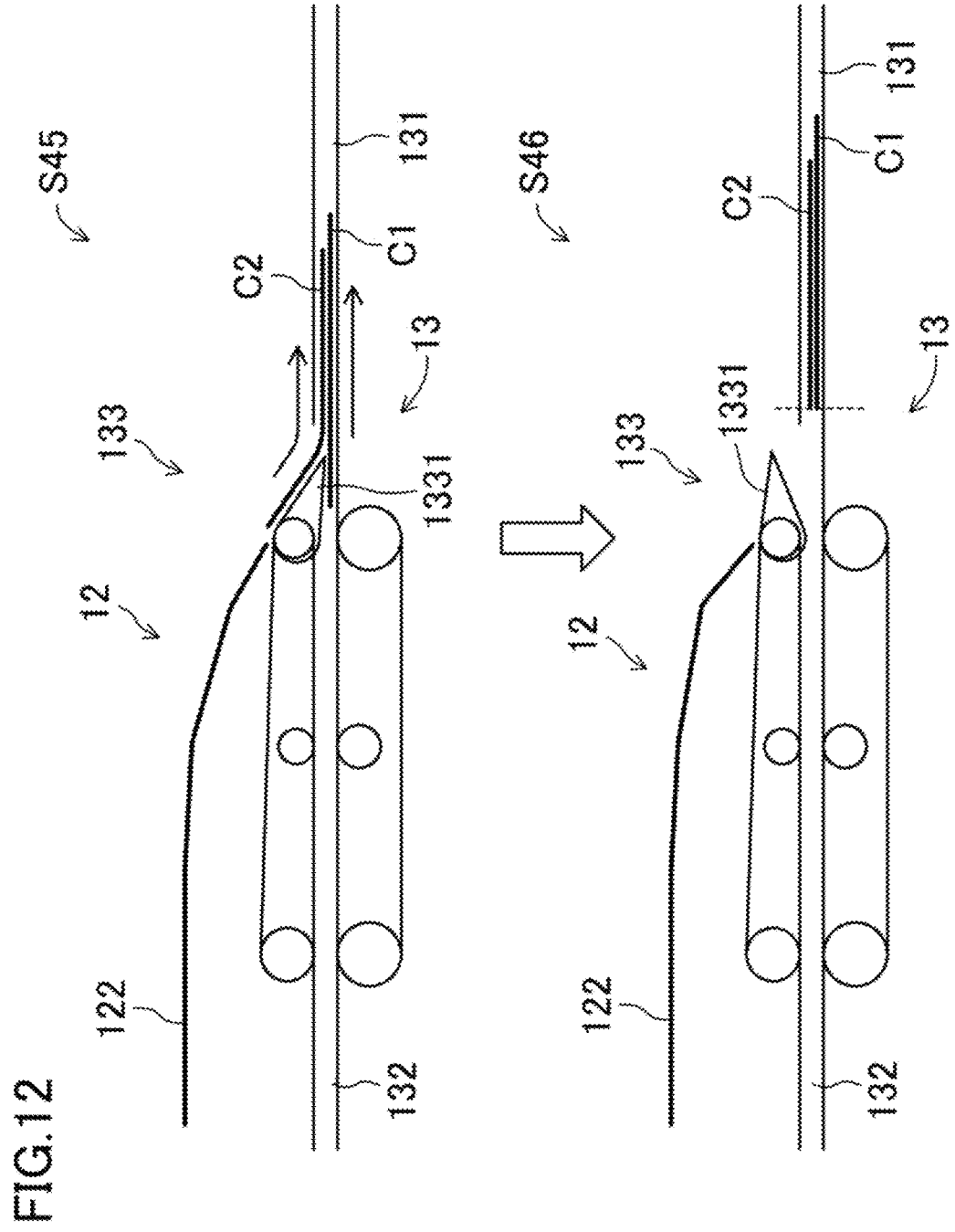
FIG. 12 illustrates a part of the operation procedure that is followed by the transport unit when stacking a plurality of checks.

As illustrated in a fifth step S45 of the upper figure of FIG. 12, the second check C2 that is transported from the first branch path 122 to the returning transport path 131 is stacked on top of the first check C1 that is transported from the retracting transport path 132 to the returning transport path 131 at the position of the switching unit 133.

As shown in FIG. 9, when the switching claw 1331 of the switching unit 133 is in the first attitude, a tilt angle θ1 of the switching claw 1331 with respect to the returning transport path 131 is smaller than a tilt angle θ2 of the downstream end of the first branch path 122, more specifically the end of the first branch path 122 connected to the switching claw 1331, with respect to the returning transport path 131. This reduces the difference in angle between the check C1 that is transported horizontally along the retracting transport path 132 and the returning transport path 131 and the check C2 that is stacked on top of the check C1.

Since the switching claw 1331 biased by the fourth biasing member 1332 is pushed by the check C2 and rotated, the angle of the switching claw 1331 is automatically adjusted to an optimal angle when the checks C1, C2 are stacked on each other.

With these configurations, another check C2 is stably stacked on top of the check C1 that is horizontally transported along the retracting transport path 132 and the returning transport path 131. The checks C1, C2 are thus restrained from being jammed in the switching unit 133.

The control unit 100 synchronizes transport of the second check C2 by the main transport unit 12 and transport of the first check C1 by the returning transport unit 13. The trailing edge of the first check C1 is thus aligned with the trailing edge of the second check C2 stacked on top of the first check C1, as illustrated in a sixth step S46 of the lower figure of FIG. 12. In the example of FIG. 12, the first check C1 and the second check C2 are different in size. The trailing edge of the check means the trailing edge in the travel direction of the check based on the transport direction toward the returning unit 7.

After the first check C1 and the second check C2 are stacked on top of each other, the returning transport unit 13 transports the two stacked checks C1, C2 in the direction away from the returning unit 7 along the returning transport path 131 and the retracting transport path 132. The two stacked checks C1, C2 thus reach the retracting transport path 132. The two stacked checks C1, C2 wait on the retracting transport path 132 (see the upper figure of FIG. 13).

Figure 13:
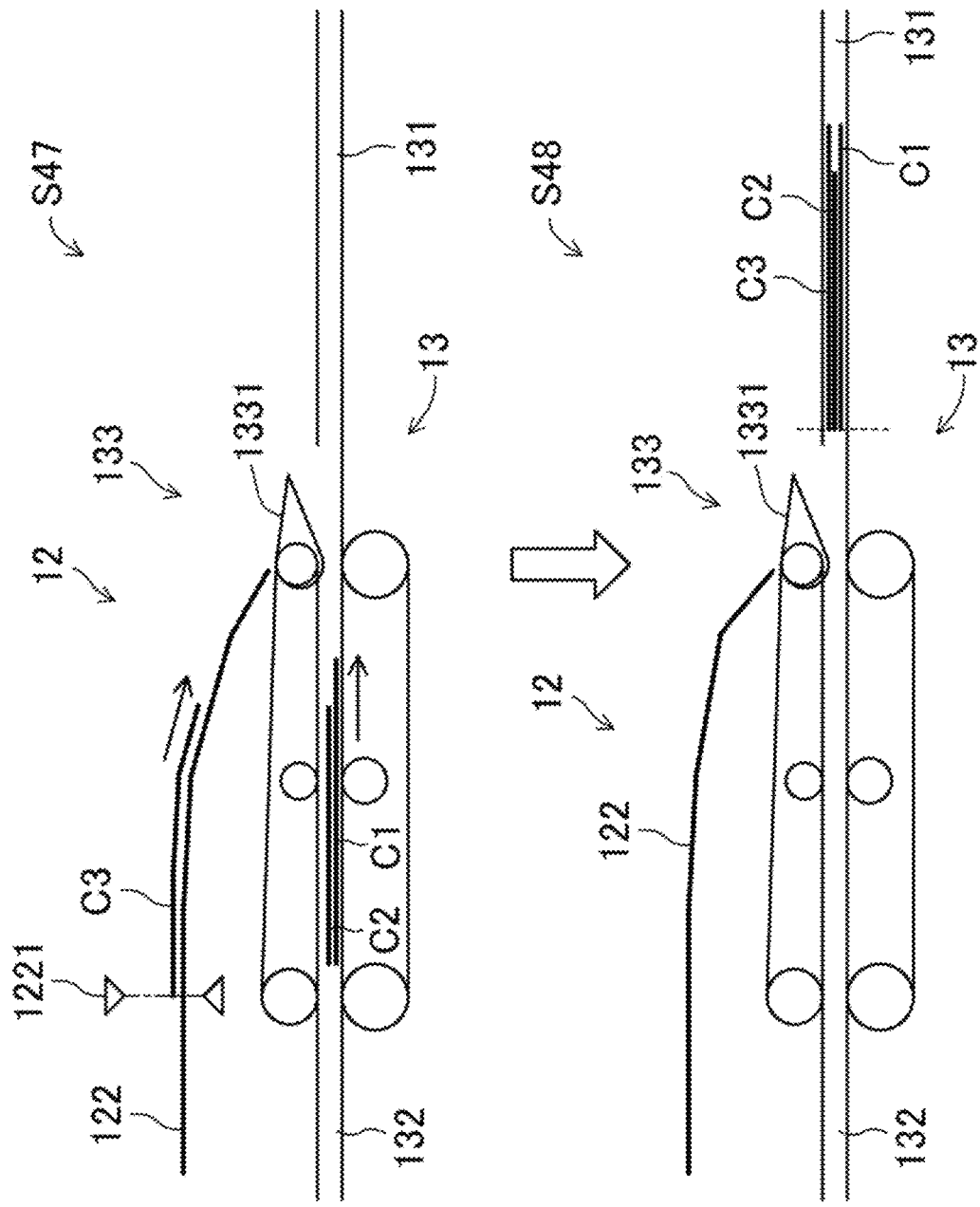
FIG. 13 illustrates a part of the operation procedure that is followed by the transport unit when stacking a plurality of checks.

As illustrated in a seventh step S47 of the upper figure of FIG. 13, the main transport unit 12 transports a third check C3 from the first branch path 122 to the returning transport path 131. As described above, when the passage sensor 1221 detects an edge of the check C3, the returning transport unit 13, the returning transport unit 13 resume transporting the stacked checks C1, C2 waiting on the returning transport path 132. The third check C3 reaches the switching unit 133 at the timing the two checks C1, C2 reach the switching unit 133. As illustrated in an eighth step S48 in the lower figure of FIG. 13, the third check C3 is stacked on top of the two stacked checks C1, C2. The trailing edges of the three checks C1, C2, and C3 are aligned with each other.

The main transport unit 12 and the returning transport unit 13 can stack a desired number of checks by repeating the steps described above. Due to the structural restriction of the returning transport path 131 and the retracting transport path 132, there is an upper limit on the number of checks that can be stacked. The returning transport path 131 and the retracting transport path 132 may be configured so that the height in the vertical direction of the check transport space in each of the returning transport path 131 and the retracting transport path 132 is greater than the overall thickness of the maximum number of checks that can be inserted into the inlet 21 by a single insertion operation of the user (the overall height in the vertical direction of the maximum number of checks that can be received by the inlet 21). With this configuration, the checks to be returned out of the checks inserted by the single insertion operation of the user can be returned to the user at a time.

When the required number of checks are stacked on top of each other, the returning transport unit 13 sends the bundle of checks to the returning unit 7 along the returning transport path 131. As shown in FIG. 8, the third roller pair 72 in the returning unit 7 sandwiches the bundle of checks therebetween in the vertical direction. The user can thus take the checks at a time from the return outlet 71.

The third roller pair 72 sandwiches therebetween the part of the bundle of checks located closer to the trailing edge than the middle of the bundle is. The trailing edges of the stacked checks are aligned with each other. The third roller pair 72 can therefore sandwich all the stacked checks therebetween, and a part of the stacked checks is less likely to drop from the return outlet 71. As the third roller pair 72 sandwiches the part of the bundle of checks located closer to the trailing edge than the middle of the bundle is. The stacked checks can thus be caused to protrude to a great extent from the return outlet 71. This makes it easier for the user to take the returned checks.

The check handling device 10 having this configuration can stack a new check on one or more checks by using the returning transport path 131, the retracting transport path 132, and the first branch path 122. Since another check is stacked on top of one or more checks that are transported horizontally, the check handling device 10 can stably stack the checks.

The overall weight of the checks increases as the number of stacked checks increases. However, even when the overall weight of the checks increases, the check handling device 10 can stably stack the next check.

Since the returning transport path 131 is connected to the returning unit 7 and the first branch path 122 joins the returning transport path 131, the check handling device 10 can stack the checks to be returned on top of each other immediately before transporting these checks to the returning unit 7.

By adjusting the timing that the returning transport unit 13 resumes transporting the checks waiting on the retracting transport path 132, the check handling device 10 can also align the leading edges of the checks with each other.

In the case where the leading edges of the checks are aligned, all the leading edges of the checks protruding from the return outlet 71 are aligned. The user can therefore reliably take all the returned checks by hand and is less likely to miss a part of the checks or leave a part of the checks behind.

By using size information on the checks, the check handling device 10 can also align the middles of the checks instead of aligning the edges of the checks.

Which parts of the checks are to be aligned (check alignment position) may be set in advance as the initial setting of the check handling device 10. For example, the person in charge of managing the check handling device 10 may set the check alignment position by operating the interface unit 102. The check handling device 10 may change the check alignment position according to various factors such as the handling content of the check handling device 10 or the number of checks to be returned. The check handling device 10 may change the check alignment position according to the user. The check handling device 10 may identify the user through the user's operation of the interface unit 102. The user may specify the check alignment position when using the check handling device 10. The interface unit 102 is an example of an input unit for entering information for changing the check alignment position.

Operation when Returned Check is Left Behind

The user may forget to take the check returned to the return outlet 7. With the returned check left behind in the return outlet 7, the next user cannot perform a process using the check handling device 10. Moreover, with the returned check left behind in the return outlet 7, it reduces security of the check handling device 10. The check handling device 10 is configured to take (retract) the check therein when the check is left behind.

The control unit 100 can determine whether there is any check left behind, based on a signal from a sensor for detecting whether there is a check. This sensor is provided in the returning unit 7. For example, when the returning unit 7 has been holding a check for a predetermined time, the control unit 100 determines that the check has been left behind. When the control unit 100 determines that there is any check left behind, the third roller pair 72 of the returning transport unit 13 is driven to retract this check into the housing 101. The check is thus transported along the returning transport path 131 in the opposite direction to the returning direction. The third diverter 1351 is biased to the second position. The check transported in the opposite direction is diverted from the returning transport path 131 to the third branch path 134 by the third diverter 1351. As shown in step S51 in the upper figure of FIG. 14, the check C4 is stored in the retracting unit 8 through the third branch path 134. Since the check C4 left behind is stored in the retracting unit 8, the next user can cause the check handling device 10 to perform a check handling process. This can avoid the check handling process stagnating due to the check left behind.

Even if a check C5 is newly left behind with the check C4 stored in the retracting unit 8, the check handling device 10 retracts the check C5 into the housing 101.

In this case, the first check C4 stored in the retracting unit 8 and the check C5 subsequently retracted into the housing 101 must be separated because the users are different.

Figure 14:
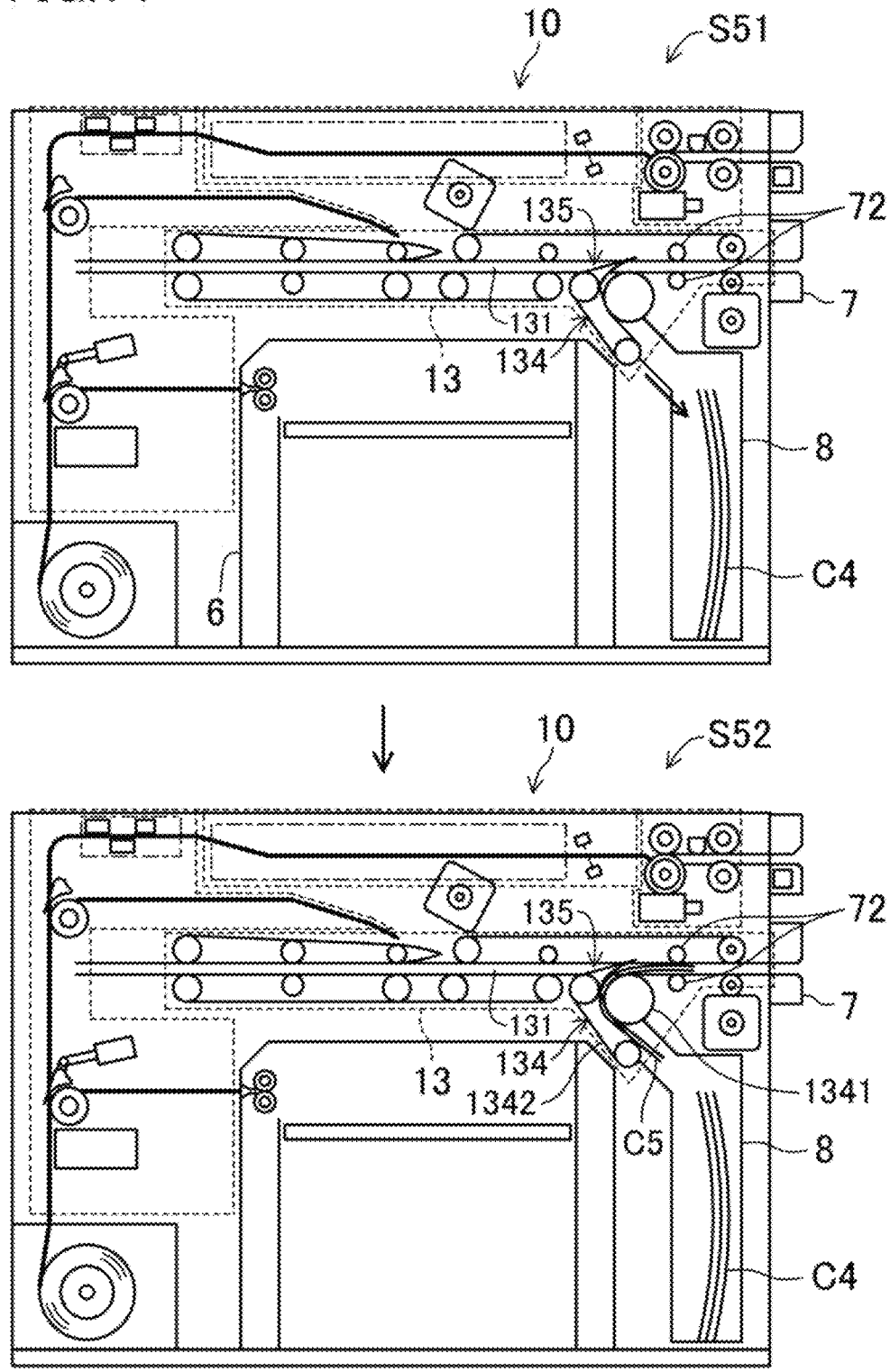
FIG. 14 illustrates an operation of the check handling device when collecting a check left behind.

The check handling device 10 holds the check C5 retracted into the housing 101 in a part of the returning transport path 131 and the third branch path 134 as shown in step S52 in the lower figure of FIG. 14. More specifically, the roller 1341 and the transport belt 1342 hold the check C5. The roller 1341 and the transport belt 1342 can stably hold a bundle of stacked checks. A part of the check C5 is sandwiched between the third roller pair 72 disposed in the returning transport path 131. Retracting the check left behind into the housing 101 improves the security of the check handling device 10.

After a check is left behind for the second time (that is, the check C5 in this example) and the check C5 is retracted into the housing 101, the check handling device 10 contacts the person in charge of managing the check handling device 10 through the communication unit 104. This is because the check handling device 10 cannot continue to handle checks due to a part of the retracted check C5 being located in the returning transport path 131.

The person in charge of managing the check handling device 10 opens the retracting unit 8 and manually takes the check C4 out of the retracting unit 8. The person in charge of managing the check handling device 10 then performs a predetermined operation to cause the check C5 left behind and held in an intermediate part of the returning transport path 131 and the third branch path 134 to be transported in the reverse direction and stored in the retracting unit 8. Since the third roller pair 72 sandwiches a part of the check C5 therebetween, the check C5 can be transported to the retracting unit 8. The person in charge of managing the check handling device 10 manually takes the check C5 out of the retracting unit 8. The person in charge of managing the check handling device 10 can collect the checks C4, C5 left behind in a separated manner.

The check handling device 10 takes both the check left behind for the first time and the check left behind for the second time into the housing 101. It is therefore not necessary for the person in charge of managing the check handling device 10 to go to the physical location of the check handling device 10 and remove the check every time the check is left behind. The operation of the check handling device 10 is thus simplified, and the work burden on the person in charge of managing the check handling device 10 is reduced. FIG. 14 shows an example in which the check left behind for the first time and the check left behind for the second time are taken into the housing 101 in a separated manner. However, the check handling device 10 may be configured to take the check left behind for the first time, the check left behind for the second time, and the check left behind for the third time into the housing 101 in a separated manner. This configuration may be achieved by increasing the length of the transport region between the returning unit 7 and the retracting unit 8 (the region between the third diverter mechanism 135 in the third transport path 131 and the returning unit 7, and the third branch path 134).

The third roller pair 72 may transport the check C5 left behind and held in the intermediate part of the returning transport path 131 and the third branch path 134 in the forward direction so that the returning unit 7 holds the check C5.

The third diverter mechanism 135 having the third biasing member 1352 can switch the check transport direction with a simple configuration. This is advantageous in reducing the cost of the check handling device 10.

Modification of Check Retracting Operation

Figure 15:
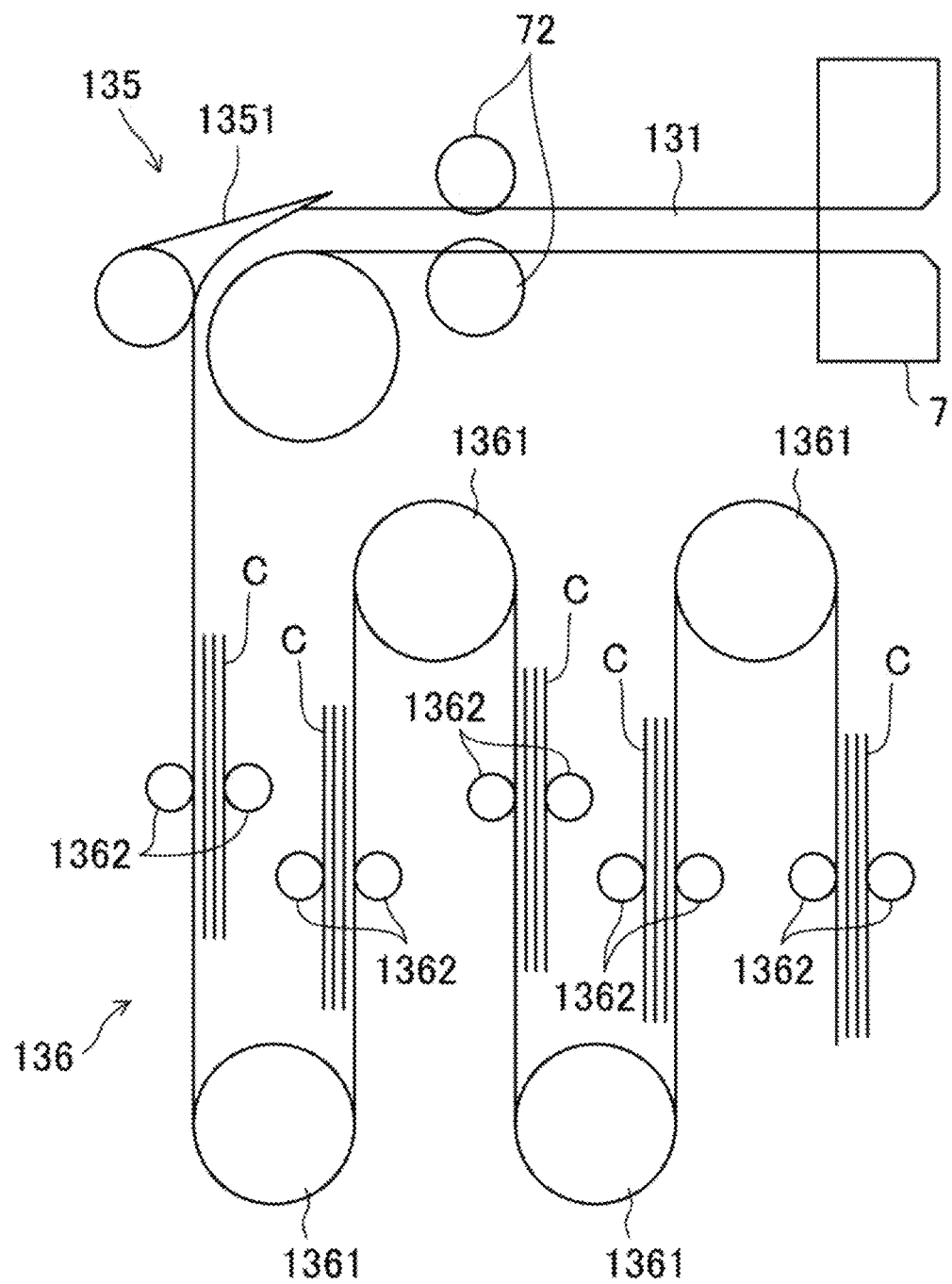
FIG. 15 illustrates a modification of a retracting unit.

FIG. 15 illustrates a modification regarding the check retracting retraction. In this modification, a fourth branch path 136 diverging from the returning transport path 131 is configured to hold a plurality of bundles of checks C. In this modification, the retracting unit 8 may be omitted, or the retracting unit 8 may be provided at the end of the fourth branch path 136.

The fourth branch path 136 shown in FIG. 15 has four turns 1361. The transport path for transporting the check C is turned up and down at each turn 1361. The transport path may be turned horizontally at a turn.

A fourth roller pair 1362 for holding one or more checks C by sandwiching the check(s) C therebetween is disposed in each part between the turns 1361. Each fourth roller pair 1362 holds a check C left behind. In the configuration example of FIG. 15, each of the five fourth roller pairs 1362 holds a different check(s) C left behind. The fourth branch path 136 can thus separately hold a multiplicity of checks C within a relatively small space. When the person in charge of managing the check handling device 10 collects the checks C, the transport unit may sequentially transport the checks C in the fourth transport path 136.

Figure 16:
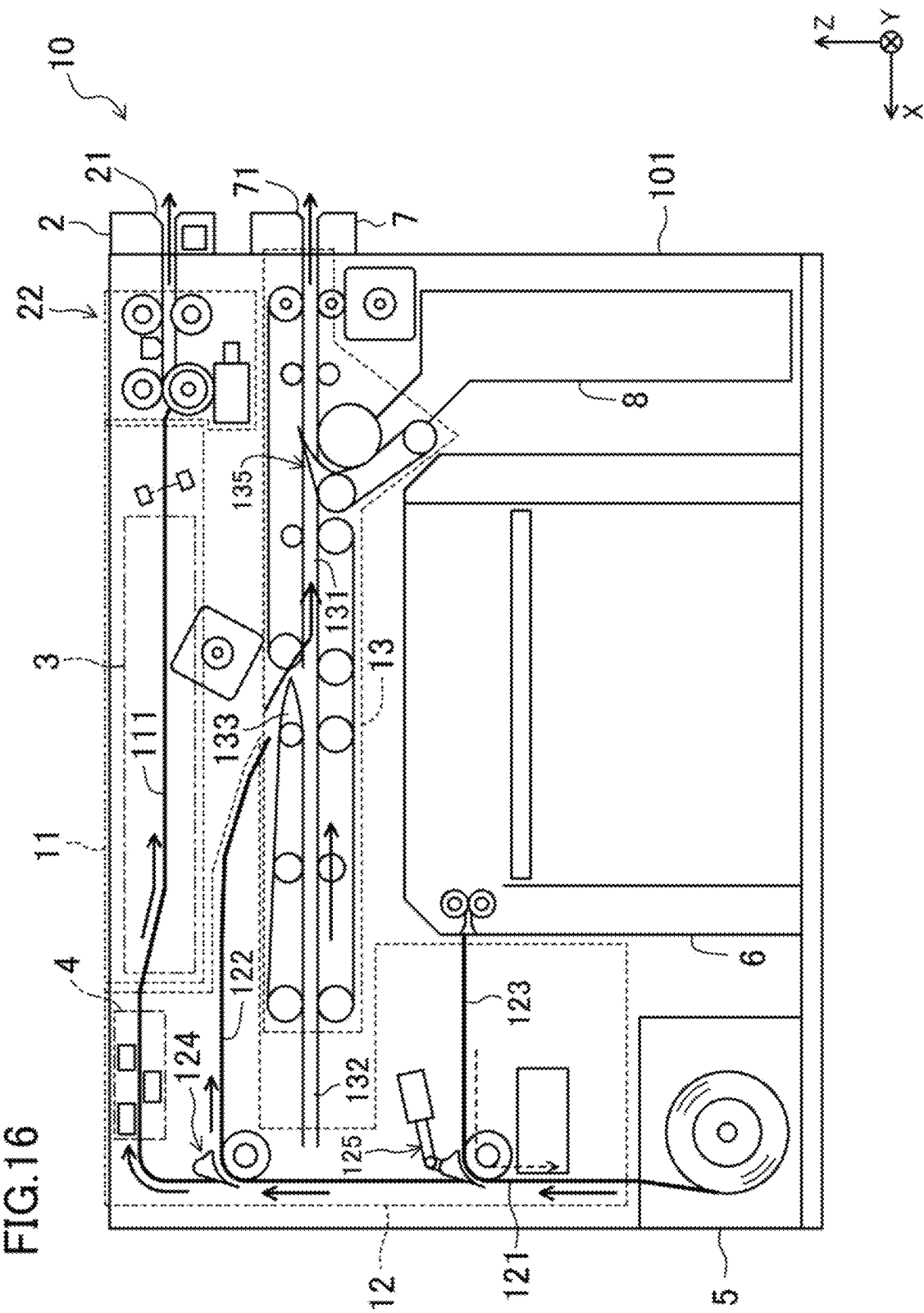
FIG. 16 illustrates an operation of returning a check on a transport path when a transport error occurs.

Operation in Case of Transport Error FIG. 16 shows a check return route on each transport path in case a transport error occurs during the handling operation of the check handling device 10. For example, the transport error is jamming of a check(s). The check handling device 10 is configured so as to be automatically restored as much as possible when the transport error occurs.

When a check is jammed, the transport unit 1 transports the check in the reverse direction. The jammed check may be able to be transported in this manner. The transport unit 1 discharges any check remaining in an intermediate part of each transport path to the outside of the housing 101 by transporting the check in the direction shown by arrows in FIG. 16.

The receiving transport unit 11 transports a check in the receiving transport path 111 toward the receiving unit 2, as shown by solid arrow in FIG. 11. The receiving unit 2 rotates the feeding mechanism 22 in the reverse direction. The check is discharged to the outside of the housing 101 through the inlet 21. When a transport error occurs, the check handling device 10 instructs the user in advance through the interface unit 102 to remove the check inserted in the receiving unit 2.

The main transport unit 12 first transports a check in the second branch path 123 to the main transport path 121 through the second diverter mechanism 125, as shown by dashed arrow in FIG. 16. The second diverter mechanism 125 is positioned at the second position. The check is transported to the temporary storage unit 5. After all the checks in the second branch path 123 are transported to the main transport path 121, the second diverter mechanism 125 is switched to the first position. The main transport unit 12 then transports the checks in the main transport path 121 toward the receiving unit 2.

The check located on the receiving unit 2 side with respect to the first diverter mechanism 124 in the main transport path 121 is transported to the receiving transport path 111 of the receiving transport unit 11. Thereafter, as described above, the receiving transport unit 11 and the receiving unit 2 discharge the check to the outside of the housing 101 through the receiving inlet 21.

The check located on the temporary storage unit 5 side with respect to the first diverter mechanism 124 in the main transport path 121 is transported to the first branch path 122 because the first diverter mechanism 124 is biased to the second position.

The main transport unit 12 also transports the check in the first branch path 122 toward the returning transport path 131. This is the same as the above transport operation that is performed when returning a check. The check is transported to the returning transport path 131.

The returning transport unit 13 transports the check in the retracting transport path 132 and the returning transport path 131 toward the returning unit 7. This is also the same as the above transport operation that is performed when returning a check. The check is discharged to the outside of the housing 101 through the return outlet 71.

As described above, after a transport error occurs, the check remaining in each transport port is discharged to the outside of the housing 101 through the receiving unit 2 or the returning unit 7. The user reinserts the checks that have not been processed, including the discharged check, into the receiving unit 2 to resume the check handling operation.

When the check handling device 10 cannot be restored by the above operation, the check handling device 10 contacts the person in charge of managing the check handling device 10 through the communication unit 104. In this case, this person corrects the error.

Sensor Arrangement

Figure 17:
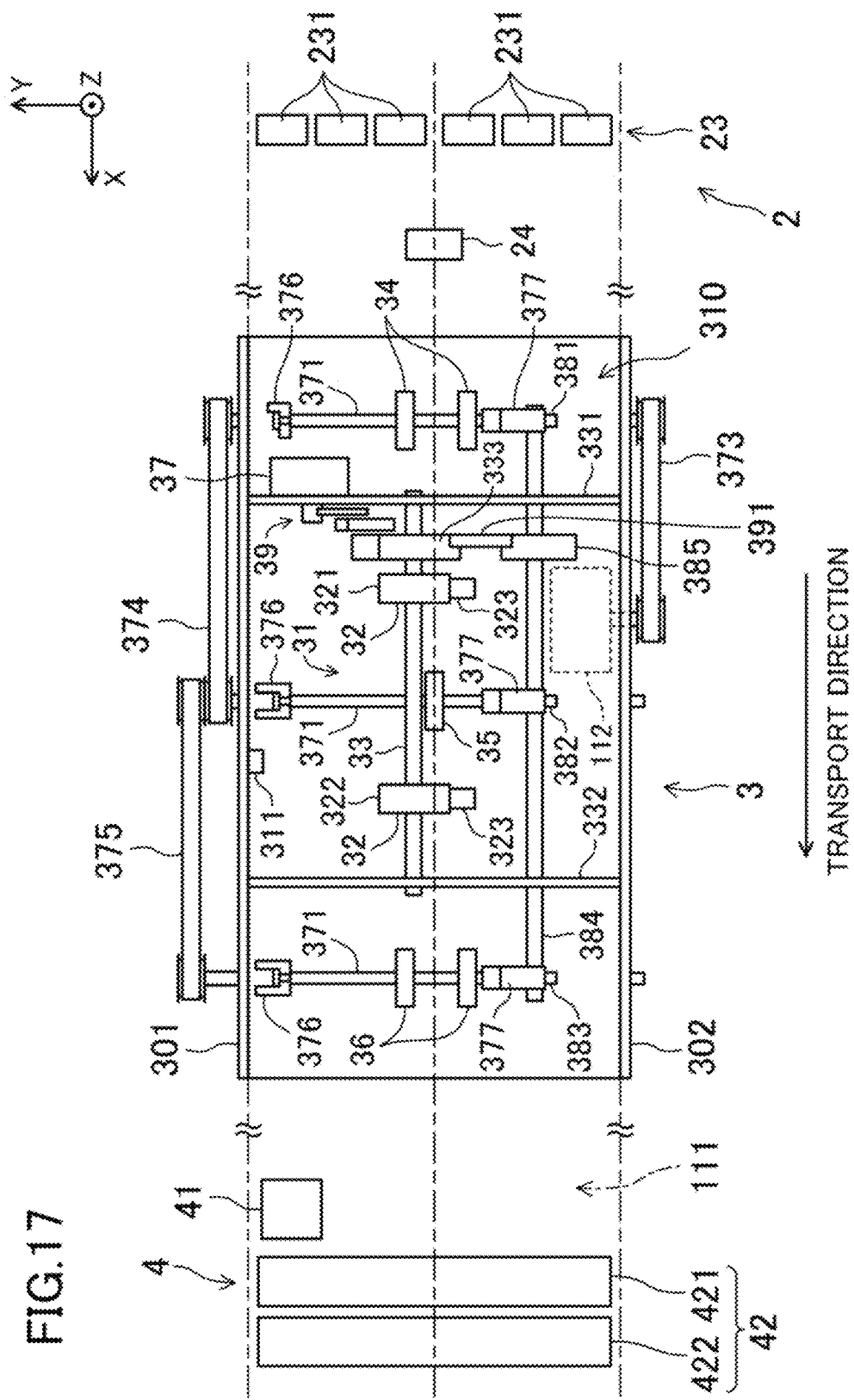
FIG. 17 is a plan view of an adjustment unit.

FIG. 17 illustrates the positional relationship between the adjustment unit 3 and each sensor. The horizontal direction in the paper of FIG. 17 corresponds to the depth direction of the housing 101. When a check is received, the check is transported from right to left in the paper of FIG. 17. The foreign object detection sensor 23 and the double feed detection sensor 24 are arranged upstream of the adjustment unit 3 in the transport direction. The MICR 41 and the CIS 42 of the recognition unit 4 are disposed downstream of the adjustment unit 3 in the transport direction.

As described above, the foreign object detection sensor 23 detects a metal foreign object on the check. The foreign object detection sensor 23 is composed of a magneto-resistive sensor 231. The foreign object detection sensor 23 has a plurality of the magneto-resistive elements 231. In the configuration example of FIG. 17, the foreign object detection sensor 23 has six magneto-resistive elements 231 arranged in a row in the lateral direction of the transport path. The six magneto-resistive elements 231 are arranged along the entire width of the transport path. The lateral direction of the transport path is a direction perpendicular to the check transport direction and is a direction along the short side of the check.

As the check moves relative to the magneto-resistive elements 231 arranged in a row, the foreign object detection sensor 23 can scan the entire front of the check in the long side direction of the check. The foreign object detection sensor 23 can detect whether there is any foreign object on the entire check.

The mounting structure of the foreign object detection sensor 23 will be described with reference to FIG. 18. FIG. 18 illustrates the configuration of the receiving unit 2 as viewed from the side. As described above, the receiving unit 2 has the first roller pair 221 and the second roller pair 222 that are arranged at an interval in the depth direction. The foreign object detection sensor 23 is disposed between the first roller pair 221 and the second roller pair 222.

The receiving unit 2 has an upper wall 25 and a lower wall 26. The upper wall 25 forms the upper surface of the transport path, and the lower wall 26 forms the lower surface of the transport path. The foreign object detection sensor 23 is disposed on the upper wall 25.

However, the foreign object detection sensor 23 may be disposed on the lower wall 26.

The upper wall 25 has a recessed portion 251 that is recessed downward. The foreign object detection sensor 23 is attached to the recessed portion 251. Due to the presence of the recessed portion 251, the lower end of the foreign object detection sensor 23 is located near the check C being transported (see arrows in FIG. 18). Since the distance between the foreign object detection sensor 23 and the check C is small, detection accuracy of the foreign object detection sensor 23 is improved.

The first roller pair 221 and the second roller pair 222 are arranged so as to hold the check C in front of and behind the foreign object detection sensor 23, respectively. The distance between the foreign object detection sensor 23 and the check C is therefore always constant or almost constant, and the foreign object detection sensor 23 can accurately detect a foreign object on the check C.

The spacing in the height direction of the transport path is reduced at the position of the foreign object detection sensor 23. However, since this position is between the first roller pair 221 and the second roller pair 222, the check is stably transported.

As illustrated in FIG. 1, the foreign object detection sensor 23 is disposed at a position away from the first electric motor 224 for transporting the checks in the receiving unit 2, the first actuator 211 for opening and closing the shutter, the second actuator 223 for intermittently feeding out the checks, and the second electric motor 112 for transporting the checks in the receiving transport unit 11. The foreign object detection sensor 23 is less susceptible to noise generated by the electric motors 224, 112 and the actuators 211, 223. This also improve the detection accuracy of the foreign object detection sensor 23.

The double feed detection sensor 24 is disposed downstream of the foreign object detection sensor 23 in the transport direction. The double feed detection sensor 24 detects double feed of the checks. As illustrated in FIG. 17, the double feed detection sensor 24 is disposed in the middle portion in the lateral direction (Y direction) of the receiving transport path 111. The double feed detection sensor 24 is, e.g., an ultrasonic sensor. As illustrated in FIG. 1, the double feed detection sensor 24 has a transmission unit 241 and a reception unit 242. The transmission unit 241 and the reception unit 242 are arranged above and below the receiving transport path 111 so as to sandwich the check C therebetween. The transmission unit 241 transmits ultrasonic waves, and the reception unit 242 receives the transmitted ultrasonic waves via the check C. The control unit 100 can determine whether the number of checks C fed out from the receiving unit 2 is one or more than one, based on a signal received from the double feed detection sensor 24 regarding the intensity of received ultrasonic waves. A plurality of the double feed detection sensors 24 may be provided.

As described above, the recognition unit 4 disposed downstream of the adjustment unit 3 in the transport direction has the MICR 41, the first CIS 421, and the second CIS 422. As illustrated in FIG. 17, the MICR 41 is disposed at one end in the lateral direction of the receiving transport path 111. More specifically, the MICR 41 is disposed at a position corresponding to the position of the magnetic information portion C1 of the check C. As described above, the check C is inserted into the check handling device 10 with the front facing up, the back facing down, and the right edge facing forward. The magnetic information unit C1 of the check C being transported along the receiving transport path 111 is located on the upper side of the paper of FIG. 17. The MICR 41 is also disposed on the upper side of the paper of FIG. 17.

The CIS 42 is disposed downstream of the MICR 41 in the transport direction. Each of the first CIS 421 and the second CIS 422 extends along the entire width of the receiving transport path 111. As the check C being transported moves relative to the first CIS 421 and the second CIS 422, the first CIS 421 and the second CIS 422 can acquire an image of the entire front of the check C and an image of the entire back of the check C.

Figure 19:
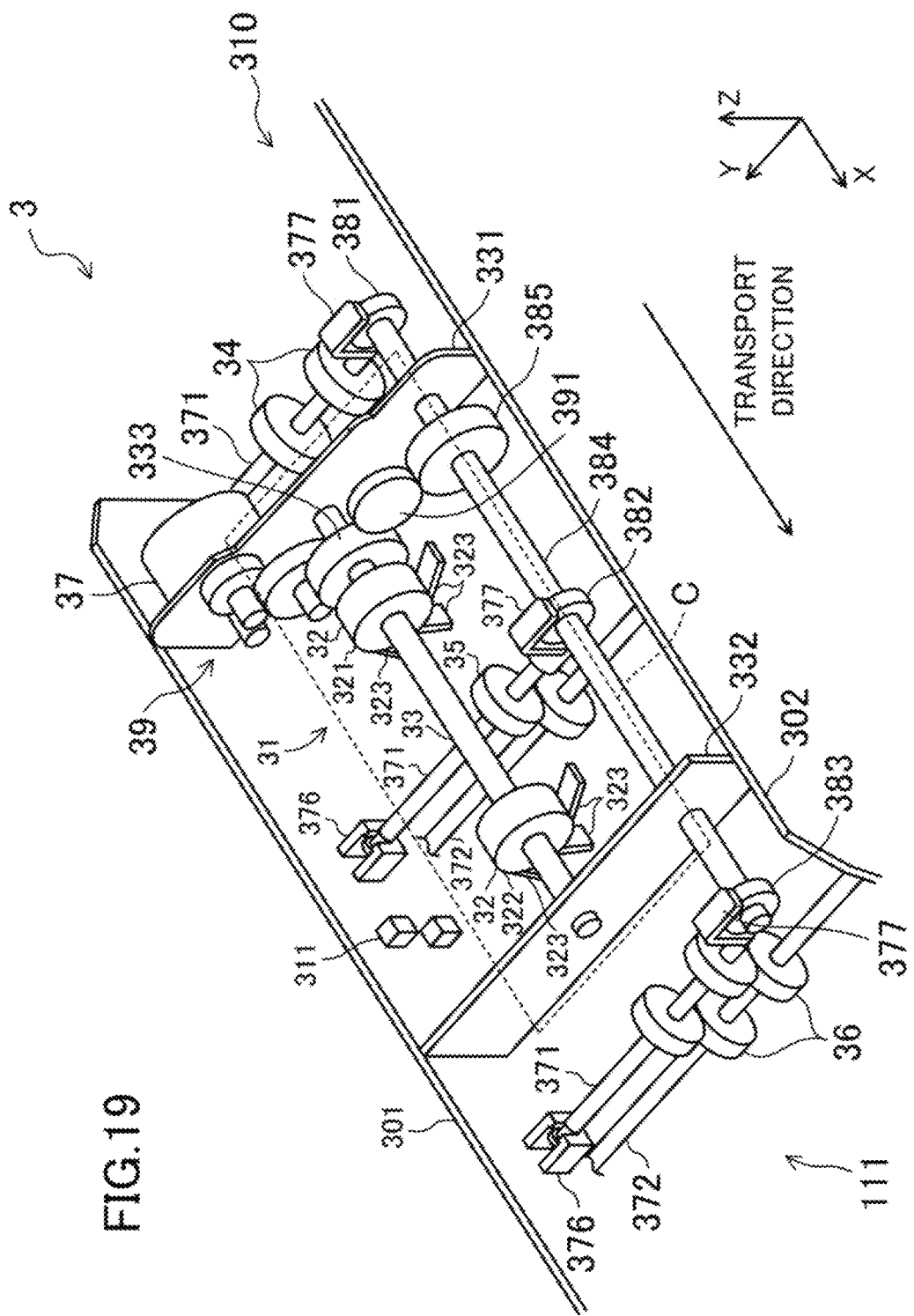
FIG. 19 is a perspective view of the adjustment unit.

Adjustment of Position and Attitude of Check FIG. 19 illustrates the configuration of the adjustment unit 3. As described above, the adjustment unit 3 adjusts the position and attitude of the check C fed out from the receiving unit 2. The adjustment unit 3 adjusts the position and attitude of the check C so that the recognition unit 4 can recognize the check C, particularly so that the MICR 41 can read the magnetic information of the check C.

The adjustment unit 3 has a displacement mechanism 31. The displacement mechanism 31 displaces the stationary check in a second direction within the receiving transport path 111 by contacting the stationary check. The second direction is a direction corresponding to the lateral direction of the receiving transport path 111, more specifically, a direction from the other side to one side in the lateral direction. The direction from the other side to the one side in the lateral direction is a direction from the lower side to the upper side of the paper of FIG. 17. The displacement mechanism 31 adjusts the position and attitude of the check C so that the position of the magnetic information portion C1 of the check C matches the position of the MICR 41.

Figure 20:
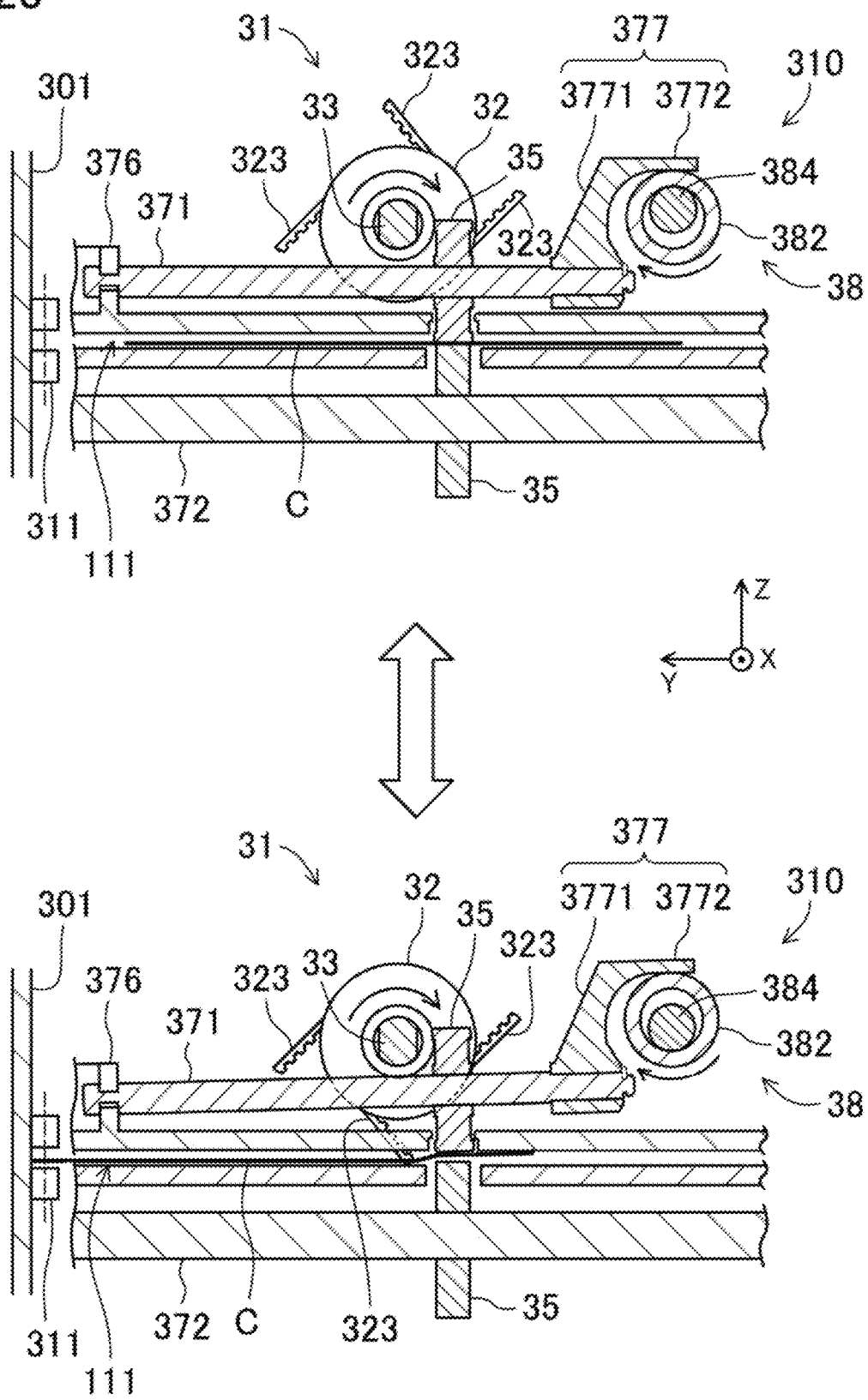
FIG. 20 is a sectional view of a displacement mechanism and a release mechanism.

The displacement mechanism 31 has a rotating element 32. The rotating element 32 includes a first rotating element 321 and a second rotating element 322. The first rotating element 321 and the second rotating element 322 have the same shape. As is also shown in FIG. 20, the first rotating element 321 and the second rotating element 322 have a circumferential surface. A third shaft 33 supports each of the first rotating element 321 and the second rotating element 322. The third shaft 33 extends in a first direction (transport direction). The first rotating element 321 and the second rotating element 322 are arranged at an interval in the transport direction. The interval between the first rotating element 321 and the second rotating element 322 is smaller than the length of the long side of the check C. The check handling device 10 handles checks C of various sizes, and the interval between the first rotating element 321 and the second rotating element 322 need only be smaller than the length of the long side of the check C of the smallest size.

Two support plates 331, 332 rotatably support the ends of the third shaft 33. The two support plates 331, 332 stand at an interval in the transport direction.

When the third shaft 33 rotates, the first rotating element 321 and the second rotating element 322 rotate in one direction about the axis of the third shaft 33.

Figure 21:
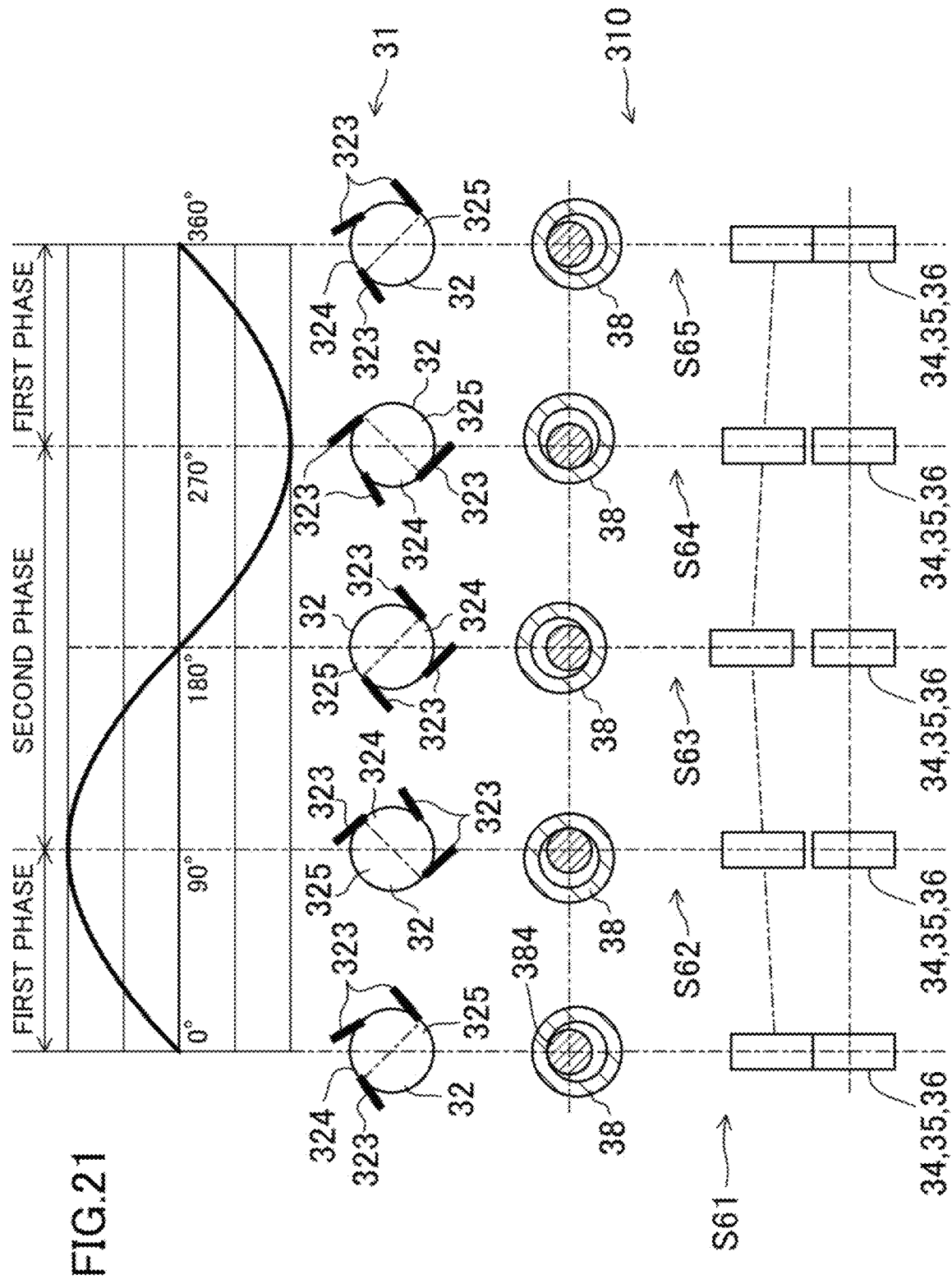
FIG. 21 illustrates an operation of the displacement mechanism and the release mechanism.

A contact piece 323 is attached to the circumferential surface of the rotating element 32. More specifically, three contact pieces 323 are attached to the circumferential surface of the rotating element 32. As illustrated in FIG. 20, the three contact pieces 323 are arranged on the circumferential surface of the rotating element 32 at predetermined intervals in the circumferential direction. In the illustrated example, the interval between the three contact pieces 323 corresponds to an angle of about 90° in the circumferential direction. As shown in FIG. 21, the circumferential surface of the rotating body 32 has an attachment area 324 where the contact pieces 323 are attached and a non-attachment area 325 where no contact piece 323 is attached. The contact pieces 323 attached to the first rotating element 321 and the contact pieces 323 attached to the second rotating element 322 are attached at the same angular positions as viewed in the transport direction (X direction). In other words, the contact pieces 323 attached to the first rotating element 321 and the contact pieces 323 attached to the second rotating element 322 are in phase with each other as viewed in the transport direction. As will be described later, the contact pieces 323 come into contact with the surface of the check C. The contact pieces 323 attached to the first rotating element 321 and the contact pieces 323 attached to the second rotating element 322 come into contact with the surface of the check C at the same timings as the third shaft 33 rotates.

Each contact piece 323 is attached so as to protrude outward in the radial direction from the circumferential surface of the rotating element 32. Each contact piece 323 extends in the tangential direction or substantially in the tangential direction to the circumferential surface of the rotating element 32. The contact pieces 323 are made of a flexible material. Each contact piece 323 has a plurality of grooves on its one surface. The non-grooved surface of each contact piece 323 comes into contact with the surface of the check C. The contact pieces 323 are also made of a material with a large coefficient of friction. The contact pieces 323 tend to apply a force to the check. The contact pieces 323 are made of, e.g., rubber or a material having a function similar to rubber.

When the first rotating element 321 and the second rotating element 322 rotate, each contact piece 323 comes into contact with the surface of the check C while bending. The contact piece 323 having come into contact with the surface of the check C applies a force to the check C in the second direction with the rotation of the first rotating element 321 and the second rotating element 322. Due to the rotational force of the rotating element 32 and the elastic restoring force of each contact piece 323, each contact piece 323 taps the check C from the other side toward the one side in the lateral direction of the receiving transport path 111.

The contact piece 323 of the first rotating element 321 and the contact piece 323 of the second rotating element 322 contact the surface of the check C shown by dashed line in FIG. 19 at positions displaced from each other in the transport direction (X direction). Since the contact pieces 323 apply a force to the check C at the two positions separated from each other in the transport direction, the check C is effectively moved to the one side in the lateral direction of the receiving transport path 111.

The adjustment unit 3 has a first sidewall 301 and a second sidewall 302 on the one side and the other side in the lateral direction of the receiving transport path 111, respectively. The first sidewall 301 and the second sidewall 302 define the ends on the one side and the other side in the lateral direction of the receiving transport path 111, respectively.

As the check C is tapped by the contact piece 323 of the first rotating element 321 and the contact piece 323 of the second rotating element 322, an edge on the long side of the check C comes into contact with the first sidewall 301. The check C is thus in such an attitude that the longer side of the check C extends along the first sidewall 301. The first sidewall 301 serves not only as a contact portion that is contacted by the edge of the check C but also as a regulating portion that regulates the position and/or attitude of the check C.

A detection sensor 311 is disposed near the first sidewall 301. The detection sensor 311 is disposed at a position between the first rotating element 321 and the second rotating element 322, more specifically, at a position close to the second rotating element 322, in the transport direction.

The detection sensor 311 may be an optical sensor having a light emitting unit and a light receiving unit. As shown in FIG. 20, the optical axis of the detection sensor 311 (see long dashed short dashed line in FIG. 20) vertically crosses the receiving transport path 111 near the first sidewall 301. When the edge of the long side of the check C comes into contact with the first sidewall 301, the check C crosses the optical axis of the detection sensor 311, and the detection sensor 311 outputs a detection signal to the control unit 100. The control unit 100 recognizes based on the detection signal of the detection sensor 311 that the position and attitude of the check C have been adjusted to a predetermined position and attitude by the adjustment unit 3. The detection sensor 311 detects a part of the check C that is located away from the middle in the long side direction of the check C.

A gear 333 is attached to a first end of the third shaft 33. The gear 333 forms a part of a gear train that forms a drive transmission unit 39.

The drive transmission unit 39 is composed of a plurality of gears meshing with each other. The drive transmission unit 39 transmits the rotational force of a power source 37 to the third shaft 33. The power source 37 is an electric motor, more specifically a stepping motor. The power source 37 is fixed to the support plate 331.

One of the gears of the drive transmission unit 39 is attached to a motor shaft of the power source 37. When the motor shaft of the power source 37 rotates, the drive transmission unit 39 transmits the rotational force to the third shaft 33. The third shaft 33, the first rotating element 321, and the second rotating element 322 rotate in a predetermined direction, in the example of FIG. 20, in the clockwise direction as viewed from the downstream side in the transport direction as shown by arrow.

As described above, the adjustment unit 3 is provided in the receiving transport path 111. As illustrated in FIGS. 17 and 19, a plurality of transport rollers forming a part of the receiving transport path 111 is provided at the adjustment unit 3. The transport rollers include a first transport roller 34, a second transport roller 35, and a third transport roller 36.

The first transport roller 34 is disposed at an upstream position in the transport direction of the check C. In the example of FIG. 19, the transport direction of the check C is the direction from the back right to the front left of the paper of FIG. 19. The third transport roller 36 is disposed at a downstream position in the transport direction of the check C. The first transport roller 34 and the third transport roller 36 have the same configuration.

Each of the first transport roller 34 and the third transport roller 36 has two roller pairs. The two roller pairs are arranged in the middle portion in the lateral direction of the receiving transport path 111. The two roller pairs are arranged at an interval in the lateral direction of the receiving transport path 111. Each roller pair is composed of two rollers facing each other in the vertical direction. Each roller pair sandwiches the check C therebetween in the vertical direction. Each of the two rollers facing each other in the vertical direction is supported by a shaft. The upper roller is supported by a swing shaft 371, and the lower roller is supported by a non-swing shaft 372.

The second transport roller 35 is disposed between the first transport roller 34 and the third transport roller 36 in the transport direction of the check C. The second transport roller 35 has one roller pair. The roller pair is composed of two rollers facing each other in the vertical direction. The roller pair sandwiches the check C therebetween in the vertical direction. The upper roller is supported by a swing shaft 371, and the lower roller is supported by a non-swing shaft 372.

As described above, each of the first transport roller 34, the second transport roller 35, and the third transport roller 36 has the swing shaft 371 and the non-swing shaft 372. As shown in FIG. 19 or 20, the swing shaft 371 and the non-swing shaft 372 extend in the lateral direction of the receiving transport path 111. The swing shaft 371 is disposed above and parallel to the non-swing shaft 372. One end of the swing shaft 371 serves as a support point, and the swing shaft 371 swings as the other end of the swing shaft 371 is displaced in the vertically. Unlike the swing shaft 371, the non-swing shaft 372 does not swing.

Each non-swing shaft 372 is rotatably supported by the first sidewall 301 and the second sidewall 302. As shown in FIG. 17, the non-swing shafts 372 are connected to the second electric motor 112 via transmission belts 373, 374, 375. The rollers supported by the non-swing shaft 372 are drive rollers. The swing shaft 371 is not connected to the second electric motor 112. The rollers supported by the swing shaft 371 are driven rollers.

When the second electric motor 112 is driven, the first transport roller 34, the second transport roller 35, and the third transport roller 36 all rotate in the same direction. Each of the transport rollers 34, 35, and 36 sandwiching the check C therebetween apply a force to the check C in the transport direction. The check C is transported by the force.

A first end of the swing shaft 371 is supported by a swing support portion 376. The swing support portion 376 rotatably supports the first end of the swing shaft 371. The swing support portion 376 also supports the first end of the swing shaft 371 so that a second end of the swing shaft 371 is displaced in the vertical direction, in other words, so that the swing shaft 371 swings in the vertical direction with the swing support portion 376 as a fulcrum. The first end of the swing shaft 371 is the end on the one side of the receiving transport path 111 and the end on the side on which the MICR 41 is disposed. The second end of the swing shaft 371 is the opposite end from to the first end.

More specifically, the swing support portion 376 has an engagement groove that opens upward. The first end of the swing shaft 371 has a reduced diameter portion. The first end of the swing shaft 371 is supported by the swing support portion 376 by inserting the reduced diameter portion into the engagement groove from above.

The second end of the swing shaft 371 is engaged with a cam 38 (see FIG. 20). More specifically, a contactor 377 is attached to the second end of the swing shaft 371. The contactor 377 has a base portion 3771 extending upward from the swing shaft 371 and a contact portion 3772 extending horizontally or substantially horizontally from the upper end of the base portion 3771 in the lateral direction of the transport path. The base portion 3771 and the contact portion 3772 are perpendicular or substantially perpendicular to each other.

The contactor 377 has a substantially L-shaped cross section.

The lower surface of the contact portion 3772 is in contact with the cam surface of the rotating cam 38, that is, the outer peripheral surface of the cam 38. When the cam 38 rotates, the contactor 377 is displaced up and down following the displacement of the cam surface. As the contactor 377 is displaced, the swing shaft 371 also swings up and down.

The cam 38 includes three cams, a first cam 381, a second cam 382, and a third cam 383. The first cam 381 is engaged with the swing shaft 371 of the first transport roller 34, the second cam 382 is engaged with the swing shaft 371 of the second transport roller 35, and the third cam 383 is engaged with the swing shaft 371 of the third transport roller 36.

A camshaft 384 supports the first cam 381, the second cam 382, and the third cam 383. The camshaft 384 extends in the transport direction of the check C. The first cam 381 is attached to one end of the camshaft 384, the third cam 383 is attached to the other end of the camshaft 384, and the second cam 382 is attached to the camshaft 384 at a position between the first cam 381 and the third cam 383.

The camshaft 384 is supported by the two support plates 331, 332. The two support plates 331, 332 rotatably support the camshaft 384. A gear 385 is attached to an intermediate portion of the camshaft 384, more specifically, at a position between the first cam 381 and the second cam 382. The gear 385 forms a part of the gear train that forms the drive transmission unit 39. When the motor shaft of the power source 37 rotates, the camshaft 384 rotates in a predetermined direction, in the example of FIG. 20, in the clockwise direction in the paper of FIG. 20, as shown by arrow via the drive transmission unit 39. As the camshaft 384 rotates, the first cam 381, the second cam 382, and the third cam 383 also rotate in the same direction as the camshaft 384.

The cam 38 is an eccentric cam. That is, the cam 38 has a circumferential cam surface. The support position of the camshaft 384 is offset from the center of the circumference of the cam 38. When the camshaft 384 rotates, the cam 38 lifts the second end of the swing shaft 371 upward via the contactor 377, as illustrated in the lower figure of FIG. 20. The rollers of each roller pair facing each other are thus separated from each other. When the rollers are separated from each other, the check C sandwiched between each roller pair is released. The shape of the cam 38 is not limited to the shape in the illustrated example.

As the camshaft 384 rotates further, the swing shaft 371 is no longer lifted by the cam 38 and the swing shaft 271 returns to its original position, as illustrated in the upper figure of FIG. 20. Accordingly, the rollers that have been separated from each other move toward each other. The check C that has been released is therefore sandwiched by each roller pair so that the check C is restrained again. When the second electric motor 112 is driven in this state, each of the first, second, and third transport rollers 34, 35, and 36 sandwiching the check therebetween applies a force to the check C in the transport direction.

The cam 38, the camshaft 384, and the contactor 377 form a release mechanism 310 that separates the rollers of the transport rollers 34, 35, and 36 from each other and releases the check C. The release mechanism 310 separates the rollers of the three transport rollers 34, 35, and 36 from each other at the same timing. The first, second, and third cams 381, 382, and 383 attached to the camshaft 384 are attached to the camshaft 384 at the same angle.

The gear 385 attached to the camshaft 384 and the gear 333 attached to the third shaft 33 have the same diameter and the same number of teeth. A third gear 391 is disposed between the two gears 333, 385 and meshes with the two gears 333, 385. Accordingly, when the motor shaft of the power source 37 rotates, the camshaft 384 and the third shaft 33 rotate in the same direction at the same rotational speed.

Synchronization Between Release Mechanism and Displacement Mechanism in Adjustment Unit As described above, the displacement mechanism 31 applies a moving force in the lateral direction of the receiving transport path 111 to the check C when the contact pieces 323 come into contact with the surface of the check C. At this time, the check C cannot move if the first transport roller 34, the second transport roller 35, and/or the third transport roller 36 sandwiches the check C therebetween.

Therefore, the adjustment unit 3 synchronizes the operation in which the release mechanism 310 releases the check C with the operation in which the displacement mechanism 31 to apply the moving force to the check C. That is, the drive transmission unit 39 transmits the rotational force of the single power source 37 to each of the release mechanism 310 and the displacement mechanism 31, so that the release mechanism 310 and the displacement mechanism 31 are synchronized with each other.

Next, the synchronization between the release mechanism 310 and the displacement mechanism 31 will be described with reference to FIG. 21. FIG. 21 is a timing chart illustrating displacement of the cam 38, displacement of the contact pieces 323, and displacement of the transport rollers 34, 35, and 36 during one rotation of the cam shaft 384 supporting the cam 38 and the third shaft 33 supporting the rotating element 32, namely during the period in which the rotation angle changes from 0° to 360°.

As described above, the camshaft 384 and the third shaft 33 rotate in the same direction at the same rotational speed when the motor shaft of the power source 37 rotates.

As described in detail later, the power source 37 starts driving when the check C arrives at the position of the adjustment unit 3 and the transport of the check C is paused (see step S61 in FIG. 21). When the motor shaft of the power source 37 starts to rotate, the cam 38 starts to rotate. Since the swing shaft 371 starts to be lifted, the rollers of the transport rollers 34, 35, and 36 start to separate from each other as shown in step S62. The transport rollers 34, 35, and 36 thus release the check C.

As shown in step S62, when the cam 38 rotates to 90°, the contact piece 323 of the rotating element 32 faces downward and comes int contact with the surface of the check C. As the rotating body 32 rotates further, the first contact piece 323 taps the surface of the check C toward the one side in the lateral direction of the receiving transport path 111. A force toward the one side in the lateral direction is thus applied to the check C.

As shown in step S63, when the cam 38 rotates to 180°, the rollers of the transport rollers 34, 35, and 36 are separated from each other to the maximum distance. Since the rotating element 32 also rotates further, the second contact piece 323 taps the surface of the check toward the one side in the lateral direction of the receiving transport path 111. A force toward the one side in the lateral direction is thus applied to the check.

As the cam 38 rotates further, the rollers separated at the maximum distance start to move toward each other. Since the rotating element 32 also rotates further, the third contact piece 323 comes into contact with the surface of the check. The third contact piece 323 also taps the surface of the check toward the one side in the lateral direction of the receiving transport path 111. As shown in step S64, the check C has still been released by the transport rollers 34, 35, and 36. The check C receives a force from the contact piece 323 and moves to the one side in the lateral direction of the receiving transport path 111.

As shown in step S65, when the cam 38 makes one rotation, the two rollers sandwich the check C in the vertical direction. The check C is thus restrained again. The contact pieces 323 face upward and do not apply a force to the check C.

The power source 37 stops when the camshaft 384 and the third shaft 33 makes one rotation.

As shown in FIG. 21, the cam 38 is configured to switch between a first phase (0° to 90° and 270° to 360°) and a second phase (at least 90° to 270°). In the first phase, the transport rollers 34, 35, and 36 sandwich the check C therebetween. In the second phase, the rollers of the transport rollers 34, 35, and 36 are separated from each other.

As described above, the circumferential surface of the rotating element 32 has the attachment area 324 where the contact pieces 323 are attached and the non-attachment area 325 where no contact piece 323 is attached.

When the cam 38 is in the first phase, the non-attachment area 325 of the rotating element 32 faces the check C, and no contact piece 323 contacts the surface of the check C. When the cam 38 is in the second phase, the attachment area 324 of the rotating element 32 faces the check C, and the contact piece 323 contacts and taps the surface of the check C. The check C that has been released receives a force from the contact piece 323 and moves to the one side in the lateral direction of the receiving transport path 111. The check C is located at such a position that the contact C is in contact with the first sidewall 301, and the check C is in such an attitude that the check C extends along the first sidewall 301.

Operation of Adjusting Position and/or Attitude of Check by Adjustment Unit

The adjustment unit 3 adjusts the position and/or attitude of the check C while the receiving transport unit 11 is not transporting the check C. That is, the receiving transport unit 11 interrupts the transport of the check C fed out from the receiving transport unit 2, and the adjustment unit 3 performs the above operation during interruption of the transport of the check C. After the adjustment unit 3 adjusts the position and/or attitude of the check C, the receiving transport unit 11 resumes transporting the check C. The operation of the adjustment unit 3 and the operation of the receiving transport unit 11 are synchronized with each other. Since the receiving transport unit 11 transports checks in synchronization with the intermittent feeding operation of the receiving unit 2, the adjustment unit 3 operates in synchronization with the feeding operation of the receiving unit 2.

Figure 22:
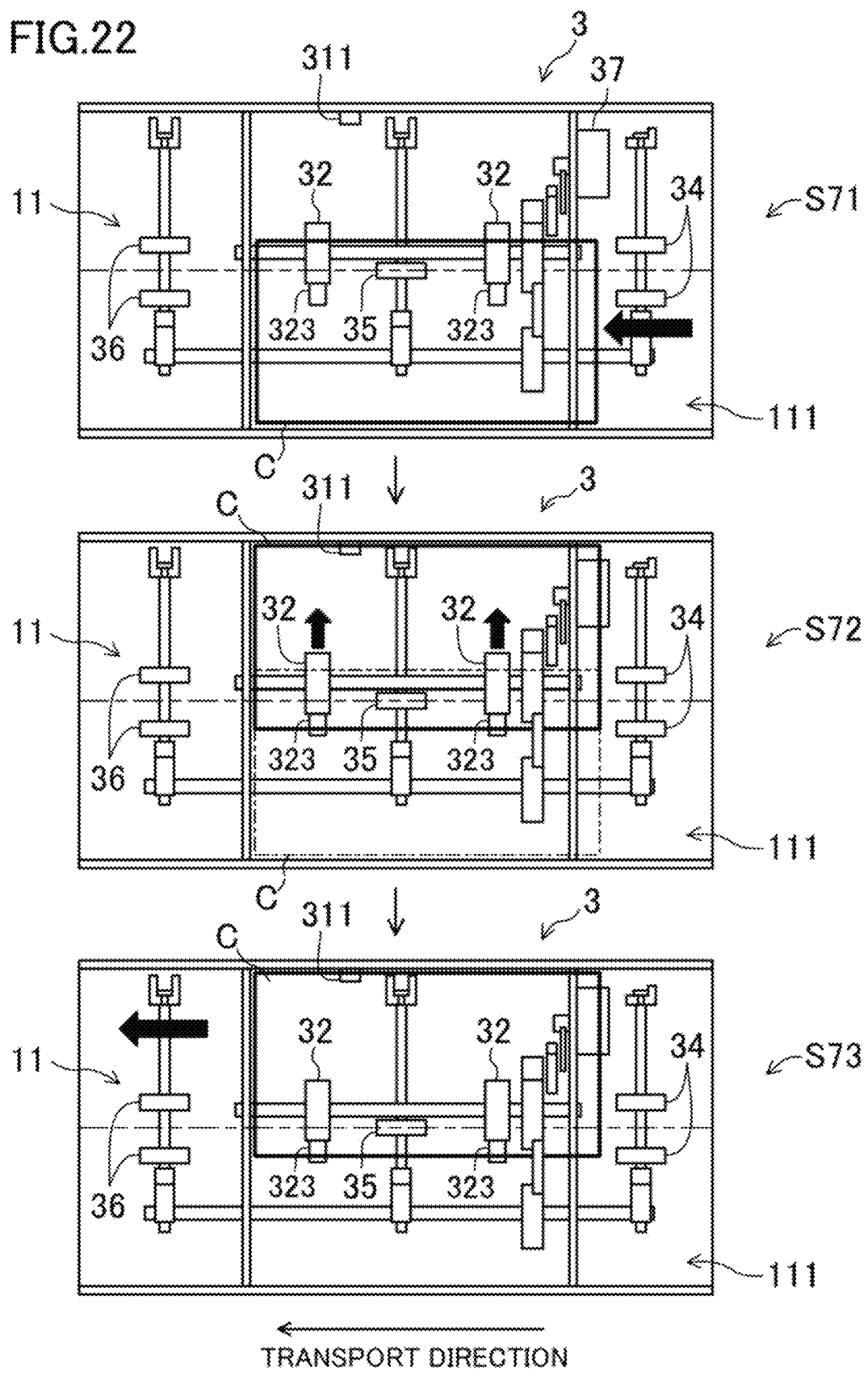
FIG. 22 is a transition diagram illustrating an operation of the adjustment unit.

Next, the operation of the adjustment unit 3 and the receiving transport unit 11 will be described with reference to FIG. 22. FIG. 22 corresponds to a plan view of the adjustment unit 3 as viewed from above. In FIG. 22, the outer shape of the check C is shown by solid line or long dashed short dashed line for better understanding.

As shown in step S71 of FIG. 22, the receiving transport unit 11 transports the check C to the adjustment unit 3 (see black arrow in the figure). When the check C reaches the adjustment unit 3, the receiving transport unit 11 stops transporting the check C.

In the following step S72, as described above, the power source 37 of the adjustment unit 3 starts driving. The transport rollers 34, 35, and 36 thus release the check C, and the contact pieces 323 tap the surface of check C. Since the contact pieces 323 of the two rotating elements 32 applies a force to the front and rear sides in the transport direction of the check C, the check C moves to the one side in the lateral direction of the receiving transport path 111 (see black arrows in the figure). The edge of the long side of the check C comes into contact with the first sidewall 301, and the check C is thus in such an attitude that the check C extends along the first sidewall 301. The position and attitude of the check C are thus adjusted to a predetermined position and attitude. The detection sensor 311 detects that the position and attitude of the check C have been adjusted to the predetermined position and attitude.

In response to a detection signal of the detection sensor 311, the receiving transport unit 11 resume transporting the check C in step S73 (see black arrow in the figure).

The adjustment unit 3 can thus adjust the position and/or attitude of the check C in the transport path. Since the transport unit 1 and the adjustment unit 3 are synchronized with each other, the adjustment unit 3 can adjust the position and/or attitude of the check C in the transport path during transport of the check C. The adjustment unit 3 can adjust the position and/or attitude of each of the checks received by the receiving unit 2.

The receiving transport unit 11 transports the check C toward the recognition unit 4 in response to the detection signal of the detection sensor 311. Accordingly, the receiving transport unit 11 can send the check C adjusted to the predetermined position and/or attitude to the recognition unit 4.

Since the adjustment unit 3 adjusts the position and/or attitude of the check C, the magnetic information portion C1 of the check C passes near the MICR 41 in the recognition unit 4. The MICR 41 can thus accurately read the magnetic information of the check C. The check handling device 10 can read the magnetic information of the check C by using one MICR 41. Reduction in number of MICRs 41 is advantageous in reducing the cost of the check handling device 10.

Retry Operation of Adjustment Unit

The detection sensor 311 of the adjustment unit 3 may not detect the check C even when the contact pieces 323 apply a force to the check C. In this case, there is a possibility that the check C may not have been adjusted to the predetermined position and/or attitude. If the receiving transport unit 11 transports the check C in this attitude to the recognition unit 4, the MICR 41 of the recognition unit 4 may not be able to accurately read the magnetic information of the check C. Accordingly, when the detection sensor 311 does not detect the check C, the adjustment unit 3 performs the check adjustment operation again.

Only one detection sensor 311 is provided near the first sidewall 301. Accordingly, in the case where the check C is, e.g., a torn or mutilated check, the detection sensor 311 may miss the check C even if the check C is in the predetermined position and attitude.

In view of this, the receiving transport unit 11 transports the check C by a predetermined amount in the transport direction or in the opposite direction to the transport direction before the adjustment unit 3 performs the check adjustment operation again. This changes the position of the check C relative to the detection sensor 311 in the transport direction, and therefore the detection sensor 311 may be able to detect the check C.

Figure 23:
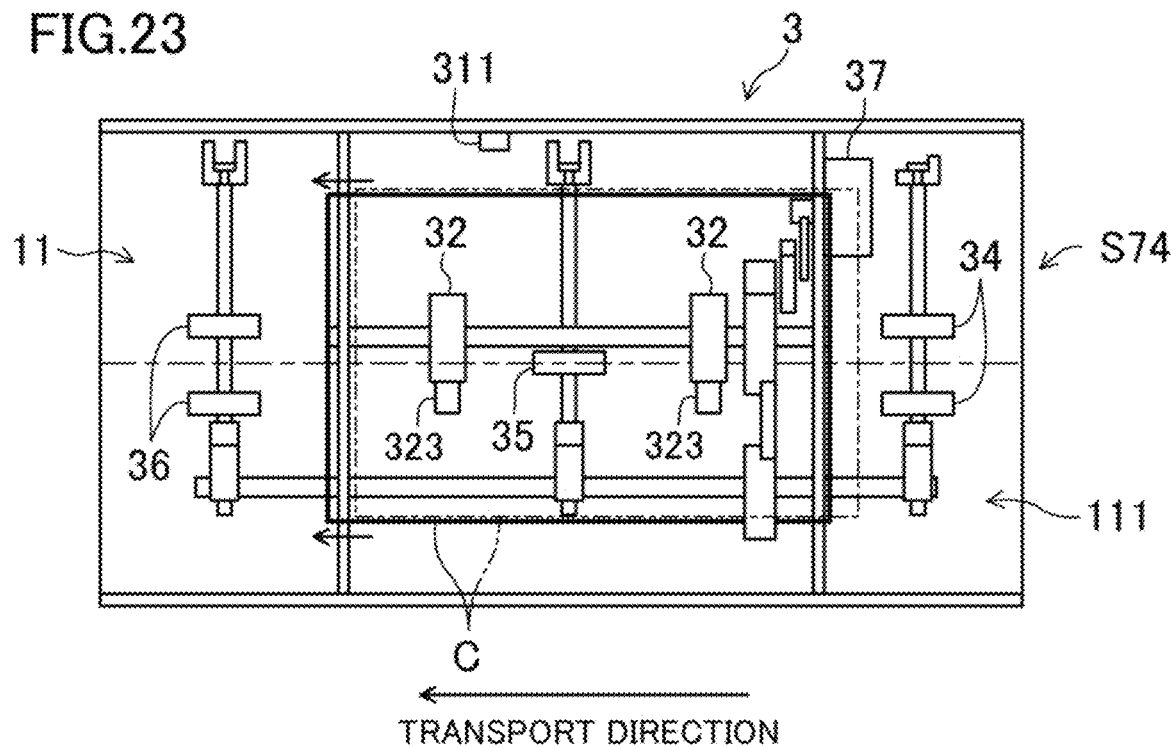
FIG. 23 illustrates a transport operation of the transport unit when the adjustment unit performs an adjustment operation for the second time.

FIG. 23 illustrates step S74 that is performed when the detection sensor 311 does not detect the check C after step S72 in FIG. 22. As shown by arrows in FIG. 23, the receiving transport unit 11 transports the check C shown by long dashed short dashed line by the predetermined amount in the transport direction. As a result, the check C is located at, e.g., the position shown by solid line. The transport amount of the check C is limited to such an amount that each of the two rotating elements 32 of the displacement mechanism 31 still faces the surface of the check C.

After the receiving transport unit 11 transports the check C in step S74, the process returns to step S72 of FIG. 22, and the adjustment unit 3 performs the check adjustment operation again. As described above, the displacement mechanism 31 applies a moving force toward the one side in the lateral direction of the receiving transport path 111 to the check C.

In the case where the check C is adjusted to the predetermined position and attitude by this adjustment operation of the adjustment unit 3 and the detection sensor 311 detects the check C, the receiving transport unit 11 resumes transporting the check C in step S73. In the case where the adjustment unit 3 performs the adjustment operation again, the check C is transported by only a small amount. As a result, the detection sensor 311 may be able to detect the position and attitude of the check C.

Figure 24:
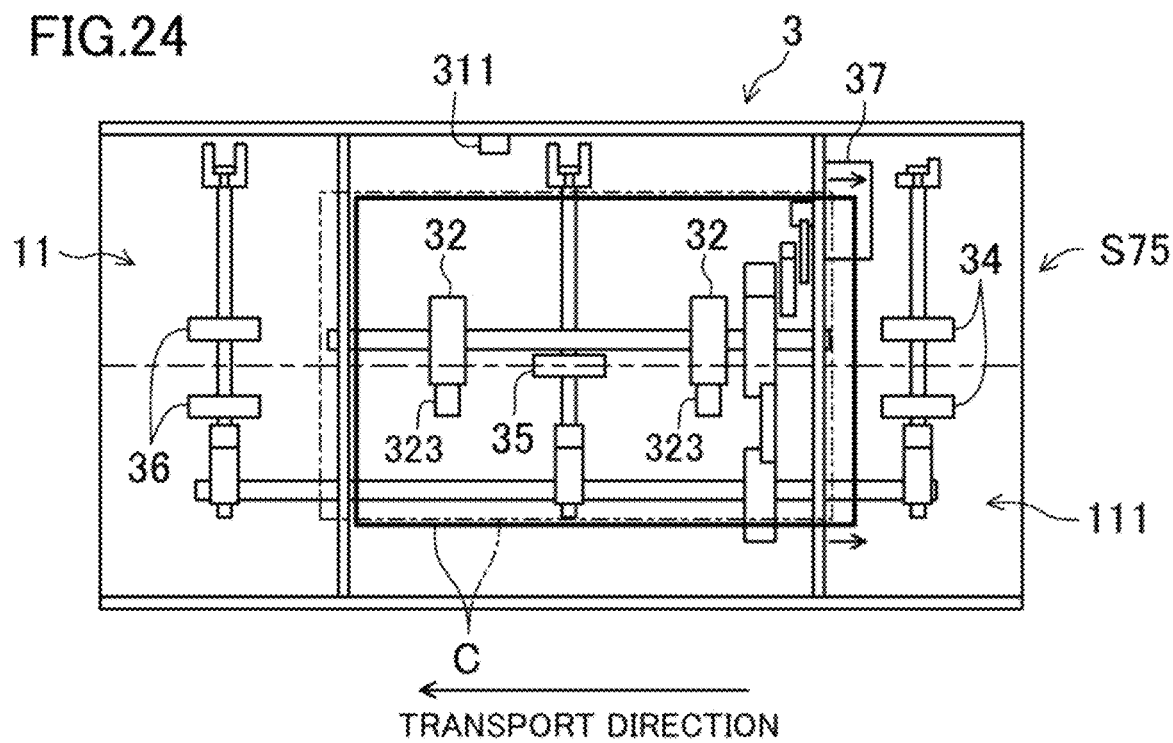
FIG. 24 illustrates a transport operation of the transport unit when the adjustment unit performs the adjustment operation for the third time.

In the case where the adjustment unit 3 performs the adjustment operation again in step S72 after the check C is moved by the predetermined amount in step S74, but the detection sensor 311 still do not detect the check C, the adjustment unit 3 adjusts the position and attitude of the check C again. In this case, the receiving transport unit 11 transports the check C shown by long dashed short dashed line by a predetermined amount in the opposite direction to the transport direction as shown in step S75 in FIG. 4 before the adjustment unit 3 performs the adjustment operation for the third time. As a result, the check C is located at, e.g., the position shown by solid line in FIG. 24. In this case as well, the transport amount of the check C is limited to such an amount that each of the two rotating elements 32 of the displacement mechanism 31 still faces the surface of the check C.

After the check C is transported by the predetermined amount in step S75, the adjustment unit 3 performs the adjustment operation in step S72. In the case where the detection sensor 311 detects the check C as a result of this adjustment operation, the receiving transport unit 11 resume transporting the check C (step S73 in FIG. 22). In the case where the adjustment unit 3 performs the adjustment operation for the third time, the check C is transported by only a small amount. As a result, the detection sensor 311 may be able to detect the position and attitude of the check C.

The adjustment unit 3 thus performs the adjustment operation two or three times. As a result, the receiving transport unit 11 can send the check C adjusted to the predetermined position and/or attitude to the recognition unit 4.

If the detection sensor 311 still does not detect the check C even after the adjustment unit 3 performs the adjustment operation three times, the receiving transport unit 11 may resume transporting the check C. In this case, if the recognition unit 4 cannot read the magnetic information, the recognition unit 4 and/or the control unit 100 may recognize that the check C is a rejected check. If the recognition unit 4 can read the magnetic information, the recognition unit 4 and/or the control unit 100 recognizes that the check C is a non-rejected check.

The check C is transported by the predetermined amount before the adjustment unit 3 performs the retry operation. Accordingly, the position and attitude of the check can be detected even by only one detection sensor 311. This is advantageous in reducing the const of the check handling device 10.

If the detection sensor 311 still does not detect the check C after the adjustment unit 3 performs the adjustment operation three times, the check handling device 10 may be stopped as an error.

Figure 25:
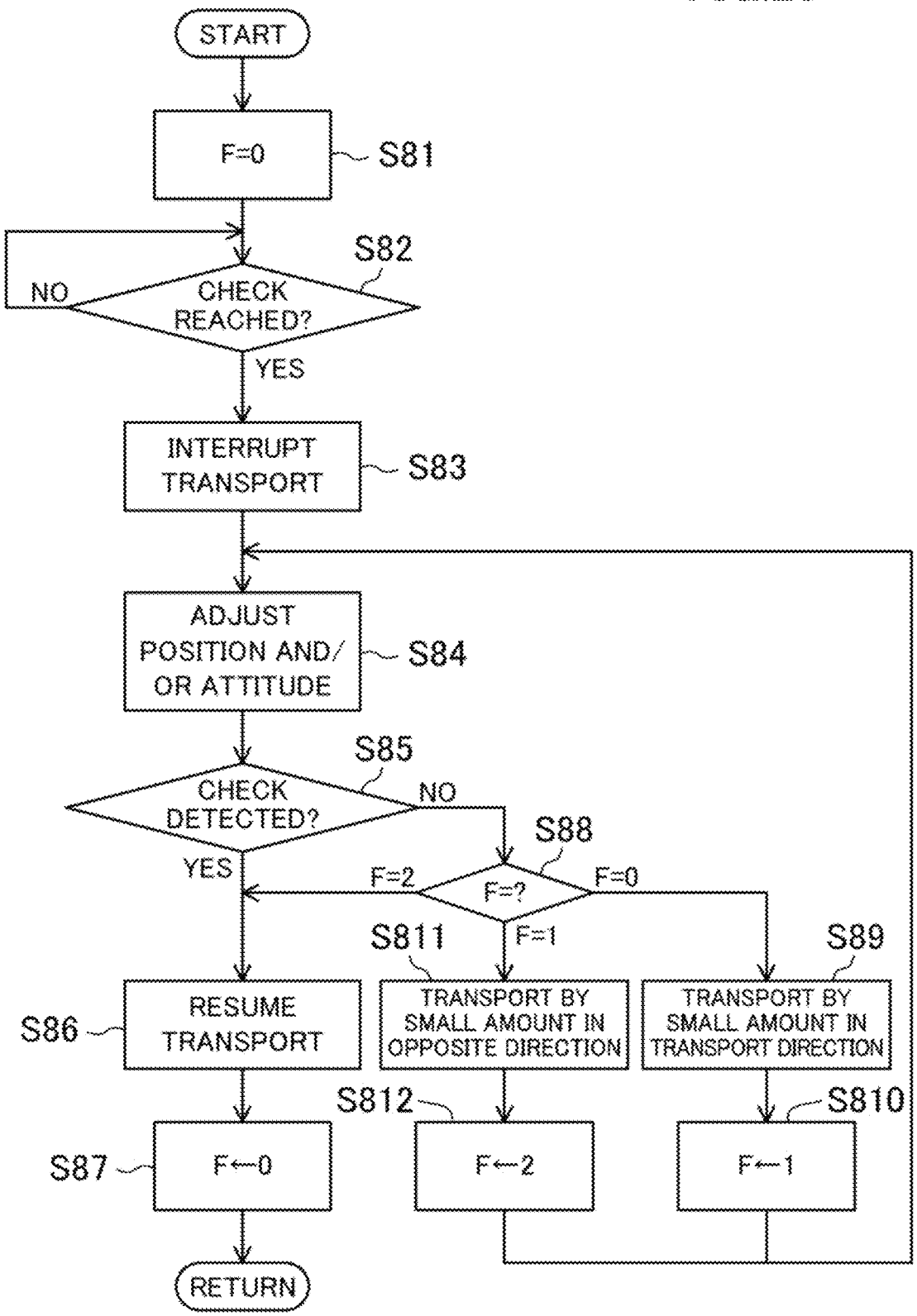
FIG. 25 is a flowchart of an operation procedure of the adjustment unit.

FIG. 25 is a flowchart of the adjustment operation of the adjustment unit 3. First, in step S81, the control unit 100 sets a flag F to zero. The flag F corresponds to the number of adjustment operations performed by the adjustment unit 3. When the flag F is zero, the adjustment unit 3 has not performed the adjustment operation for the check C.

In the subsequent step S82, the control unit 100 determines whether the check C has reached the adjustment unit 3. When the check C has reached the adjustment unit 3, the process proceeds to step S83. When the check C has not reached the adjustment unit 3, the process repeats step S82. The control unit 100 may determine whether the check C has reached the adjustment unit 3 by using a signal of a sensor different from the detection sensor 311.

In step S83, the receiving transport unit 11 interrupts the transport of the check C. The check C thus becomes stationary in the adjustment unit 3. In the subsequent step S84, as described above, the adjustment unit 3 releases the check C and applies a moving force to the one side in the lateral direction of the receiving transport path 111 to the check C.

In step S85, the control unit 100 determines whether the detection sensor 311 has detected the check C. When the detection sensor 311 has detected the check C, the process proceeds to step S86. When the detection sensor 313 has not detected the check C, the process proceeds to step S88.

In step S86, the receiving transport unit 11 resumes transporting the check C.

Thereafter, in step S87, the control unit 100 sets the flag F to zero. The process returns, and the adjustment unit 3 waits for the next check C to come.

When the detection sensor 311 has not detected the check C in step S85, the control unit 100 determines the flag F in step S88. When the flag F is zero, the process proceeds to step S89.

In step S89, the receiving transport unit 11 transports the check C by a predetermined amount in the transport direction. In the subsequent step S810, the control unit 100 sets the flag F to 1. The process then returns to step S84. The adjustment unit 3 adjusts the position and/or attitude of the check C again.

When the detection sensor 311 has detected the check C in step S85, the process proceeds to step S86, and the receiving transport unit 11 resumes transporting the check C. When the detection sensor 311 has not detected the check C in step S85, the process proceeds to step S88 again.

In step S88, the control unit 100 determines the flag F. It is herein assumed that the flag F is 1. The process proceeds from step S88 to step S811. The receiving transport unit 11 transports the check C in the opposite direction to the transport direction. The control unit 100 then sets the flag F to 2 in step S812. The process returns to step S84, and the adjustment unit 3 adjusts the position and/or attitude of the check C again.

When the detection sensor 311 has detected the check C in step S85, the receiving transport unit 11 resumes transporting the check C. When the detection sensor 311 has not detected the check C in step S85, the control unit 100 determines the flag F in step S88. It is herein assumed that the flag F is 2 In this case, the process proceeds from step S88 to step S86. When the adjustment unit 3 has performed the adjustment operation three times in total, the adjustment unit 3 no longer performs the adjustment operation, and the receiving transport unit 11 resumes transporting the check C.

In the above configuration, the receiving transport unit 11 transports the check C by a predetermined amount if the detection sensor 311 does not detect the check C. The receiving transport unit 11 may transport the check C by a predetermined amount in the opposite direction to the transport direction.

If the detection sensor 311 still does not detect the check C after the check C is transported by the predetermined amount in the opposite direction and the adjustment unit 3 performs the adjustment operation, the check may be transported by a predetermined amount in the transport direction.

Details of Printer Configuration

Figure 26:
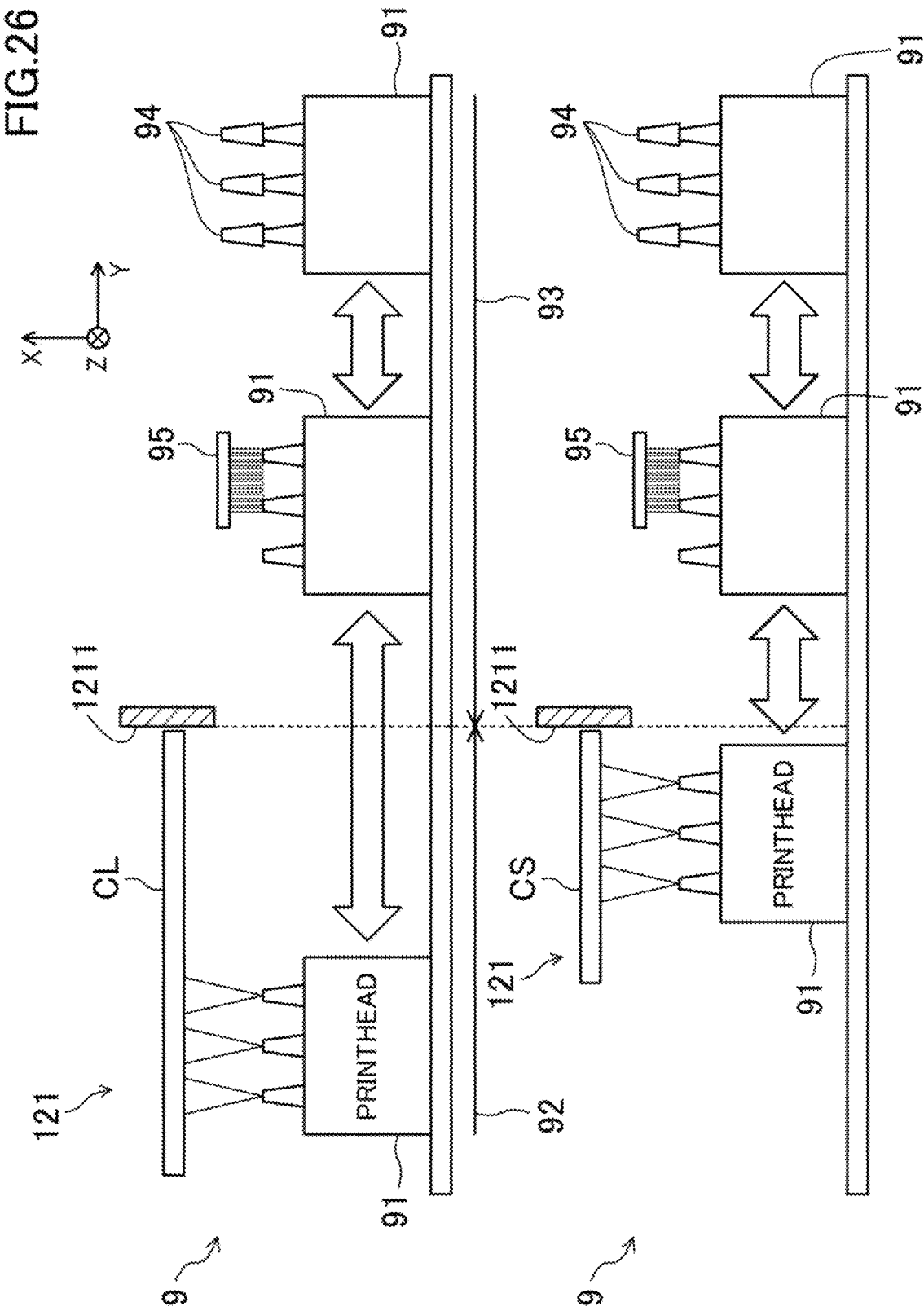
FIG. 26 illustrates an operation of a printhead.

The printer 9 is what is called an inkjet printer. As illustrated in FIG. 26, the printer 9 has a serial printhead 91. The printhead 91 has an ink nozzle for ejecting ink. The printhead 91 is supported by a carriage. The carriage reciprocates the printhead 91 in the lateral direction of the main transport path 121. The printhead 91 reciprocates between a print area 92 corresponding to the main transport path 121 and a standby area 93 outside the main transport path 121 (see white arrows in FIG. 26). The printhead 91 is located in the standby area 93 while not printing.

In the serial printhead 91, the carriage can adjust the position of the printhead 91 in the print area 92. The printhead 91 can print an endorsement at a predetermined position on each of the checks CL, CS of different sizes.

For example, the size and/or design of checks varies from country to country, and the position of the endorsement that is printed by the printer 9 also varies from country to country. The size and/or design of checks is not necessarily the same even in the same country.

When installing the check handling device 10, a person in charge of installation must adjust the printing position of the printhead 91 so that the printer 9 can print the endorsement at the endorsement position on the checks to be handled by the check handling device 10.

The printhead 91 is a serial printhead and is reciprocated by the carriage. The printer 9 can print the endorsement at a predetermined position on the checks by adjusting the amount of movement of the printhead 91 by the carriage. The person in charge of installation adjusts the controlled variable of the printer 9 by the control unit 100 (that is, adjustment by software).

As described above, the check that is transported along the main transport path 121 is located at one end in the lateral direction of the main transport path 121 by the adjustment unit 3. The carriage adjusts the position of the printhead 91 according to the size of the check, based on the position of one end 1211 in the lateral direction of the main transport path 121. The printhead 91 can print the endorsement at a predetermined position on the large check CL as shown in the upper figure of FIG. 26. The printhead 91 can also print the endorsement at a predetermined position on the small check CS as shown in the lower figure of FIG. 26. The printhead 91 need only move horizontally with respect to the surface of the opposing check. The printhead 91 may be configured to move in one direction (Y direction or Z direction) or may be configured to move in two directions (Y direction and Z direction).

A head cover 94 is provided in the standby area 93. The head cover 94 reduces clogging of the ink nozzle. The head cover 94 is provided at a position away from the print area 92. The head cover 94 covers the head surface of the printhead 91. The ink nozzle opens to the head surface. Covering the head surface with the head cover 94 reduces or eliminates the possibility that ink may dry and stick to the head surface while the printhead 91 is on standby.

A brush 95 is disposed in the standby area 93. The brush 95 cleans the head surface of the printhead 91. The brush 95 is provided between the print area 92 and the head cover 94. As the printhead 91 reciprocates between the print area 92 and the head cover 94, the tip end of the brush 95 comes into contact with the head surface and sweeps the head surface. Ink etc. on the head surface is thus removed. The brush 95 reduces clogging of the ink nozzle.

The head cover 94 and the brush 95 stabilize the print quality of the printer 9.

Printhead Position Adjustment Mechanism

The printer 9 with the serial printhead 91 can adjust the print position of the printer 9 by adjustment by software.

Unlike this, the printer 9 may be configured so that the printhead 91 does not reciprocate. In this case, the printer 9 may be able to adjust the position of the printhead 91 according to the size and/or design of the check to be handled.

As shown in FIG. 27, the printer 9 may have a position adjustment mechanism 96 for the printhead 91.

The position adjusting mechanism 96 has a first member 961 and a second member 962. The first member 961 is a rod extending in the lateral direction of the main transport path 121. In the configuration example of FIG. 27, the first member 961 has a circular section. The base end of the first member 961 is fixed to the housing 101 side. The first member 961 does not move.

The first member 961 has a groove 9611 in its tip end. The groove 9611 is recessed from the outer peripheral surface of the first member 961. A plurality of the grooves 9611 are formed at intervals. In the configuration example of FIG. 27, three grooves 9611 are formed at equal intervals in the first member 961. A desired number of grooves 9611 can be formed as the number of grooves 9611 relates to the adjustable range of the position of the printhead 91 and the number of adjustable stages as described later.

The second member 962 is engaged with the first member 961. The printhead 91 is supported by the second member 962. The second member 962 has a support portion 9621 and an engagement beam 9622.

The first member 961 is inserted in the support portion 9621. The support portion 9621 is supported by the first member 961. The second member 962 can move along the first member 961 in the lateral direction of the main transport path 121 relative to the first member 961. The printhead 91 also moves as the second member 962 moves.

The engagement beam 9622 is a member in the shape of a beam and is integral with the support portion 9621. The engagement beam 9622 has its base end fixed to the support portion 9621 and extends in the lateral direction of the main transport path 121. The engagement beam 9622 has a free tip end. The engagement beam 9622 can bend in the vertical direction. A protrusion 9623 is formed on an intermediate portion in the longitudinal direction of the upper surface of the engagement beam 9622. The protrusion 9623 engages with the groove 9611 of the first member 961. When the protrusion 9623 engages with the groove 9611, the second member 962 is fixed with respect to the first member 961 and cannot move relative to the first member 961. When the groove 9611 with which the protrusion 9623 engages is switched, the position of the second member 962 relative to the first member 961 changes accordingly. The position of the printhead 91 is thus adjusted in the lateral direction of the main transport path 121.

The second member 962 further has a handle 9624. The base end of the handle 9624 is fixed to the support portion 9621. The handle 9624 is located below the engagement beam 9622 and extends parallel to or substantially parallel to the engagement beam 9622 in the lateral direction of the main transport path 121. A rib 9625 is provided on the lower surface of the handle 9624. The handle 9624 has a free tip end, but unlike the engagement beam 9622, the handle 9624 does not bend in the vertical direction.

A biasing member 963 is interposed between the handle 9624 and the engagement beam 9622. In the configuration example of FIG. 27, the biasing member 963 is a helical compression spring. The biasing member 963 biases the engagement beam 9622 upward. The protrusion 9623 of the engagement beam 9622 is thus kept engaged with the groove 9611 of the first member 961, and the position of the second member 962 is fixed.

An adjustment method for the printhead 91 using the position adjustment mechanism 96 will be described. When the person in charge of installation holds the engagement beam 9622 and the handle 9624 between his or her fingers, the engagement beam 9622 is bent downward, and the protrusion 9623 is disengaged from the groove 9611. While holding the engagement beam 9622 and the handle 9624 between his or her fingers, the person in charge of installation moves the second member 962 relative to the first member 961 to a position where the protrusion 9623 engages with the desired groove 9611. The person in charge of installation then releases the engagement beam 9622 and the handle 9624. The protrusion 9623 is thus engaged with the groove 9611 due to the elastic restoring force of the engagement beam 9622 and the biasing force of the biasing member 963. The position of the printhead 91 can thus be adjusted in the lateral direction of the main transport path 121.

The biasing member 963 may be omitted. Instead of the helical compression spring, a plate spring may be provided between the engagement beam 9622 and the handle 9624. The plate spring is a resin molded product and can be molded integrally with the second member 962 during molding of the second member 962 including the support portion 9621, the engagement beam 9622, and the handle 9624.

Modification of Position Adjustment Mechanism

Figure 28:
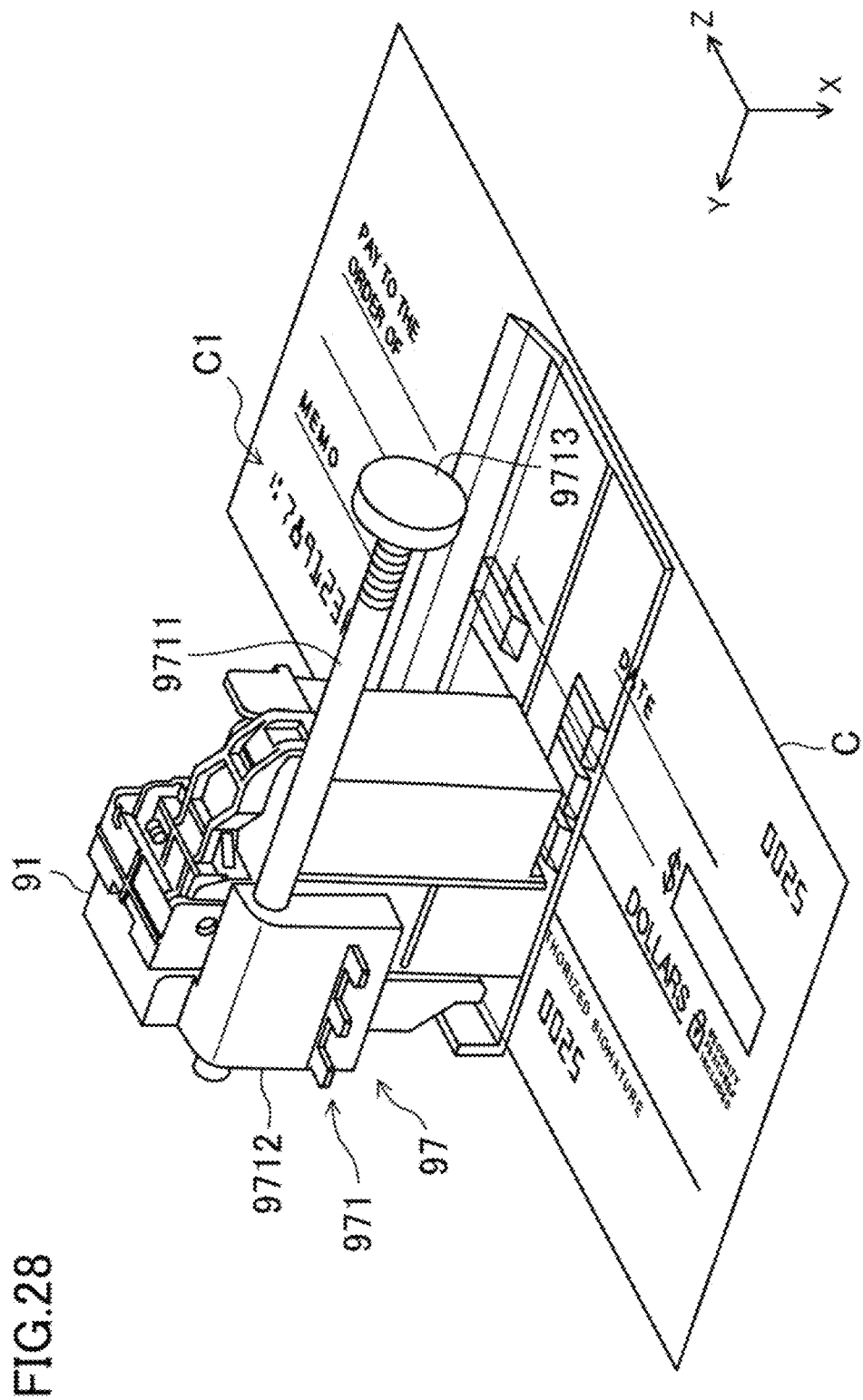
FIG. 28 is a perspective view of a modification of the position adjustment mechanism.

FIG. 28 shows a modification of the position adjustment mechanism 96. A position adjustment mechanism 97 of the modification includes a ball screw 971 instead of the first member 961. That is, the position adjustment mechanism 97 has a screw shaft 9711 supported on the housing 101 side and a nut member 9712 supported by the screw shaft 9711. The nut member 9712 has balls therein that are engaged with the screw shaft 9711. The printhead 91 is supported by the nut member 9712.

When the person in charge of installation turns a knob 9713 attached to the tip end of the screw shaft 9711, the screw shaft 9711 rotates accordingly. As the screw shaft 9711 rotates, the nut member 9712 moves along the screw shaft 9711 in the lateral direction of the main transport path 121. The position adjustment mechanism 97 with this configuration is advantageous in that the position of the printhead 91 can be continuously adjusted.

The serial printhead 91 described above may be combined with the position adjustment mechanism 96 of FIG. 27 or the position adjustment mechanism 97 of FIG. 28. For example, by fixing the first member 961 of the position adjustment mechanism 96 to the carriage, the position adjustment mechanism 96 can adjust the position of the printhead 91 relative to the carriage. Similarly, by supporting the ball screw 971 of the position adjustment mechanism 97 by the carriage, the position adjustment mechanism 97 can adjust the position of the printhead 91 relative to the carriage. With these configurations, the position adjustment by software and the position adjustment by hardware can be combined.

Combining the adjustment by software and the adjustment by hardware allows the printer 9 to print the endorsement at a more appropriate position on checks of various sizes and/or designs.

Other Configuration Examples of Check Handling Device

Figure 29:
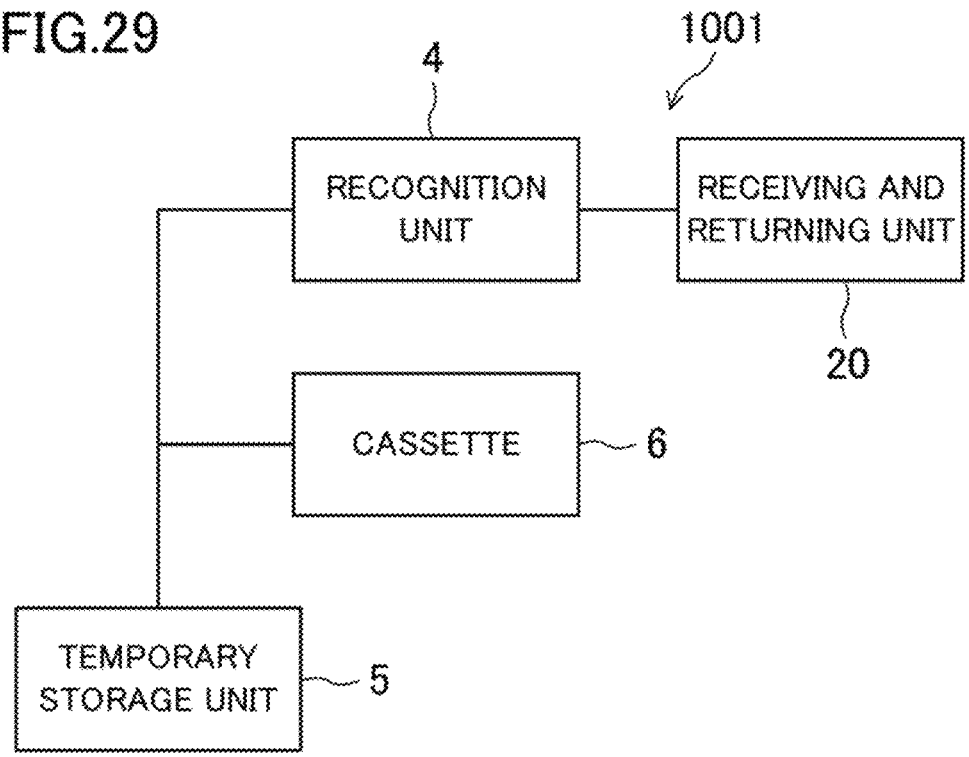
FIG. 29 illustrates a modification of the check handling device.

The check handling device is not limited to the configuration illustrated in FIG. 1. FIG. 29 shows a modification of the check handling device. FIG. 29 shows the connections of the components of the check handling device. Straight lines in FIG. 29 correspond to the check transport path.

As illustrated in FIG. 29, the receiving unit and the returning unit may be a single unit. A check handling device 1001 has a receiving and returning unit 20. The check handling device 1001 has a simple configuration because the first branch path 122 and the return transport path 131 can be omitted.

The check handling device 1001 of FIG. 29 can also handle checks in a manner similar to that of the check handling device 10 of FIG. 1. That is, the check handling device 1001 stores all the rejected and non-rejected checks received by the receiving and returning unit 20 and recognized by the recognition unit 4 in the temporary storage unit 5. Of the checks fed out from the temporary storage unit 5, the check handling device 1001 returns the rejected check and the check not confirmed by the user to the receiving and returning unit 20 through the recognition unit 4. The check handling device 1001 stores the check that is a non-rejected check and has been confirmed by the user in the cassette 6.

Figure 30:
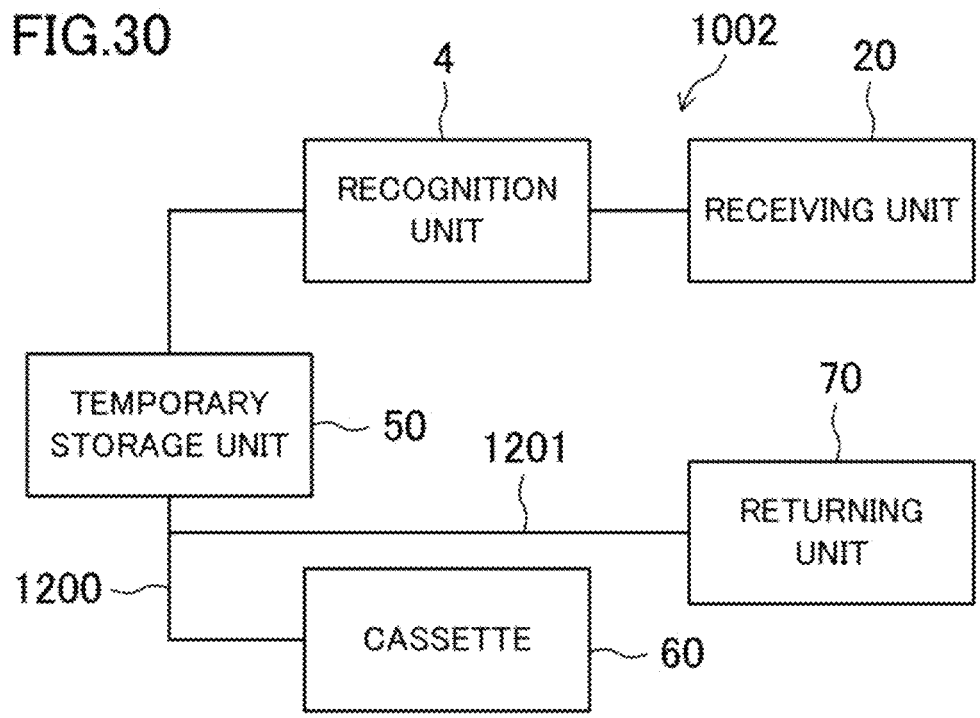
FIG. 30 illustrates another modification of the check handling device.

FIG. 30 shows another configuration example of the check handling device. In a check handling device 1002, the configuration of the temporary storage unit is different from that of the temporary storage unit 5 of the check handling device 10 of FIG. 1. In a temporary storage unit 50 of the check handling device 1002 of FIG. 30, an inlet and an outlet for the checks are different. For example, the temporary storage unit 50 is configured as a stack type temporary storage unit in which a plurality of checks is stacked and stored.

A cassette 60 is connected to the outlet of the temporary storage unit 50 through a transport path 1200, and a returning unit 70 is connected to the outlet of the temporary storage unit 50 through the transport path 1200 and a transport path 1201. The transport path 1201 diverges from the transport path 1200. A diverter mechanism is provided at the diverging position where the transport path 1201 diverges from the transport path 1200.

The check handling device 1002 of FIG. 30 can also handle checks in a manner similar to that of the check handling device 10 of FIG. 1. That is, the check handling device 1002 stores all the rejected and non-rejected checks received by the receiving unit and recognized by the recognition unit 4 in the temporary storage unit 50 through the inlet of the temporary storage unit 50. Of the checks fed out from the outlet of the temporary storage unit 50, the check handling device 1002 transports the rejected check and the check not confirmed by the user to the transport path 1201 to the transport path 1201 by the diverter mechanism to return those checks to the returning unit 70. The check handling device 1002 stores the check that is a non-rejected check and has been confirmed by the user in the cassette 60.

Figure 31:
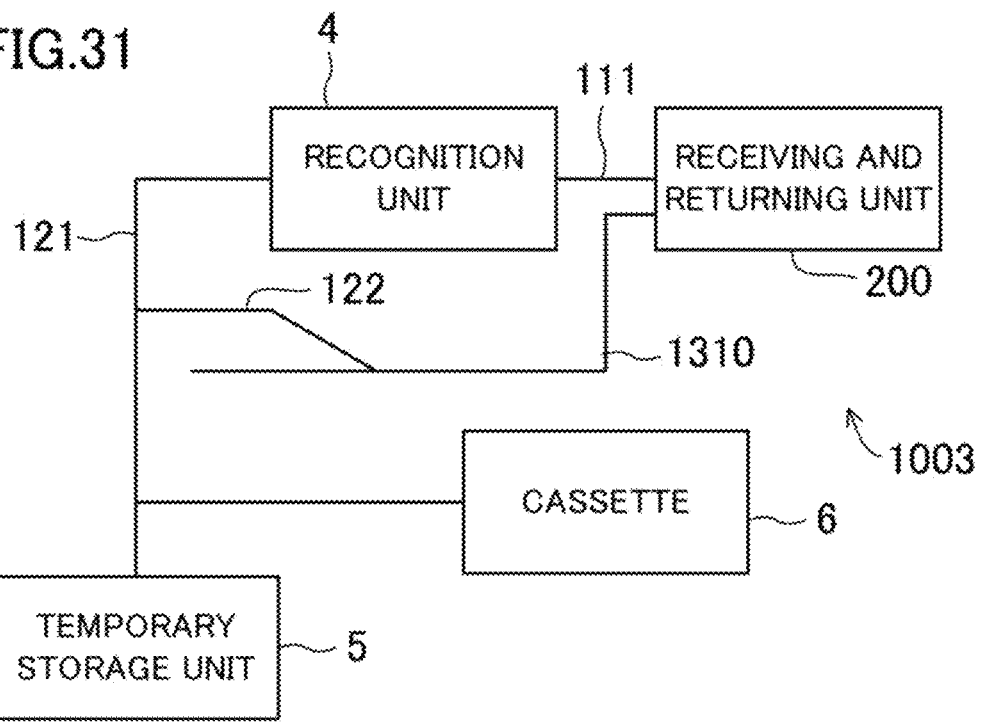
FIG. 31 illustrates still another modification of the check handling device.

FIG. 31 shows a still another configuration example of the check handling device. In a check handling device 1003, the configurations of the returning unit and the transport path are different from those of the returning unit and the transport path of the check handling device 10 of FIG. 1. As in the check handling device 1001 of FIG. 29, the returning unit of the check handling device 1003 of FIG. 31 is integrated with the receiving unit. The check handling device 1003 has a receiving and returning unit 200.

A returning transport path 1310 is connected to the receiving and returning unit 200. In the check handling device 1003, the receiving transport path 111, the main transport path 121, the first branch path 122, and the returning transport path 1310 form a loop.

The check handling device 1003 of FIG. 31 can also handle checks in a manner similar to that of the check handling device 10 of FIG. 1. That is, the check handling device 1003 transports the checks received by the receiving and returning unit 200 to the recognition unit 4 through the receiving transport path 111 and transports them to the temporary storage unit 5 through the main transport path 121. The temporary storage unit 5 stores all the rejected and non-rejected checks. Of the checks fed out from the temporary storage unit 5, the check handling device 1003 returns the rejected check and the check not confirmed by the user to the receiving and returning unit 200 through the first branch path 122 and the returning transport path 1310.

The check handling device 1003 stores the check that is a non-rejected check and has been confirmed by the user in the cassette 6.

Figure 32:
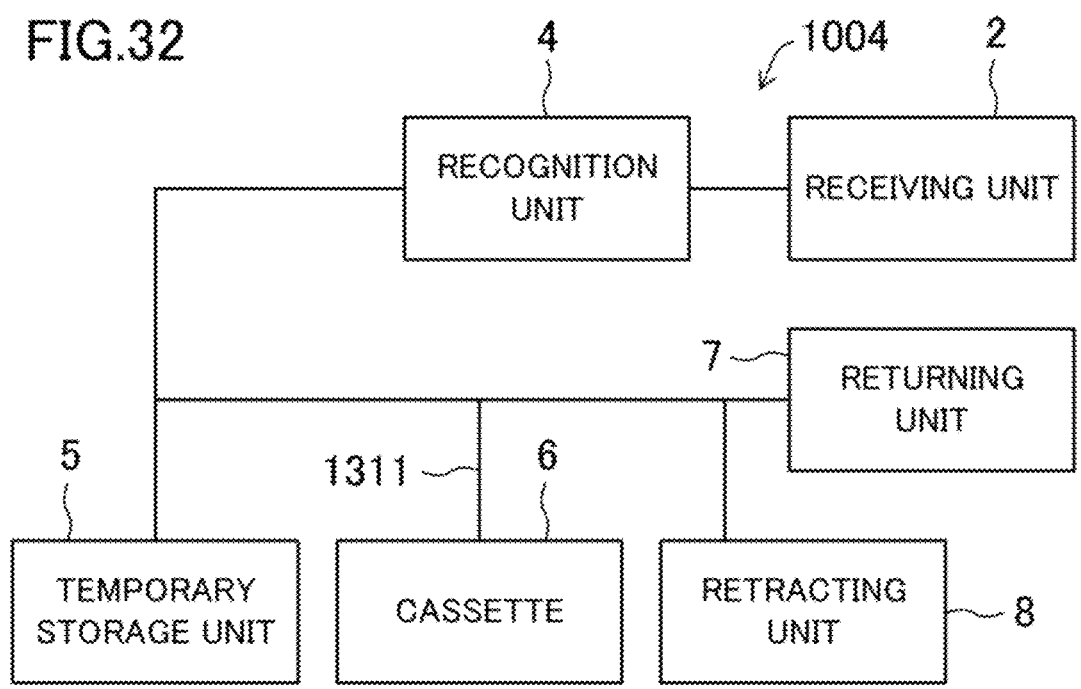
FIG. 32 illustrates yet another modification of the check handling device.

FIG. 32 shows yet another configuration example of the check handling device. In a check handling device 1004, the configuration of the transport path is different from that of the transport path of the check handling device 10 of FIG. 1. In a check handling device 1004 of FIG. 32, the cassette 6 is connected to a fifth branch path 1311 that diverges from the returning transport path connected to the returning unit. The check handling device 1004 of FIG. 32 can also handle the checks in a manner similar to that of the check handling device 10 of FIG. 1.

Figure 33:
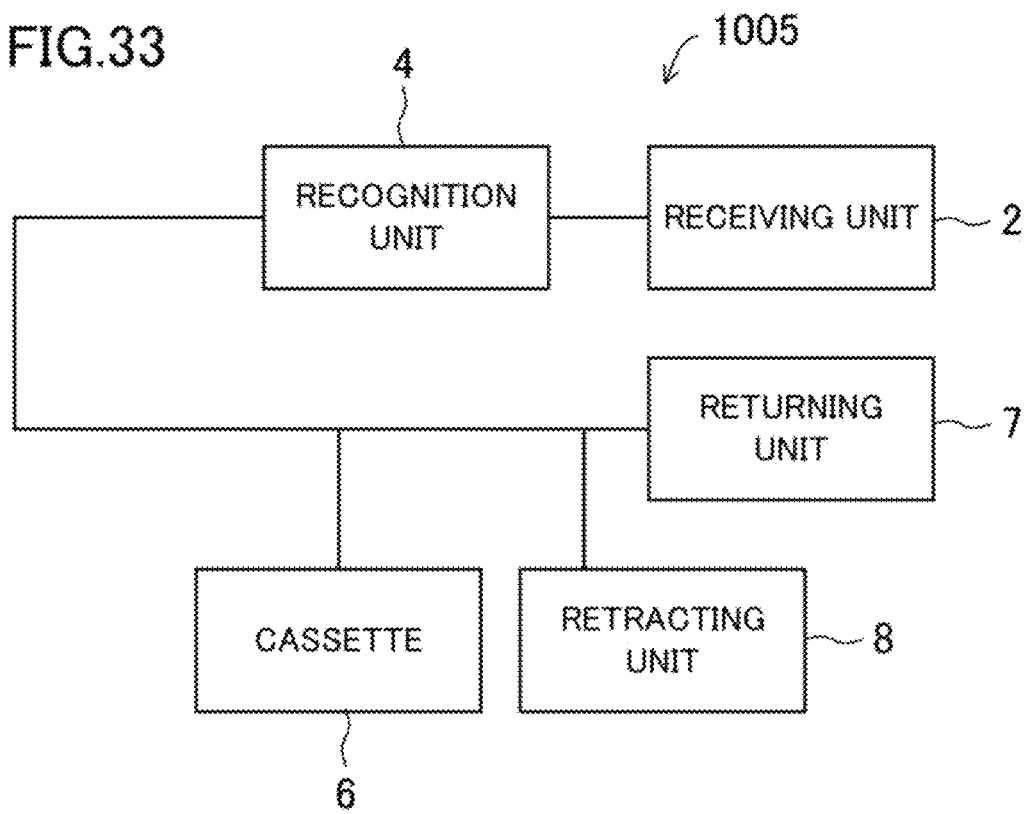
FIG. 33 illustrates a further modification of the check handling device.

FIG. 33 shows a further configuration example of the check handling device. A check handling device 1005 is different from the check handling device 1004 of FIG. 32 in that the temporary storage unit is omitted.

Figure 35:
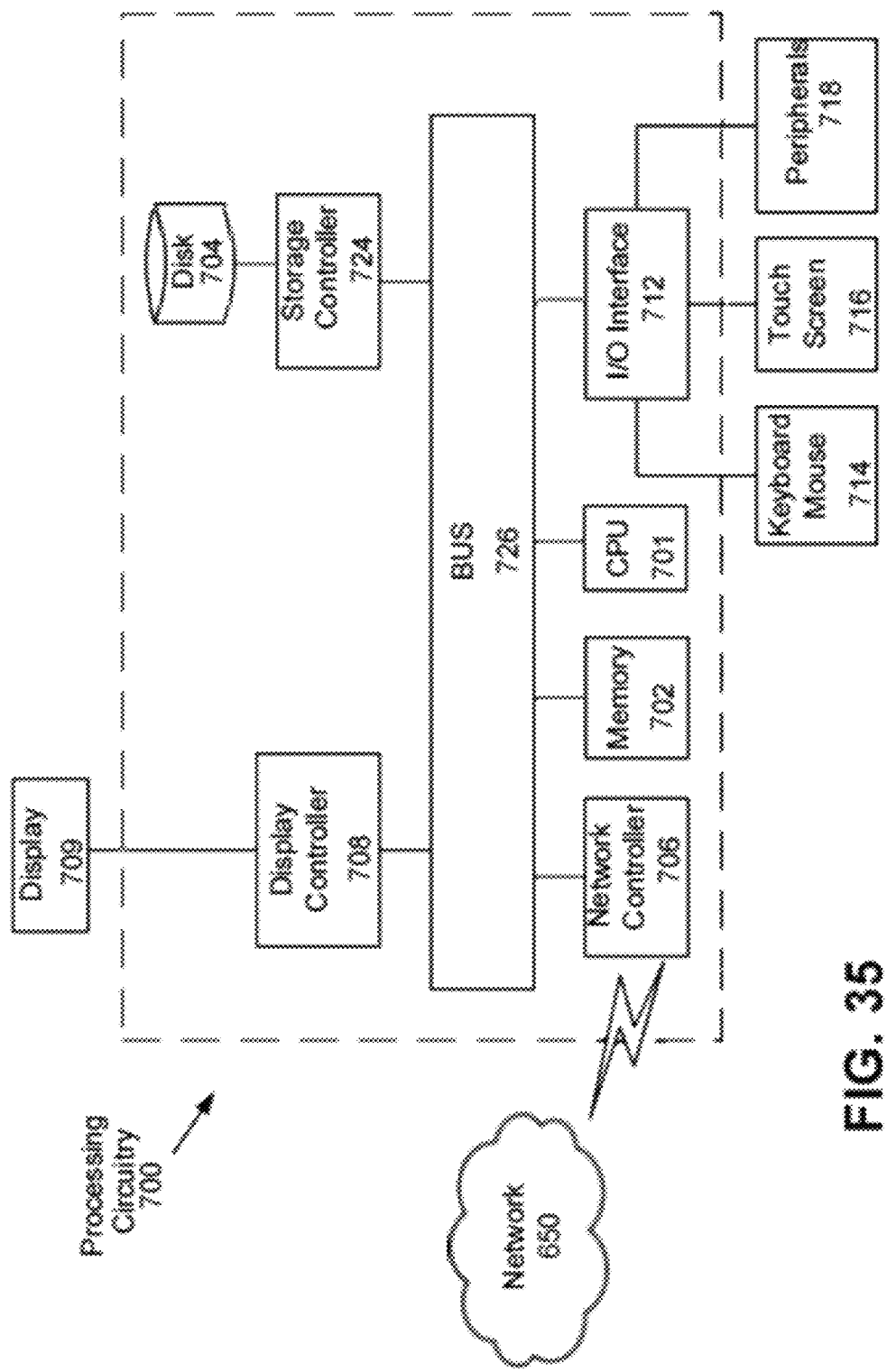
FIG. 35 is a block diagram of processing circuitry that performs computer-based operations in accordance with the present disclosure.

FIG. 35 is a block diagram of processing circuitry that performs computer-based operations in accordance with the present disclosure. FIG. 35 illustrates processing circuitry 700 of control unit 100, which is a component of check handling device 10.

Processing circuitry 700 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality. Processors are processing circuitry or circuitry as they include transistors and other circuitry therein. The processor may be a programmed processor which executes a program stored in a memory. In the disclosure, the processing circuitry, units, or means are hardware that carry out or are programmed to perform the recited functionality. The hardware may be any hardware disclosed herein or otherwise known which is programmed or configured to carry out the recited functionality. In FIG. 35, the processing circuitry 700 includes a CPU 701 which performs one or more of the control processes discussed in this disclosure. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 700 communicates, such as a server or computer. The processes may also be stored in network based storage, cloud-based storage or other mobile accessible storage and executable by processing circuitry 700.

Further, the claimed advancements may be provided as a utility application, background daemon, or component of an operating system, or combination thereof, executing in conjunction with CPU 701 and an operating system such as Microsoft Windows, UNIX, Solaris, LINUX, Apple MAC-OS, Apple iOS and other systems known to those skilled in the art.

The hardware elements in order to achieve the processing circuitry 700 may be realized by various circuitry elements. Further, each of the functions of the above described embodiments may be implemented by circuitry, which includes one or more processing circuits. A processing circuit includes a particularly programmed processor, for example, processor (CPU) 701, as shown in FIG. 35. A processing circuit also includes devices such as an application specific integrated circuit (ASIC) and conventional circuit components arranged to perform the recited functions.

In FIG. 35, the processing circuitry 700 may be a computer or a particular, special-purpose machine. Processing circuitry 700 is programmed to execute processing to control money handling apparatus 1.

Alternatively, or additionally, the CPU 701 may be implemented on an FPGA, ASIC, PLD or using discrete logic circuits, as one of ordinary skill in the art would recognize. Further, CPU 701 may be implemented as multiple processors cooperatively working in parallel to perform the instructions of the inventive processes described above.

The processing circuitry 700 in FIG. 35 also includes a network controller 706, such as an Ethernet PRO network interface card, for interfacing with network 650. As can be appreciated, the network 650 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The network 650 can also be wired, such as an Ethernet network, universal serial bus (USB) cable, or can be wireless such as a cellular network including EDGE, 7G and 4G wireless cellular systems. The wireless network can also be Wi-Fi, wireless LAN, Bluetooth, or any other wireless form of communication that is known. Additionally, network controller 706 may be compliant with other direct communication standards, such as Bluetooth, a near field communication (NFC), infrared ray or other.

The processing circuitry 700 further includes a display controller 708, such as a graphics card or graphics adaptor for interfacing with display 709, such as a monitor. An I/O interface 712 interfaces with a keyboard and/or mouse 714 as well as a touch screen panel 716 on or separate from display 109. I/O interface 712 also connects to a variety of peripherals 718.

The storage controller 724 connects the storage medium disk 704 with communication bus 726, which may be an ISA, EISA, VESA, PCI, or similar, for interconnecting all of the components of the processing circuitry 700. A description of the general features and functionality of the display 709, keyboard and/or mouse 714, as well as the display controller 708, storage controller 724, network controller 706, and I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The medium handling device disclosed herein is not limited to the check handling device and can be applied to various types of media such as banknotes and vouchers.

What is claimed is:

1. A check handling device, comprising:
   a receiver having an inlet that receives a check;
   a transport having a first path connected to the receiver and that transports the check received by the receiver;
   a recognition circuit located at the first path, the recognition circuit configured to detect whether each check transported by the transport is a rejected check or a non-rejected check;
   a temporary storage connected to the first path and that stores both the rejected check and the non-rejected check after detection by the recognition circuit; and
   a return outlet, wherein
   the transport further includes a returning transport having:
      a second path that diverges from the first path,
      a returning path connected to the return outlet,
      a retracting path, and
      a switch including a switching claw, the switch provided between the second path, the returning path and the retracting path,
   the returning transport transports the rejected check fed out from the temporary storage along the second path to the return outlet, and the switching claw is pushed by the rejected check transported from the second path to the switch, to allow the second path and the returning path to communicate with each other,
   the returning transport reciprocates the rejected check along the returning path and the retracting path while the switching claw allows the returning path and the retracting path to communicate with each other, and
   the transport transports a next check from the second path to the returning path so that:
      a position of the next check is aligned with a position of another check reciprocating along the returning path and the retracting path,
      the switching claw is pushed by the next check, to allow the second path and the returning path to communicate with each other,
      the next check and the another check are stacked at a position of the switch, and
      the transport transports the stacked next check and the another check to the return outlet.

2. The check handling device according to claim 1, wherein the temporary storage stores a plurality of the rejected checks.

3. The check handling device according to claim 1, wherein in a case that the receiver receives a plurality of the checks through the inlet,
the receiver feeds out the plurality of checks one by one to the first path,
the recognition circuit recognizes the plurality of checks one by one, and
the temporary storage stores all of the plurality of checks received through the inlet.

4. The check handling device according to claim 1, wherein
the receiver is located at a first end of the first path,
the temporary storage is located at a second end of the first path, and
the recognition circuit is located between the first and second ends of the first path.

5. The check handling device according to claim 1, further comprising:
an interface that receives an instruction from a user after all checks received by the receiver are stored in the temporary storage, wherein
the temporary storage feeds out the stored checks after the instruction is input to the interface, and
the transport transports the rejected check fed out from the temporary storage to the return outlet to feed the rejected check out to the user.

6. The check handling device according to claim 1, wherein the return outlet is located at a position different from the receiver.

7. The check handling device according to claim 5, further comprising:
a storage connected to the first path, wherein
the storage stores the non-rejected check fed out from the temporary storage after the instruction is input to the interface and transported by the transport.

8. The check handling device according to claim 7, wherein the storage is a cassette that is detachably attached to the check handling device.

9. The check handling device according to claim 7, wherein
the transport transports the check in a first direction and a second direction, the first direction being a direction from the receiver toward the temporary storage along the first path, and the second direction being an opposite direction to the first direction,
a first switching mechanism, which switches a transport direction of the check being transported by the transport, is located at a diverging position where the second path diverges from the first path,
the first switching mechanism sets the transport direction of the check to a direction toward the temporary storage in a case that the check is transported in the first direction along the first path, and
the first switching mechanism sets the transport direction of the check to a direction toward the return outlet in a case that the check is transported in the second direction along the first path.

10. The check handling device according to claim 9, wherein
the first switching mechanism includes a diverter located at the diverging position, and
the diverter is switched between a first position and a second position, the first position being such a position that a receiver side of the first path and a temporary storage side of the first path communicate with each other and the temporary storage side of the first path and the second path do not communicate with each other, and the second position being such a position that the receiver side of the first path and the temporary storage side of the first path do not communicate with each other and the temporary storage side of the first path and the second path communicate with each other.

11. The check handling device according to claim 10, wherein
the first switching mechanism includes a biasing member that biases the diverter to the second position,
the check that is transported from the receiver toward the temporary storage along the first path comes into contact with the diverter to switch the diverter from the second position to the first position against a biasing force of the biasing member, and
the check that is transported from the temporary storage toward the receiver along the first path is transported toward the return outlet by the diverter located at the second position.

12. The check handling device according to claim 7, wherein
the transport has a third path that diverges from the first path at a position closer to the temporary storage than a diverging position of the second path, and an end of the third path is connected to the storage that stores the non-rejected check,
a second switching mechanism, which switches a transport direction of the check being transported along the first path by the transport, is located at the diverging position where the third path diverges from the first path,
the second switching mechanism sets the transport direction of the check to a direction toward the temporary storage in a case that the check is transported in the first direction along the first path, and
the second switching mechanism selectively switches the transport direction of the check between a direction toward the receiver and a direction toward the storage into which the non-rejected check is stored in a case that the check is transported in the second direction along the first path.

13. The check handling device according to claim 12, wherein the first path, the second path, and the third path are connected so as not to form a loop path.

14. The check handling device according to claim 1, wherein
in a first mode, the temporary storage stores both the rejected check and the non-rejected check in a first mode, and
in a second mode, the temporary storage stores the non-rejected check and does not store the rejected check.

15. The check handling device according to claim 14, further comprising:
an identification circuit that identifies a user; and
control circuitry that switches between the first mode and the second mode according to the user identified by the identification circuit.

16. The check handling device according to claim 1, further comprising:
a detection circuit that detects a number of checks received by the inlet, wherein
the temporary storage stores both the rejected check and the non-rejected check in a case that the number of checks detected by the detection circuit is equal to or greater than a predetermined value, and the temporary storage does not store the rejected check but stores the non-rejected check in a case that the number of checks detected by the detection circuit is smaller than the predetermined value.

17. The check handling device according to claim 1, wherein the recognition circuit includes a first acquisition circuit that acquires magnetic information of the check and a second acquisition circuit that acquires an image of the check, and the recognition circuit recognizes at least whether the check is the rejected check or the non-rejected check based on the magnetic information of the check and the image of the check.

18. The check handling device according to claim 1, wherein the recognition circuit acquires an image of the check, the check handling device further comprises control circuitry configured to determine whether an image quality of the image is greater than a predetermined threshold, and in a case that the control circuitry determines that the image quality is not greater than the predetermined threshold, the control circuitry is further configured to control the transport to transport the check back to the recognition circuit so that the recognition circuit re-acquires the image.

19. The check handling device according to claim 1, wherein the switching claw changes an orientation between a first attitude and a second attitude, in the first attitude, the switching claw allows the second path and the returning path to communicate with each other, in the second attitude, the switching claw allows the returning path and the retracting path to communicate with each other, the switch further includes a biasing member that biases the switching claw to the second attitude, and the switching claw is switched from the second attitude to the first attitude by movement of the rejected check transported from the second path to the switch against a biasing force of the biasing member.

20. The check handling device according to claim 1, wherein pushed by a check, an angle of the switching claw is automatically adjusted to an optimal angle when checks are stacked on each other.

* * * * *